United States Patent
Venkataraman et al.

(10) Patent No.: US 9,942,474 B2
(45) Date of Patent: Apr. 10, 2018

(54) SYSTEMS AND METHODS FOR PERFORMING HIGH SPEED VIDEO CAPTURE AND DEPTH ESTIMATION USING ARRAY CAMERAS

(71) Applicant: FotoNation Cayman Limited, San Jose, CA (US)

(72) Inventors: Kartik Venkataraman, San Jose, CA (US); Yusong Huang, San Jose, CA (US); Ankit K. Jain, San Diego, CA (US); Priyam Chatterjee, Sunnyvale, CA (US)

(73) Assignee: FotoNation Cayman Limited, San Jose, CA (US)

( * ) Notice: Subject to any disclaimer, the term of this patent is extended or adjusted under 35 U.S.C. 154(b) by 0 days.

(21) Appl. No.: 14/690,346

(22) Filed: Apr. 17, 2015

(65) Prior Publication Data

US 2016/0309084 A1     Oct. 20, 2016

(51) Int. Cl.
*H04N 5/225* (2006.01)
*H04N 5/232* (2006.01)
(Continued)

(52) U.S. Cl.
CPC .......... *H04N 5/23232* (2013.01); *G06T 7/55* (2017.01); *H04N 5/2226* (2013.01);
(Continued)

(58) Field of Classification Search
CPC ................................................... H04N 13/022
(Continued)

(56) References Cited

U.S. PATENT DOCUMENTS 4,124,798 A   11/1978  Thompson
4,198,646 A    4/1980  Alexander et al.
(Continued)

FOREIGN PATENT DOCUMENTS

CN        1839394 A    9/2006
CN      101010619 A    8/2007
(Continued)

OTHER PUBLICATIONS

US 8,957,977, 02/2015, Venkataraman et al. (withdrawn)
(Continued)

*Primary Examiner* — Joel Fosselman
(74) *Attorney, Agent, or Firm* — KPPB LLP

(57) ABSTRACT

High speed video capture and depth estimation using array cameras is disclosed. Real world scenes typically include objects located at different distances from a camera. Therefore, estimating depth during video capture by an array camera can result in smoother rendering of video from image data captured of real world scenes. One embodiment of the invention includes cameras that capture images from different viewpoints, and an image processing pipeline application that obtains images from groups of cameras, where each group of cameras starts capturing image data at a staggered start time relative to the other groups of cameras. The application then selects a reference viewpoint and determines scene-dependent geometric corrections that shift pixels captured from an alternate viewpoint to the reference viewpoint by performing disparity searches to identify the disparity at which pixels from the different viewpoints are most similar. The corrections can then be used to render frames of video.

46 Claims, 12 Drawing Sheets

(51) Int. Cl.
*H04N 5/222* (2006.01)
*G06T 7/55* (2017.01)
*H04N 13/00* (2018.01)
*H04N 9/04* (2006.01)

(52) U.S. Cl.
CPC ....... *H04N 5/2258* (2013.01); *H04N 5/23293* (2013.01); *H04N 9/045* (2013.01); *H04N 13/00* (2013.01); *G06T 2207/10052* (2013.01)

(58) Field of Classification Search
USPC .................. 348/218.1; 345/427; 382/154
See application file for complete search history.

(56) References Cited

U.S. PATENT DOCUMENTS

| | | |
|---|---|---|
| 4,323,925 A | 4/1982 | Abell et al. |
| 4,460,449 A | 7/1984 | Montalbano |
| 4,467,365 A | 8/1984 | Murayama et al. |
| 4,652,909 A | 3/1987 | Glenn |
| 4,899,060 A | 2/1990 | Lischke |
| 5,005,083 A | 4/1991 | Grage |
| 5,070,414 A | 12/1991 | Tsutsumi |
| 5,144,448 A | 9/1992 | Hornbaker et al. |
| 5,157,499 A | 10/1992 | Oguma et al. |
| 5,325,449 A | 6/1994 | Burt et al. |
| 5,327,125 A | 7/1994 | Iwase et al. |
| 5,475,422 A | 12/1995 | Suzuki et al. |
| 5,488,674 A | 1/1996 | Burt et al. |
| 5,517,236 A | 5/1996 | Sergeant et al. |
| 5,629,524 A | 5/1997 | Stettner et al. |
| 5,675,377 A | 10/1997 | Gibas et al. |
| 5,710,875 A | 1/1998 | Hsu et al. |
| 5,808,350 A | 9/1998 | Jack et al. |
| 5,832,312 A | 11/1998 | Rieger et al. |
| 5,880,691 A | 3/1999 | Fossum et al. |
| 5,911,008 A | 6/1999 | Hamada et al. |
| 5,933,190 A | 8/1999 | Dierickx et al. |
| 5,973,844 A | 10/1999 | Burger |
| 6,002,743 A | 12/1999 | Telymonde |
| 6,005,607 A | 12/1999 | Uomori et al. |
| 6,034,690 A | 3/2000 | Gallery et al. |
| 6,069,351 A | 5/2000 | Mack |
| 6,069,365 A | 5/2000 | Chow et al. |
| 6,084,979 A | 7/2000 | Rander et al. |
| 6,097,394 A | 8/2000 | Levoy et al. |
| 6,124,974 A | 9/2000 | Burger |
| 6,130,786 A | 10/2000 | Osawa et al. |
| 6,137,100 A | 10/2000 | Fossum et al. |
| 6,137,535 A | 10/2000 | Meyers |
| 6,141,048 A | 10/2000 | Meyers |
| 6,160,909 A | 12/2000 | Melen |
| 6,163,414 A | 12/2000 | Kikuchi et al. |
| 6,172,352 B1 | 1/2001 | Liu et al. |
| 6,175,379 B1 | 1/2001 | Uomori et al. |
| 6,198,852 B1 | 3/2001 | Anandan et al. |
| 6,205,241 B1 | 3/2001 | Melen |
| 6,239,909 B1 | 5/2001 | Hayashi et al. |
| 6,340,994 B1 | 1/2002 | Margulis et al. |
| 6,358,862 B1 | 3/2002 | Ireland et al. |
| 6,443,579 B1 | 9/2002 | Myers et al. |
| 6,476,805 B1 | 11/2002 | Shum et al. |
| 6,477,260 B1 | 11/2002 | Shimomura |
| 6,502,097 B1 | 12/2002 | Chan et al. |
| 6,525,302 B2 | 2/2003 | Dowski, Jr. et al. |
| 6,563,537 B1 | 5/2003 | Kawamura et al. |
| 6,571,466 B1 | 6/2003 | Glenn et al. |
| 6,603,513 B1 | 8/2003 | Berezin |
| 6,611,289 B1 | 8/2003 | Yu |
| 6,627,896 B1 | 9/2003 | Hashimoto et al. |
| 6,628,330 B1 | 9/2003 | Lin |
| 6,635,941 B2 | 10/2003 | Suda |
| 6,639,596 B1 | 10/2003 | Shum et al. |
| 6,647,142 B1 | 11/2003 | Beardsley |
| 6,657,218 B2 | 12/2003 | Noda |
| 6,671,399 B1 | 12/2003 | Berestov |
| 6,750,904 B1 | 6/2004 | Lambert |
| 6,765,617 B1 | 7/2004 | Tangen et al. |
| 6,771,833 B1 | 8/2004 | Edgar |
| 6,774,941 B1 | 8/2004 | Boisvert et al. |
| 6,788,338 B1 | 9/2004 | Dinev |
| 6,795,253 B2 | 9/2004 | Shinohara |
| 6,819,328 B1 | 11/2004 | Moriwaki et al. |
| 6,819,358 B1 | 11/2004 | Kagle et al. |
| 6,879,735 B1 | 4/2005 | Portniaguine et al. |
| 6,897,454 B2 | 5/2005 | Sasaki et al. |
| 6,903,770 B1 | 6/2005 | Kobayashi et al. |
| 6,909,121 B2 | 6/2005 | Nishikawa |
| 6,927,922 B2 | 8/2005 | George et al. |
| 6,958,862 B1 | 10/2005 | Joseph |
| 7,015,954 B1 | 3/2006 | Foote et al. |
| 7,085,409 B2 | 8/2006 | Sawhney |
| 7,161,614 B1 | 1/2007 | Yamashita et al. |
| 7,199,348 B2 | 4/2007 | Olsen et al. |
| 7,206,449 B2 | 4/2007 | Raskar et al. |
| 7,235,785 B2 | 6/2007 | Hornback et al. |
| 7,262,799 B2 | 8/2007 | Suda |
| 7,292,735 B2 | 11/2007 | Blake et al. |
| 7,295,697 B1 | 11/2007 | Satoh |
| 7,369,165 B2 | 5/2008 | Bosco et al. |
| 7,391,572 B2 | 6/2008 | Jacobowitz et al. |
| 7,408,725 B2 | 8/2008 | Sato |
| 7,425,984 B2 | 9/2008 | Chen |
| 7,496,293 B2 | 2/2009 | Shamir et al. |
| 7,564,019 B2 | 7/2009 | Olsen |
| 7,606,484 B1 | 10/2009 | Richards |
| 7,620,265 B1 | 11/2009 | Wolff et al. |
| 7,633,511 B2 | 12/2009 | Shum et al. |
| 7,639,435 B2 | 12/2009 | Chiang et al. |
| 7,646,549 B2 | 1/2010 | Zalevsky et al. |
| 7,657,090 B2 | 2/2010 | Omatsu et al. |
| 7,675,080 B2 | 3/2010 | Boettiger |
| 7,675,681 B2 | 3/2010 | Tomikawa et al. |
| 7,706,634 B2 | 4/2010 | Schmitt et al. |
| 7,723,662 B2 | 5/2010 | Levoy et al. |
| 7,738,013 B2 | 6/2010 | Galambos et al. |
| 7,741,620 B2 | 6/2010 | Doering et al. |
| 7,782,364 B2 | 8/2010 | Smith |
| 7,826,153 B2 | 11/2010 | Hong |
| 7,840,067 B2 | 11/2010 | Shen et al. |
| 7,912,673 B2 | 3/2011 | Hébert et al. |
| 7,965,314 B1 | 6/2011 | Miller et al. |
| 7,973,834 B2 | 7/2011 | Yang |
| 7,986,018 B2 | 7/2011 | Rennie |
| 7,990,447 B2 | 8/2011 | Honda et al. |
| 8,000,498 B2 | 8/2011 | Shih et al. |
| 8,013,904 B2 | 9/2011 | Tan et al. |
| 8,027,531 B2 | 9/2011 | Wilburn et al. |
| 8,044,994 B2 | 10/2011 | Vetro et al. |
| 8,077,245 B2 | 12/2011 | Adamo et al. |
| 8,098,297 B2 | 1/2012 | Crisan et al. |
| 8,098,304 B2 | 1/2012 | Pinto et al. |
| 8,106,949 B2 | 1/2012 | Tan et al. |
| 8,126,279 B2 | 2/2012 | Marcellin et al. |
| 8,130,120 B2 | 3/2012 | Kawabata et al. |
| 8,131,097 B2 | 3/2012 | Lelescu et al. |
| 8,149,323 B2 | 4/2012 | Li et al. |
| 8,164,629 B1 | 4/2012 | Zhang |
| 8,169,486 B2 | 5/2012 | Corcoran et al. |
| 8,180,145 B2 | 5/2012 | Wu et al. |
| 8,189,065 B2 | 5/2012 | Georgiev et al. |
| 8,189,089 B1 | 5/2012 | Georgiev et al. |
| 8,194,296 B2 | 6/2012 | Compton et al. |
| 8,212,914 B2 | 7/2012 | Chiu |
| 8,213,711 B2 | 7/2012 | Tam et al. |
| 8,231,814 B2 | 7/2012 | Duparre |
| 8,242,426 B2 | 8/2012 | Ward et al. |
| 8,244,027 B2 | 8/2012 | Takahashi |
| 8,244,058 B1 | 8/2012 | Intwala et al. |
| 8,254,668 B2 | 8/2012 | Mashitani et al. |
| 8,279,325 B2 | 10/2012 | Pitts et al. |
| 8,280,194 B2 | 10/2012 | Wong et al. |
| 8,289,409 B2 | 10/2012 | Chang |
| 8,289,440 B2 | 10/2012 | Pitts et al. |

(56) References Cited

U.S. PATENT DOCUMENTS

| | | |
|---|---|---|
| 8,290,358 B1 | 10/2012 | Georgiev |
| 8,294,099 B2 | 10/2012 | Blackwell, Jr. |
| 8,305,456 B1 | 11/2012 | McMahon |
| 8,315,476 B1 | 11/2012 | Georgiev et al. |
| 8,345,144 B1 | 1/2013 | Georgiev et al. |
| 8,360,574 B2 | 1/2013 | Ishak et al. |
| 8,400,555 B1 | 3/2013 | Georgiev |
| 8,406,562 B2 | 3/2013 | Bassi et al. |
| 8,411,146 B2 | 4/2013 | Twede |
| 8,446,492 B2 | 5/2013 | Nakano et al. |
| 8,456,517 B2 | 6/2013 | Mor et al. |
| 8,493,496 B2 | 7/2013 | Freedman et al. |
| 8,514,491 B2 | 8/2013 | Duparre |
| 8,541,730 B2 | 9/2013 | Inuiya |
| 8,542,933 B2 | 9/2013 | Venkataraman |
| 8,553,093 B2 | 10/2013 | Wong et al. |
| 8,558,929 B2 * | 10/2013 | Tredwell ............... H04N 3/155 250/370.09 |
| 8,559,756 B2 | 10/2013 | Georgiev et al. |
| 8,565,547 B2 | 10/2013 | Strandemar |
| 8,576,302 B2 | 11/2013 | Yoshikawa |
| 8,577,183 B2 | 11/2013 | Robinson |
| 8,581,995 B2 | 11/2013 | Lin et al. |
| 8,619,082 B1 * | 12/2013 | Ciurea ............... H04N 13/0022 345/427 |
| 8,648,918 B2 | 2/2014 | Kauker et al. |
| 8,655,052 B2 | 2/2014 | Spooner et al. |
| 8,682,107 B2 | 3/2014 | Yoon et al. |
| 8,687,087 B2 | 4/2014 | Pertsel et al. |
| 8,692,893 B2 | 4/2014 | McMahon |
| 8,773,536 B1 | 7/2014 | Zhang |
| 8,780,113 B1 | 7/2014 | Ciurea et al. |
| 8,804,255 B2 | 8/2014 | Duparre |
| 8,830,375 B2 | 9/2014 | Ludwig |
| 8,831,367 B2 | 9/2014 | Venkataraman |
| 8,842,201 B2 | 9/2014 | Tajiri |
| 8,854,462 B2 | 10/2014 | Herbin et al. |
| 8,861,089 B2 | 10/2014 | Duparre |
| 8,866,912 B2 | 10/2014 | Mullis |
| 8,866,920 B2 | 10/2014 | Venkataraman et al. |
| 8,866,951 B2 | 10/2014 | Keelan |
| 8,878,950 B2 | 11/2014 | Lelescu et al. |
| 8,885,059 B1 | 11/2014 | Venkataraman et al. |
| 8,885,922 B2 | 11/2014 | Kobayashi et al. |
| 8,896,594 B2 | 11/2014 | Xiong et al. |
| 8,896,719 B1 | 11/2014 | Venkataraman et al. |
| 8,902,321 B2 | 12/2014 | Venkataraman et al. |
| 8,928,793 B2 | 1/2015 | McMahon |
| 8,977,038 B2 | 3/2015 | Tian et al. |
| 9,001,226 B1 | 4/2015 | Ng et al. |
| 9,019,426 B2 | 4/2015 | Han et al. |
| 9,025,894 B2 | 5/2015 | Venkataraman |
| 9,025,895 B2 | 5/2015 | Venkataraman |
| 9,030,528 B2 | 5/2015 | Pesach et al. |
| 9,031,335 B2 | 5/2015 | Venkataraman |
| 9,031,342 B2 | 5/2015 | Venkataraman |
| 9,031,343 B2 | 5/2015 | Venkataraman |
| 9,036,928 B2 | 5/2015 | Venkataraman |
| 9,036,931 B2 | 5/2015 | Venkataraman |
| 9,041,823 B2 | 5/2015 | Venkataraman et al. |
| 9,041,824 B2 | 5/2015 | Lelescu et al. |
| 9,041,829 B2 | 5/2015 | Venkataraman et al. |
| 9,042,667 B2 | 5/2015 | Venkataraman |
| 9,049,367 B2 | 6/2015 | Venkataraman et al. |
| 9,055,233 B2 | 6/2015 | Venkataraman et al. |
| 9,060,124 B2 | 6/2015 | Venkataraman et al. |
| 9,077,893 B2 | 7/2015 | Venkataraman et al. |
| 9,094,661 B2 | 7/2015 | Venkataraman et al. |
| 9,123,117 B2 | 9/2015 | Ciurea et al. |
| 9,123,118 B2 | 9/2015 | Ciurea et al. |
| 9,124,815 B2 | 9/2015 | Venkataraman et al. |
| 9,124,831 B2 | 9/2015 | Mullis |
| 9,124,864 B2 | 9/2015 | Mullis |
| 9,128,228 B2 | 9/2015 | Duparre |
| 9,129,183 B2 | 9/2015 | Venkataraman et al. |
| 9,129,377 B2 | 9/2015 | Ciurea et al. |
| 9,143,711 B2 | 9/2015 | McMahon |
| 9,147,254 B2 | 9/2015 | Ciurea et al. |
| 9,185,276 B2 | 11/2015 | Rodda et al. |
| 9,188,765 B2 | 11/2015 | Venkataraman et al. |
| 9,191,580 B2 | 11/2015 | Venkataraman et al. |
| 9,197,821 B2 | 11/2015 | McMahon |
| 9,210,392 B2 | 12/2015 | Nisenzon et al. |
| 9,214,013 B2 | 12/2015 | Venkataraman et al. |
| 9,235,898 B2 | 1/2016 | Venkataraman et al. |
| 9,235,900 B2 | 1/2016 | Ciurea et al. |
| 9,240,049 B2 | 1/2016 | Ciurea et al. |
| 9,253,380 B2 | 2/2016 | Venkataraman et al. |
| 9,256,974 B1 | 2/2016 | Hines |
| 9,264,592 B2 | 2/2016 | Rodda et al. |
| 9,264,610 B2 | 2/2016 | Duparre |
| 9,361,662 B2 | 6/2016 | Lelescu et al. |
| 9,412,206 B2 | 8/2016 | McMahon et al. |
| 9,413,953 B2 | 8/2016 | Maeda |
| 9,426,343 B2 | 8/2016 | Rodda et al. |
| 9,426,361 B2 | 8/2016 | Venkataraman et al. |
| 9,445,003 B1 | 9/2016 | Lelescu et al. |
| 9,456,196 B2 | 9/2016 | Kim et al. |
| 9,462,164 B2 | 10/2016 | Venkataraman et al. |
| 9,485,496 B2 | 11/2016 | Venkataraman et al. |
| 9,497,370 B2 | 11/2016 | Venkataraman et al. |
| 9,497,429 B2 | 11/2016 | Mullis et al. |
| 2001/0005225 A1 | 6/2001 | Clark et al. |
| 2001/0019621 A1 | 9/2001 | Hanna et al. |
| 2001/0028038 A1 | 10/2001 | Hamaguchi et al. |
| 2001/0038387 A1 | 11/2001 | Tomooka et al. |
| 2002/0012056 A1 | 1/2002 | Trevino |
| 2002/0015536 A1 | 2/2002 | Warren |
| 2002/0027608 A1 | 3/2002 | Johnson |
| 2002/0028014 A1 | 3/2002 | Ono et al. |
| 2002/0039438 A1 | 4/2002 | Mori et al. |
| 2002/0057845 A1 | 5/2002 | Fossum |
| 2002/0063807 A1 | 5/2002 | Margulis |
| 2002/0075450 A1 | 6/2002 | Aratani et al. |
| 2002/0087403 A1 | 7/2002 | Meyers et al. |
| 2002/0089596 A1 | 7/2002 | Suda |
| 2002/0094027 A1 | 7/2002 | Sato et al. |
| 2002/0101528 A1 | 8/2002 | Lee |
| 2002/0113867 A1 | 8/2002 | Takigawa et al. |
| 2002/0113888 A1 | 8/2002 | Sonoda et al. |
| 2002/0120634 A1 | 8/2002 | Min et al. |
| 2002/0122113 A1 | 9/2002 | Foote et al. |
| 2002/0163054 A1 | 11/2002 | Suda |
| 2002/0167537 A1 | 11/2002 | Trajkovic |
| 2002/0177054 A1 | 11/2002 | Saitoh et al. |
| 2002/0195548 A1 | 12/2002 | Dowski, Jr. et al. |
| 2003/0025227 A1 | 2/2003 | Daniell |
| 2003/0086079 A1 | 5/2003 | Barth et al. |
| 2003/0124763 A1 | 7/2003 | Fan et al. |
| 2003/0140347 A1 | 7/2003 | Varsa |
| 2003/0179418 A1 | 9/2003 | Wengender et al. |
| 2003/0188659 A1 | 10/2003 | Merry et al. |
| 2003/0190072 A1 | 10/2003 | Adkins et al. |
| 2003/0198377 A1 | 10/2003 | Ng et al. |
| 2003/0211405 A1 | 11/2003 | Venkataraman |
| 2004/0003409 A1 | 1/2004 | Berstis et al. |
| 2004/0008271 A1 | 1/2004 | Hagimori et al. |
| 2004/0012689 A1 | 1/2004 | Tinnerino |
| 2004/0027358 A1 | 2/2004 | Nakao |
| 2004/0047274 A1 | 3/2004 | Amanai |
| 2004/0050104 A1 | 3/2004 | Ghosh et al. |
| 2004/0056966 A1 | 3/2004 | Schechner et al. |
| 2004/0061787 A1 | 4/2004 | Liu et al. |
| 2004/0066454 A1 | 4/2004 | Otani et al. |
| 2004/0071367 A1 | 4/2004 | Irani et al. |
| 2004/0096119 A1 | 5/2004 | Williams et al. |
| 2004/0100570 A1 | 5/2004 | Shizukuishi |
| 2004/0105021 A1 | 6/2004 | Hu |
| 2004/0114807 A1 | 6/2004 | Lelescu et al. |
| 2004/0141659 A1 | 7/2004 | Zhang et al. |
| 2004/0151401 A1 | 8/2004 | Sawhney et al. |
| 2004/0165090 A1 | 8/2004 | Ning |
| 2004/0169617 A1 | 9/2004 | Yelton et al. |
| 2004/0170340 A1 | 9/2004 | Tipping et al. |

(56) References Cited

U.S. PATENT DOCUMENTS

| | | |
|---|---|---|
| 2004/0174439 A1 | 9/2004 | Upton |
| 2004/0179008 A1 | 9/2004 | Gordon et al. |
| 2004/0179834 A1 | 9/2004 | Szajewski |
| 2004/0207836 A1 | 10/2004 | Chhibber et al. |
| 2004/0213449 A1 | 10/2004 | Safaee-Rad et al. |
| 2004/0218809 A1 | 11/2004 | Blake et al. |
| 2004/0234873 A1 | 11/2004 | Venkataraman |
| 2004/0239885 A1 | 12/2004 | Jaynes et al. |
| 2004/0240052 A1 | 12/2004 | Minefuji et al. |
| 2004/0251509 A1 | 12/2004 | Choi |
| 2004/0264806 A1 | 12/2004 | Herley |
| 2005/0006477 A1 | 1/2005 | Patel |
| 2005/0007461 A1 | 1/2005 | Chou et al. |
| 2005/0009313 A1 | 1/2005 | Suzuki et al. |
| 2005/0010621 A1 | 1/2005 | Pinto et al. |
| 2005/0012035 A1 | 1/2005 | Miller |
| 2005/0036778 A1 | 2/2005 | DeMonte |
| 2005/0047678 A1 | 3/2005 | Jones et al. |
| 2005/0048690 A1 | 3/2005 | Yamamoto |
| 2005/0068436 A1 | 3/2005 | Fraenkel et al. |
| 2005/0128509 A1 | 6/2005 | Tokkonen et al. |
| 2005/0128595 A1 | 6/2005 | Shimizu |
| 2005/0132098 A1 | 6/2005 | Sonoda et al. |
| 2005/0134698 A1 | 6/2005 | Schroeder et al. |
| 2005/0134699 A1 | 6/2005 | Nagashima |
| 2005/0134712 A1 | 6/2005 | Gruhlke et al. |
| 2005/0147277 A1 | 7/2005 | Higaki et al. |
| 2005/0151759 A1 | 7/2005 | Gonzalez-Banos et al. |
| 2005/0175257 A1 | 8/2005 | Kuroki |
| 2005/0185711 A1 | 8/2005 | Pfister et al. |
| 2005/0205785 A1 | 9/2005 | Hornback et al. |
| 2005/0219363 A1 | 10/2005 | Kohler |
| 2005/0224843 A1 | 10/2005 | Boemler |
| 2005/0225654 A1 | 10/2005 | Feldman et al. |
| 2005/0265633 A1 | 12/2005 | Piacentino |
| 2005/0275946 A1 | 12/2005 | Choo et al. |
| 2005/0286612 A1 | 12/2005 | Takanashi |
| 2005/0286756 A1 | 12/2005 | Hong et al. |
| 2006/0002635 A1 | 1/2006 | Nestares et al. |
| 2006/0007331 A1 | 1/2006 | Izumi et al. |
| 2006/0018509 A1 | 1/2006 | Miyoshi |
| 2006/0023197 A1 | 2/2006 | Joel |
| 2006/0023314 A1 | 2/2006 | Boettiger et al. |
| 2006/0028476 A1 | 2/2006 | Sobel et al. |
| 2006/0029271 A1 | 2/2006 | Miyoshi et al. |
| 2006/0033005 A1 | 2/2006 | Jerdev et al. |
| 2006/0034003 A1 | 2/2006 | Zalevsky |
| 2006/0034531 A1 | 2/2006 | Poon et al. |
| 2006/0035415 A1 | 2/2006 | Wood et al. |
| 2006/0038891 A1 | 2/2006 | Okutomi et al. |
| 2006/0039611 A1 | 2/2006 | Rother |
| 2006/0046204 A1 | 3/2006 | Ono et al. |
| 2006/0049930 A1 | 3/2006 | Zruya et al. |
| 2006/0054780 A1 | 3/2006 | Garrood et al. |
| 2006/0054782 A1 | 3/2006 | Olsen |
| 2006/0055811 A1 | 3/2006 | Frtiz et al. |
| 2006/0069478 A1 | 3/2006 | Iwama |
| 2006/0072029 A1 | 4/2006 | Miyatake et al. |
| 2006/0087747 A1 | 4/2006 | Ohzawa et al. |
| 2006/0098888 A1 | 5/2006 | Morishita |
| 2006/0103754 A1 | 5/2006 | Wenstrand et al. |
| 2006/0125936 A1 | 6/2006 | Gruhike et al. |
| 2006/0138322 A1 | 6/2006 | Costello et al. |
| 2006/0152803 A1 | 7/2006 | Provitola |
| 2006/0157640 A1 | 7/2006 | Perlman et al. |
| 2006/0159369 A1 | 7/2006 | Young |
| 2006/0176566 A1 | 8/2006 | Boettiger et al. |
| 2006/0187338 A1 | 8/2006 | May et al. |
| 2006/0197937 A1 | 9/2006 | Bamji et al. |
| 2006/0203100 A1 | 9/2006 | Ajito et al. |
| 2006/0203113 A1 | 9/2006 | Wada et al. |
| 2006/0210186 A1 | 9/2006 | Berkner |
| 2006/0214085 A1 | 9/2006 | Olsen |
| 2006/0221250 A1 | 10/2006 | Rossbach et al. |
| 2006/0239549 A1 | 10/2006 | Kelly et al. |
| 2006/0243889 A1 | 11/2006 | Farnworth et al. |
| 2006/0251410 A1 | 11/2006 | Trutna |
| 2006/0274174 A1 | 12/2006 | Tewinkle |
| 2006/0278948 A1 | 12/2006 | Yamaguchi et al. |
| 2006/0279648 A1 | 12/2006 | Senba et al. |
| 2006/0289772 A1 | 12/2006 | Johnson et al. |
| 2007/0002159 A1 | 1/2007 | Olsen |
| 2007/0008575 A1 | 1/2007 | Yu et al. |
| 2007/0009150 A1 | 1/2007 | Suwa |
| 2007/0024614 A1 | 2/2007 | Tam |
| 2007/0035707 A1 | 2/2007 | Margulis |
| 2007/0036427 A1 | 2/2007 | Nakamura et al. |
| 2007/0040828 A1 | 2/2007 | Zalevsky et al. |
| 2007/0040922 A1 | 2/2007 | McKee et al. |
| 2007/0041391 A1 | 2/2007 | Lin et al. |
| 2007/0052825 A1 | 3/2007 | Cho |
| 2007/0083114 A1 | 4/2007 | Yang et al. |
| 2007/0085917 A1 | 4/2007 | Kobayashi |
| 2007/0092245 A1 | 4/2007 | Bazakos et al. |
| 2007/0102622 A1 | 5/2007 | Olsen et al. |
| 2007/0126898 A1 | 6/2007 | Feldman et al. |
| 2007/0127831 A1 | 6/2007 | Venkataraman |
| 2007/0139333 A1 | 6/2007 | Sato et al. |
| 2007/0146503 A1 | 6/2007 | Shiraki |
| 2007/0146511 A1 | 6/2007 | Kinoshita et al. |
| 2007/0153335 A1 | 7/2007 | Hosaka |
| 2007/0158427 A1 | 7/2007 | Zhu et al. |
| 2007/0159541 A1 | 7/2007 | Sparks et al. |
| 2007/0160310 A1 | 7/2007 | Tanida et al. |
| 2007/0165931 A1 | 7/2007 | Higaki |
| 2007/0171290 A1 | 7/2007 | Kroger |
| 2007/0182843 A1 | 8/2007 | Shimamura et al. |
| 2007/0201859 A1 | 8/2007 | Sarrat et al. |
| 2007/0206241 A1 | 9/2007 | Smith et al. |
| 2007/0211164 A1 | 9/2007 | Olsen et al. |
| 2007/0216765 A1 | 9/2007 | Wong et al. |
| 2007/0228256 A1 | 10/2007 | Mentzer et al. |
| 2007/0247517 A1 | 10/2007 | Zhang et al. |
| 2007/0257184 A1 | 11/2007 | Olsen et al. |
| 2007/0258006 A1 | 11/2007 | Olsen et al. |
| 2007/0258706 A1 | 11/2007 | Raskar et al. |
| 2007/0263113 A1 | 11/2007 | Baek et al. |
| 2007/0263114 A1 | 11/2007 | Gurevich et al. |
| 2007/0268374 A1 | 11/2007 | Robinson |
| 2007/0296832 A1 | 12/2007 | Ota et al. |
| 2007/0296835 A1 | 12/2007 | Olsen et al. |
| 2007/0296847 A1 | 12/2007 | Chang et al. |
| 2007/0296696 A1 | 12/2007 | Hamza et al. |
| 2008/0006859 A1 | 1/2008 | Mionetto et al. |
| 2008/0019611 A1 | 1/2008 | Larkin |
| 2008/0024683 A1 | 1/2008 | Damera-Venkata et al. |
| 2008/0025649 A1 | 1/2008 | Liu et al. |
| 2008/0030592 A1 | 2/2008 | Border et al. |
| 2008/0030597 A1 | 2/2008 | Olsen et al. |
| 2008/0043095 A1 | 2/2008 | Vetro et al. |
| 2008/0043096 A1 | 2/2008 | Vetro et al. |
| 2008/0044170 A1 | 2/2008 | Yap |
| 2008/0054518 A1 | 3/2008 | Ra et al. |
| 2008/0056302 A1 | 3/2008 | Erdal et al. |
| 2008/0062164 A1 | 3/2008 | Bassi et al. |
| 2008/0079805 A1 | 4/2008 | Takagi et al. |
| 2008/0080028 A1 | 4/2008 | Bakin et al. |
| 2008/0084486 A1 | 4/2008 | Enge et al. |
| 2008/0088793 A1 | 4/2008 | Sverdrup et al. |
| 2008/0095523 A1 | 4/2008 | Schilling-Benz et al. |
| 2008/0099804 A1 | 5/2008 | Venezia et al. |
| 2008/0106620 A1 | 5/2008 | Sawachi et al. |
| 2008/0112059 A1 | 5/2008 | Choi et al. |
| 2008/0112635 A1 | 5/2008 | Kondo et al. |
| 2008/0118241 A1 | 5/2008 | Tekolste et al. |
| 2008/0131019 A1 | 6/2008 | Ng |
| 2008/0131107 A1 | 6/2008 | Ueno |
| 2008/0151097 A1 | 6/2008 | Chen et al. |
| 2008/0152215 A1 | 6/2008 | Horie et al. |
| 2008/0152296 A1 | 6/2008 | Oh et al. |
| 2008/0156991 A1 | 7/2008 | Hu et al. |
| 2008/0158259 A1 | 7/2008 | Kempf et al. |
| 2008/0158375 A1 | 7/2008 | Kakkori et al. |
| 2008/0158698 A1 | 7/2008 | Chang et al. |

(56) References Cited

U.S. PATENT DOCUMENTS

| | | |
|---|---|---|
| 2008/0165257 A1 | 7/2008 | Boettiger et al. |
| 2008/0174670 A1 | 7/2008 | Olsen et al. |
| 2008/0187305 A1 | 8/2008 | Raskar et al. |
| 2008/0193026 A1 | 8/2008 | Horie et al. |
| 2008/0211737 A1 | 9/2008 | Kim et al. |
| 2008/0218610 A1 | 9/2008 | Chapman et al. |
| 2008/0218612 A1 | 9/2008 | Border et al. |
| 2008/0219654 A1 | 9/2008 | Border et al. |
| 2008/0239116 A1 | 10/2008 | Smith |
| 2008/0240598 A1 | 10/2008 | Hasegawa |
| 2008/0247638 A1 | 10/2008 | Tanida et al. |
| 2008/0247653 A1 | 10/2008 | Moussavi et al. |
| 2008/0272416 A1 | 11/2008 | Yun |
| 2008/0273751 A1 | 11/2008 | Yuan et al. |
| 2008/0278591 A1 | 11/2008 | Barna et al. |
| 2008/0278610 A1 | 11/2008 | Boettiger et al. |
| 2008/0284880 A1 | 11/2008 | Numata |
| 2008/0291295 A1 | 11/2008 | Kato et al. |
| 2008/0298674 A1 | 12/2008 | Baker et al. |
| 2008/0310501 A1 | 12/2008 | Ward et al. |
| 2009/0027543 A1 | 1/2009 | Kanehiro et al. |
| 2009/0050946 A1 | 2/2009 | Duparre et al. |
| 2009/0052743 A1 | 2/2009 | Techmer |
| 2009/0060281 A1 | 3/2009 | Tanida et al. |
| 2009/0086074 A1 | 4/2009 | Li et al. |
| 2009/0091645 A1 | 4/2009 | Trimeche et al. |
| 2009/0091806 A1 | 4/2009 | Inuiya |
| 2009/0096050 A1 | 4/2009 | Park |
| 2009/0102956 A1 | 4/2009 | Georgiev |
| 2009/0109306 A1 | 4/2009 | Shan |
| 2009/0128644 A1 | 5/2009 | Camp, Jr. et al. |
| 2009/0128833 A1 | 5/2009 | Yahav |
| 2009/0129667 A1 | 5/2009 | Ho |
| 2009/0140131 A1 | 6/2009 | Utagawa et al. |
| 2009/0147919 A1 | 6/2009 | Goto et al. |
| 2009/0152664 A1 | 6/2009 | Klem et al. |
| 2009/0167922 A1 | 7/2009 | Perlman et al. |
| 2009/0179142 A1 | 7/2009 | Duparre et al. |
| 2009/0180021 A1 | 7/2009 | Kikuchi et al. |
| 2009/0200622 A1 | 8/2009 | Tai et al. |
| 2009/0201371 A1 | 8/2009 | Matsuda et al. |
| 2009/0207235 A1 | 8/2009 | Francini et al. |
| 2009/0219435 A1 | 9/2009 | Yuan |
| 2009/0225203 A1 | 9/2009 | Tanida et al. |
| 2009/0237520 A1 | 9/2009 | Kaneko et al. |
| 2009/0245573 A1 | 10/2009 | Saptharishi et al. |
| 2009/0256947 A1 | 10/2009 | Ciurea et al. |
| 2009/0263017 A1 | 10/2009 | Tanbakuchi |
| 2009/0268192 A1 | 10/2009 | Koenck et al. |
| 2009/0268970 A1 | 10/2009 | Babacan et al. |
| 2009/0268983 A1 | 10/2009 | Stone et al. |
| 2009/0274387 A1 | 11/2009 | Jin |
| 2009/0284651 A1 | 11/2009 | Srinivasan |
| 2009/0297056 A1 | 12/2009 | Lelescu et al. |
| 2009/0302205 A9 | 12/2009 | Olsen et al. |
| 2009/0323195 A1 | 12/2009 | Hembree et al. |
| 2009/0323206 A1 | 12/2009 | Oliver et al. |
| 2009/0324118 A1 | 12/2009 | Maslov et al. |
| 2010/0002126 A1 | 1/2010 | Wenstrand et al. |
| 2010/0002313 A1 | 1/2010 | Duparre et al. |
| 2010/0002314 A1 | 1/2010 | Duparre |
| 2010/0007714 A1 | 1/2010 | Kim et al. |
| 2010/0013927 A1 | 1/2010 | Nixon |
| 2010/0044815 A1 | 2/2010 | Chang et al. |
| 2010/0053342 A1 | 3/2010 | Hwang |
| 2010/0053600 A1 | 3/2010 | Tanida |
| 2010/0060746 A9 | 3/2010 | Olsen et al. |
| 2010/0073463 A1 | 3/2010 | Momonoi et al. |
| 2010/0074532 A1 | 3/2010 | Gordon et al. |
| 2010/0085425 A1 | 4/2010 | Tan |
| 2010/0086227 A1 | 4/2010 | Sun et al. |
| 2010/0091389 A1 | 4/2010 | Henriksen et al. |
| 2010/0097491 A1 | 4/2010 | Farina et al. |
| 2010/0103259 A1 | 4/2010 | Tanida et al. |
| 2010/0103308 A1 | 4/2010 | Butterfield et al. |
| 2010/0111444 A1 | 5/2010 | Coffman |
| 2010/0118127 A1 | 5/2010 | Nam |
| 2010/0128145 A1 | 5/2010 | Pitts et al. |
| 2010/0133230 A1 | 6/2010 | Henriksen et al. |
| 2010/0133418 A1 | 6/2010 | Sargent et al. |
| 2010/0141802 A1 | 6/2010 | Knight |
| 2010/0142839 A1 | 6/2010 | Lakus-Becker |
| 2010/0157073 A1 | 6/2010 | Kondo et al. |
| 2010/0165152 A1 | 7/2010 | Lim |
| 2010/0166410 A1 | 7/2010 | Chang |
| 2010/0177411 A1 | 7/2010 | Hegde et al. |
| 2010/0194901 A1 | 8/2010 | van Hoorebeke et al. |
| 2010/0195716 A1 | 8/2010 | Klein et al. |
| 2010/0201834 A1 | 8/2010 | Maruyama et al. |
| 2010/0202054 A1 | 8/2010 | Niederer |
| 2010/0202683 A1 | 8/2010 | Robinson |
| 2010/0208100 A9 | 8/2010 | Olsen et al. |
| 2010/0220212 A1 | 9/2010 | Perlman et al. |
| 2010/0223237 A1 | 9/2010 | Mishra et al. |
| 2010/0231285 A1 | 9/2010 | Boomer et al. |
| 2010/0238327 A1 | 9/2010 | Griffith et al. |
| 2010/0244165 A1 | 9/2010 | Lake et al. |
| 2010/0259610 A1 | 10/2010 | Petersen et al. |
| 2010/0265346 A1 | 10/2010 | Iizuka |
| 2010/0265381 A1 | 10/2010 | Yamamoto et al. |
| 2010/0265385 A1 | 10/2010 | Knight et al. |
| 2010/0281070 A1 | 11/2010 | Chan et al. |
| 2010/0302423 A1 | 12/2010 | Adams, Jr. et al. |
| 2010/0309292 A1 | 12/2010 | Ho et al. |
| 2010/0309368 A1 | 12/2010 | Choi et al. |
| 2010/0321595 A1 | 12/2010 | Chiu et al. |
| 2010/0321640 A1 | 12/2010 | Yeh et al. |
| 2011/0001037 A1 | 1/2011 | Tewinkle |
| 2011/0018973 A1 | 1/2011 | Takayama |
| 2011/0019243 A1 | 1/2011 | Constant, Jr. et al. |
| 2011/0031381 A1 | 2/2011 | Tay et al. |
| 2011/0032370 A1 | 2/2011 | Ludwig |
| 2011/0033129 A1 | 2/2011 | Robinson |
| 2011/0043661 A1 | 2/2011 | Podoleanu |
| 2011/0043665 A1 | 2/2011 | Ogasahara |
| 2011/0043668 A1 | 2/2011 | McKinnon et al. |
| 2011/0044502 A1 | 2/2011 | Liu et al. |
| 2011/0051255 A1 | 3/2011 | Lee et al. |
| 2011/0055729 A1 | 3/2011 | Mason et al. |
| 2011/0069189 A1 | 3/2011 | Venkataraman et al. |
| 2011/0080487 A1 | 4/2011 | Venkataraman et al. |
| 2011/0085028 A1 | 4/2011 | Samadani et al. |
| 2011/0090217 A1 | 4/2011 | Mashitani et al. |
| 2011/0108708 A1 | 5/2011 | Olsen et al. |
| 2011/0121421 A1 | 5/2011 | Charbon |
| 2011/0122308 A1 | 5/2011 | Duparre |
| 2011/0128393 A1 | 6/2011 | Tavi et al. |
| 2011/0128412 A1 | 6/2011 | Milnes et al. |
| 2011/0129165 A1 | 6/2011 | Lim et al. |
| 2011/0149408 A1 | 6/2011 | Hahgholt et al. |
| 2011/0149409 A1 | 6/2011 | Haugholt et al. |
| 2011/0153248 A1 | 6/2011 | Gu et al. |
| 2011/0157321 A1 | 6/2011 | Nakajima et al. |
| 2011/0169994 A1 | 7/2011 | DiFrancesco et al. |
| 2011/0176020 A1 | 7/2011 | Chang |
| 2011/0181797 A1 | 7/2011 | Galstian et al. |
| 2011/0206291 A1 | 8/2011 | Kashani et al. |
| 2011/0211824 A1 | 9/2011 | Georgiev et al. |
| 2011/0221599 A1 | 9/2011 | Högasten |
| 2011/0221658 A1 | 9/2011 | Haddick et al. |
| 2011/0221939 A1 | 9/2011 | Jerdev |
| 2011/0221950 A1 | 9/2011 | Oostra et al. |
| 2011/0228142 A1 | 9/2011 | Brueckner et al. |
| 2011/0228144 A1 | 9/2011 | Tian et al. |
| 2011/0234841 A1 | 9/2011 | Akeley et al. |
| 2011/0241234 A1 | 10/2011 | Duparre |
| 2011/0242342 A1 | 10/2011 | Goma et al. |
| 2011/0242355 A1 | 10/2011 | Goma et al. |
| 2011/0242356 A1 | 10/2011 | Aleksic et al. |
| 2011/0255592 A1 | 10/2011 | Sung et al. |
| 2011/0255745 A1 | 10/2011 | Hodder et al. |
| 2011/0255786 A1 | 10/2011 | Hunter et al. |
| 2011/0261993 A1 | 10/2011 | Weiming et al. |
| 2011/0267348 A1 | 11/2011 | Lin |

(56) References Cited

U.S. PATENT DOCUMENTS

| | | |
|---|---|---|
| 2011/0273531 A1 | 11/2011 | Ito et al. |
| 2011/0274366 A1 | 11/2011 | Tardif |
| 2011/0279705 A1 | 11/2011 | Kuang et al. |
| 2011/0279721 A1 | 11/2011 | McMahon |
| 2011/0285866 A1 | 11/2011 | Bhrugumalla et al. |
| 2011/0285910 A1 | 11/2011 | Bamji et al. |
| 2011/0292216 A1 | 12/2011 | Fergus et al. |
| 2011/0298917 A1 | 12/2011 | Yanagita |
| 2011/0300929 A1 | 12/2011 | Tardif et al. |
| 2011/0310980 A1 | 12/2011 | Mathew |
| 2011/0316968 A1 | 12/2011 | Taguchi et al. |
| 2011/0317766 A1 | 12/2011 | Lim et al. |
| 2012/0012748 A1 | 1/2012 | Pain et al. |
| 2012/0019700 A1 | 1/2012 | Gaber |
| 2012/0023456 A1 | 1/2012 | Sun et al. |
| 2012/0026297 A1 | 2/2012 | Sato |
| 2012/0026342 A1 | 2/2012 | Yu et al. |
| 2012/0026366 A1 | 2/2012 | Golan et al. |
| 2012/0026451 A1 | 2/2012 | Nystrom |
| 2012/0039525 A1 | 2/2012 | Tian et al. |
| 2012/0044249 A1 | 2/2012 | Mashitani et al. |
| 2012/0044372 A1 | 2/2012 | Côté et al. |
| 2012/0056982 A1 | 3/2012 | Katz et al. |
| 2012/0062697 A1 | 3/2012 | Treado et al. |
| 2012/0062702 A1 | 3/2012 | Jiang et al. |
| 2012/0062756 A1 | 3/2012 | Tian et al. |
| 2012/0069235 A1 | 3/2012 | Imai |
| 2012/0081519 A1 | 4/2012 | Goma |
| 2012/0105691 A1 | 5/2012 | Waqas et al. |
| 2012/0113318 A1 | 5/2012 | Galstian et al. |
| 2012/0113413 A1 | 5/2012 | Miahczylowicz-Wolski et al. |
| 2012/0147139 A1 | 6/2012 | Li et al. |
| 2012/0147205 A1 | 6/2012 | Lelescu et al. |
| 2012/0153153 A1 | 6/2012 | Chang et al. |
| 2012/0154551 A1 | 6/2012 | Inoue |
| 2012/0155830 A1 | 6/2012 | Sasaki et al. |
| 2012/0163672 A1 | 6/2012 | McKinnon |
| 2012/0169433 A1 | 7/2012 | Mullins |
| 2012/0170134 A1 | 7/2012 | Bolis et al. |
| 2012/0176479 A1 | 7/2012 | Mayhew et al. |
| 2012/0188341 A1 | 7/2012 | Klein Gunnewiek et al. |
| 2012/0188389 A1 | 7/2012 | Lin et al. |
| 2012/0188420 A1 | 7/2012 | Black et al. |
| 2012/0188634 A1 | 7/2012 | Kubala et al. |
| 2012/0198677 A1 | 8/2012 | Duparre |
| 2012/0200669 A1 | 8/2012 | Lai |
| 2012/0200726 A1 | 8/2012 | Bugnariu |
| 2012/0200734 A1 | 8/2012 | Tang |
| 2012/0219236 A1 | 8/2012 | Ali et al. |
| 2012/0224083 A1 | 9/2012 | Jovanovski et al. |
| 2012/0229602 A1 | 9/2012 | Chen et al. |
| 2012/0229628 A1 | 9/2012 | Ishiyama et al. |
| 2012/0249550 A1 | 10/2012 | Akeley et al. |
| 2012/0249750 A1 | 10/2012 | Izzat et al. |
| 2012/0249836 A1 | 10/2012 | Ali et al. |
| 2012/0249853 A1 | 10/2012 | Krolczyk et al. |
| 2012/0262601 A1 | 10/2012 | Choi et al. |
| 2012/0262607 A1 | 10/2012 | Shimura et al. |
| 2012/0268574 A1 | 10/2012 | Gidon |
| 2012/0287291 A1 | 11/2012 | McMahon et al. |
| 2012/0293695 A1 | 11/2012 | Tanaka |
| 2012/0307084 A1 | 12/2012 | Mantzel |
| 2012/0307099 A1 | 12/2012 | Yahata et al. |
| 2012/0314033 A1 | 12/2012 | Lee et al. |
| 2012/0314937 A1 | 12/2012 | Kim et al. |
| 2012/0327222 A1 | 12/2012 | Ng et al. |
| 2013/0002828 A1 | 1/2013 | Ding et al. |
| 2013/0003184 A1 | 1/2013 | Duparre |
| 2013/0010073 A1 | 1/2013 | Do |
| 2013/0016885 A1 | 1/2013 | Tsujimoto et al. |
| 2013/0022111 A1 | 1/2013 | Chen et al. |
| 2013/0027580 A1 | 1/2013 | Olsen et al. |
| 2013/0033579 A1 | 2/2013 | Wajs |
| 2013/0033585 A1 | 2/2013 | Li et al. |
| 2013/0038696 A1 | 2/2013 | Ding et al. |
| 2013/0050504 A1 | 2/2013 | Safaee-Rad et al. |
| 2013/0050526 A1 | 2/2013 | Keelan |
| 2013/0057710 A1 | 3/2013 | McMahon |
| 2013/0070060 A1 | 3/2013 | Chatterjee et al. |
| 2013/0076967 A1 | 3/2013 | Brunner et al. |
| 2013/0077880 A1 | 3/2013 | Venkataraman et al. |
| 2013/0077882 A1 | 3/2013 | Venkataraman et al. |
| 2013/0083172 A1 | 4/2013 | Baba |
| 2013/0088489 A1 | 4/2013 | Schmeitz et al. |
| 2013/0088637 A1 | 4/2013 | Duparre |
| 2013/0093842 A1 | 4/2013 | Yahata |
| 2013/0107061 A1 | 5/2013 | Kumar et al. |
| 2013/0113899 A1 | 5/2013 | Morohoshi et al. |
| 2013/0113939 A1 | 5/2013 | Strandemar |
| 2013/0120605 A1 | 5/2013 | Georgiev et al. |
| 2013/0121559 A1 | 5/2013 | Hu |
| 2013/0128068 A1 | 5/2013 | Georgiev et al. |
| 2013/0128069 A1 | 5/2013 | Georgiev et al. |
| 2013/0128087 A1 | 5/2013 | Georgiev et al. |
| 2013/0128121 A1 | 5/2013 | Agarwala et al. |
| 2013/0147979 A1 | 6/2013 | McMahon et al. |
| 2013/0176394 A1 | 7/2013 | Tian et al. |
| 2013/0208138 A1 | 8/2013 | Li |
| 2013/0215108 A1 | 8/2013 | McMahon et al. |
| 2013/0215231 A1 | 8/2013 | Hiramoto et al. |
| 2013/0216144 A1 | 8/2013 | Robinson |
| 2013/0222556 A1 | 8/2013 | Shimada |
| 2013/0223759 A1 | 8/2013 | Nishiyama et al. |
| 2013/0229540 A1 | 9/2013 | Farina et al. |
| 2013/0230237 A1 | 9/2013 | Schlosser et al. |
| 2013/0250123 A1 | 9/2013 | Zhang et al. |
| 2013/0250150 A1 | 9/2013 | Malone |
| 2013/0259317 A1 | 10/2013 | Gaddy |
| 2013/0265459 A1 | 10/2013 | Duparre et al. |
| 2013/0274923 A1 | 10/2013 | By et al. |
| 2013/0293760 A1 | 11/2013 | Nisenzon et al. |
| 2014/0002674 A1 | 1/2014 | Duparre et al. |
| 2014/0009586 A1 | 1/2014 | McNamer et al. |
| 2014/0037137 A1 | 2/2014 | Broaddus et al. |
| 2014/0037140 A1 | 2/2014 | Benhimane et al. |
| 2014/0043507 A1 | 2/2014 | Wang et al. |
| 2014/0076336 A1 | 3/2014 | Clayton et al. |
| 2014/0078333 A1 | 3/2014 | Miao |
| 2014/0079336 A1 | 3/2014 | Venkataraman et al. |
| 2014/0092281 A1 | 4/2014 | Nisenzon et al. |
| 2014/0098267 A1 | 4/2014 | Tian et al. |
| 2014/0104490 A1 | 4/2014 | Hsieh et al. |
| 2014/0118493 A1 | 5/2014 | Sali et al. |
| 2014/0118584 A1 | 5/2014 | Lee et al. |
| 2014/0132810 A1 | 5/2014 | McMahon |
| 2014/0146201 A1 | 5/2014 | Knight et al. |
| 2014/0176592 A1 | 6/2014 | Wilburn et al. |
| 2014/0186045 A1 | 7/2014 | Poddar et al. |
| 2014/0192253 A1 | 7/2014 | Laroia |
| 2014/0198188 A1 | 7/2014 | Izawa |
| 2014/0204183 A1 | 7/2014 | Lee et al. |
| 2014/0218546 A1 | 8/2014 | McMahon |
| 2014/0232822 A1 | 8/2014 | Venkataraman et al. |
| 2014/0240528 A1 | 8/2014 | Venkataraman et al. |
| 2014/0240529 A1 | 8/2014 | Venkataraman et al. |
| 2014/0253738 A1 | 9/2014 | Mullis |
| 2014/0267243 A1 | 9/2014 | Venkataraman et al. |
| 2014/0267286 A1 | 9/2014 | Duparre |
| 2014/0267633 A1 | 9/2014 | Venkataraman et al. |
| 2014/0267762 A1 | 9/2014 | Mullis et al. |
| 2014/0267890 A1 | 9/2014 | Lelescu et al. |
| 2014/0285675 A1 | 9/2014 | Mullis |
| 2014/0313315 A1 | 10/2014 | Shoham et al. |
| 2014/0321712 A1 | 10/2014 | Ciurea et al. |
| 2014/0333731 A1 | 11/2014 | Venkataraman et al. |
| 2014/0333764 A1 | 11/2014 | Venkataraman et al. |
| 2014/0333787 A1 | 11/2014 | Venkataraman et al. |
| 2014/0340539 A1 | 11/2014 | Venkataraman et al. |
| 2014/0347509 A1 | 11/2014 | Venkataraman et al. |
| 2014/0347748 A1 | 11/2014 | Duparre |
| 2014/0354773 A1 | 12/2014 | Venkataraman et al. |
| 2014/0354843 A1 | 12/2014 | Venkataraman et al. |
| 2014/0354844 A1 | 12/2014 | Venkataraman et al. |
| 2014/0354853 A1 | 12/2014 | Venkataraman et al. |

(56) References Cited

U.S. PATENT DOCUMENTS

| | | |
|---|---|---|
| 2014/0354854 A1 | 12/2014 | Venkataraman et al. |
| 2014/0354855 A1 | 12/2014 | Venkataraman et al. |
| 2014/0355870 A1 | 12/2014 | Venkataraman et al. |
| 2014/0368662 A1 | 12/2014 | Venkataraman et al. |
| 2014/0368683 A1 | 12/2014 | Venkataraman et al. |
| 2014/0368684 A1 | 12/2014 | Venkataraman et al. |
| 2014/0368685 A1 | 12/2014 | Venkataraman et al. |
| 2014/0368686 A1 | 12/2014 | Duparre |
| 2014/0369612 A1 | 12/2014 | Venkataraman et al. |
| 2014/0369615 A1 | 12/2014 | Venkataraman et al. |
| 2014/0376825 A1 | 12/2014 | Venkataraman et al. |
| 2014/0376826 A1 | 12/2014 | Venkataraman et al. |
| 2015/0002734 A1 | 1/2015 | Lee |
| 2015/0003752 A1 | 1/2015 | Venkataraman et al. |
| 2015/0003753 A1 | 1/2015 | Venkataraman et al. |
| 2015/0009353 A1 | 1/2015 | Venkataraman et al. |
| 2015/0009354 A1 | 1/2015 | Venkataraman et al. |
| 2015/0009362 A1 | 1/2015 | Venkataraman et al. |
| 2015/0015669 A1 | 1/2015 | Venkataraman et al. |
| 2015/0035992 A1 | 2/2015 | Mullis |
| 2015/0036014 A1 | 2/2015 | Lelescu et al. |
| 2015/0036015 A1 | 2/2015 | Lelescu et al. |
| 2015/0042766 A1 | 2/2015 | Ciurea et al. |
| 2015/0042767 A1 | 2/2015 | Ciurea et al. |
| 2015/0042833 A1 | 2/2015 | Lelescu et al. |
| 2015/0049915 A1 | 2/2015 | Ciurea et al. |
| 2015/0049916 A1 | 2/2015 | Ciurea et al. |
| 2015/0049917 A1 | 2/2015 | Ciurea et al. |
| 2015/0055884 A1 | 2/2015 | Venkataraman et al. |
| 2015/0085174 A1 | 3/2015 | Shabtay et al. |
| 2015/0091900 A1 | 4/2015 | Yang et al. |
| 2015/0104101 A1 | 4/2015 | Bryant et al. |
| 2015/0122411 A1 | 5/2015 | Rodda et al. |
| 2015/0124113 A1 | 5/2015 | Rodda et al. |
| 2015/0124151 A1 | 5/2015 | Rodda et al. |
| 2015/0146029 A1 | 5/2015 | Venkataraman et al. |
| 2015/0146030 A1 | 5/2015 | Venkataraman et al. |
| 2015/0199841 A1 | 7/2015 | Venkataraman et al. |
| 2015/0243480 A1 | 8/2015 | Yamada et al. |
| 2015/0296137 A1 | 10/2015 | Duparre et al. |
| 2015/0312455 A1 | 10/2015 | Venkataraman et al. |
| 2015/0326852 A1 | 11/2015 | Duparre et al. |
| 2015/0373261 A1 | 12/2015 | Rodda et al. |
| 2016/0037097 A1 | 2/2016 | Duparre |
| 2016/0044252 A1 | 2/2016 | Molina |
| 2016/0044257 A1 | 2/2016 | Venkataraman et al. |
| 2016/0057332 A1 | 2/2016 | Ciurea et al. |
| 2016/0165106 A1 | 6/2016 | Duparre |
| 2016/0165134 A1 | 6/2016 | Lelescu et al. |
| 2016/0165147 A1 | 6/2016 | Nisenzon et al. |
| 2016/0165212 A1 | 6/2016 | Mullis |
| 2016/0195733 A1 | 7/2016 | Lelescu et al. |
| 2016/0227195 A1 | 8/2016 | Venkataraman et al. |
| 2016/0249001 A1 | 8/2016 | McMahon |
| 2016/0255333 A1 | 9/2016 | Nisenzon et al. |
| 2016/0266284 A1 | 9/2016 | Duparre et al. |
| 2016/0267665 A1 | 9/2016 | Venkataraman et al. |
| 2016/0267672 A1 | 9/2016 | Ciurea et al. |
| 2016/0269626 A1 | 9/2016 | McMahon |
| 2016/0269627 A1 | 9/2016 | McMahon |
| 2016/0269650 A1 | 9/2016 | Venkataraman et al. |
| 2016/0269651 A1 | 9/2016 | Venkataraman et al. |
| 2016/0309084 A1 | 10/2016 | Venkataraman et al. |
| 2016/0316140 A1 | 10/2016 | Nayar et al. |

FOREIGN PATENT DOCUMENTS

| | | |
|---|---|---|
| CN | 101102388 A | 1/2008 |
| CN | 101147392 A | 3/2008 |
| CN | 101427372 A | 5/2009 |
| CN | 101606086 A | 12/2009 |
| CN | 101883291 A | 11/2010 |
| CN | 102037717 A | 4/2011 |
| CN | 102375199 A | 3/2012 |
| EP | 0677821 A2 | 10/1995 |
| EP | 840502 A2 | 5/1998 |
| EP | 1201407 A2 | 5/2002 |
| EP | 1734766 A2 | 12/2006 |
| EP | 2026563 A1 | 2/2009 |
| EP | 2104334 A1 | 9/2009 |
| EP | 2244484 A1 | 10/2010 |
| EP | 2336816 A2 | 6/2011 |
| GB | 2482022 A | 1/2012 |
| JP | 59025483 | 9/1984 |
| JP | 64037177 | 7/1989 |
| JP | 02285772 A | 11/1990 |
| JP | 0715457 A | 1/1995 |
| JP | 09181913 A | 7/1997 |
| JP | 11142609 A | 5/1999 |
| JP | 11223708 A | 8/1999 |
| JP | 2000209503 A | 7/2000 |
| JP | 2001008235 A2 | 1/2001 |
| JP | 2001194114 A2 | 7/2001 |
| JP | 2001264033 A2 | 9/2001 |
| JP | 2001277260 A | 10/2001 |
| JP | 2001337263 A2 | 12/2001 |
| JP | 2002195910 A | 7/2002 |
| JP | 2002205310 A | 7/2002 |
| JP | 2002252338 A | 9/2002 |
| JP | 2003094445 A | 4/2003 |
| JP | 2003139910 A | 5/2003 |
| JP | 2003163938 A | 6/2003 |
| JP | 2003298920 A | 10/2003 |
| JP | 2004221585 A | 8/2004 |
| JP | 2005116022 A | 4/2005 |
| JP | 2005181460 A | 7/2005 |
| JP | 2005295381 A | 10/2005 |
| JP | 2005354124 A | 12/2005 |
| JP | 2006033493 A | 2/2006 |
| JP | 2006047944 A | 2/2006 |
| JP | 2006258930 A | 9/2006 |
| JP | 2007520107 A | 7/2007 |
| JP | 2007259136 A | 10/2007 |
| JP | 2008039852 A | 2/2008 |
| JP | 2008055908 A | 3/2008 |
| JP | 2008507874 A | 3/2008 |
| JP | 2008258885 A | 10/2008 |
| JP | 2009132010 A | 6/2009 |
| JP | 2009300268 A | 12/2009 |
| JP | 2011017764 A | 1/2011 |
| JP | 2011030184 A | 2/2011 |
| JP | 2011109484 A | 6/2011 |
| JP | 2013526801 A | 6/2013 |
| JP | 2014521117 A | 8/2014 |
| KR | 20110097647 A | 8/2011 |
| TW | 200828994 A | 7/2008 |
| TW | 200939739 A | 9/2009 |
| WO | 2007083579 A1 | 7/2007 |
| WO | 2008045198 A2 | 4/2008 |
| WO | 2008108271 A1 | 9/2008 |
| WO | 2008108926 A1 | 9/2008 |
| WO | 2008150817 A1 | 12/2008 |
| WO | 2009151903 A2 | 12/2009 |
| WO | 2009157273 A1 | 12/2009 |
| WO | 2011008443 A2 | 1/2011 |
| WO | 2011055655 A1 | 5/2011 |
| WO | 2011063347 A2 | 5/2011 |
| WO | 2011063347 A3 | 5/2011 |
| WO | 2011105814 A2 | 9/2011 |
| WO | 2011116203 A1 | 9/2011 |
| WO | 2011143501 A1 | 11/2011 |
| WO | 2012057619 A1 | 5/2012 |
| WO | 2012057620 A2 | 5/2012 |
| WO | 2012057620 A3 | 5/2012 |
| WO | 2012057621 A1 | 5/2012 |
| WO | 2012057622 A1 | 5/2012 |
| WO | 2012057623 A1 | 5/2012 |
| WO | 2012074361 A1 | 6/2012 |
| WO | 2012078126 A1 | 6/2012 |
| WO | 2012082904 A1 | 6/2012 |
| WO | 2012155119 A1 | 11/2012 |
| WO | 2013003276 A1 | 1/2013 |
| WO | 2013043751 A1 | 3/2013 |
| WO | 2013043761 A1 | 3/2013 |

(56) References Cited

FOREIGN PATENT DOCUMENTS

| | | | |
|---|---|---|---|
| WO | 2013049699 | A1 | 4/2013 |
| WO | 2013055960 | A1 | 4/2013 |
| WO | 2013119706 | A1 | 8/2013 |
| WO | 2013126578 | A1 | 8/2013 |
| WO | 2014032020 | A3 | 2/2014 |
| WO | 2014052974 | A2 | 4/2014 |
| WO | 2014078443 | A1 | 5/2014 |
| WO | 2014130849 | A1 | 8/2014 |
| WO | 2014133974 | A1 | 9/2014 |
| WO | 2014138695 | A1 | 9/2014 |
| WO | 2014138697 | A1 | 9/2014 |
| WO | 2014144157 | A1 | 9/2014 |
| WO | 2014145856 | A1 | 9/2014 |
| WO | 2014149403 | A1 | 9/2014 |
| WO | 2014149902 | A1 | 9/2014 |
| WO | 2014150856 | A1 | 9/2014 |
| WO | 2014159721 | A1 | 10/2014 |
| WO | 2014159779 | A1 | 10/2014 |
| WO | 2014160142 | A1 | 10/2014 |
| WO | 2014164550 | A2 | 10/2014 |
| WO | 2014164909 | A1 | 10/2014 |
| WO | 2014165244 | A1 | 10/2014 |
| WO | 2014133974 | A9 | 4/2015 |
| WO | 2015048694 | A2 | 4/2015 |
| WO | 2015070105 | A1 | 5/2015 |
| WO | 2015081279 | A1 | 6/2015 |
| WO | 2016167814 | A1 | 10/2016 |

OTHER PUBLICATIONS

US 8,964,053, 02/2015, Venkataraman et al. (withdrawn)
US 8,965,058, 02/2015, Venkataraman et al. (withdrawn)
US 9,014,491, 04/2015, Venkataraman et al. (withdrawn)
International Search Report and Written Opinion for International Application PCT/US2014/022123, completed Jun. 9, 2014, Mailed Jun. 25, 2014, 5 pgs.
International Search Report and Written Opinion for International Application PCT/US2014/023762, Completed May 30, 2014, Mailed Jul. 3, 2014, 6 Pgs.
International Search Report and Written Opinion for International Application PCT/US2014/024903, completed Jun. 12, 2014, Mailed, Jun. 27, 2014, 13 pgs.
International Search Report and Written Opinion for International Application PCT/US2014/024947, Completed Jul. 8, 2014, Mailed Aug. 5, 2014, 8 Pgs.
International Search Report and Written Opinion for International Application PCT/US2014/028447, completed Jun. 30, 2014, Mailed Jul. 21, 2014, 8 Pgs.
International Search Report and Written Opinion for International Application PCT/US2014/030692, completed Jul. 28, 2014, Mailed Aug. 27, 2014, 7 Pgs.
International Search Report and Written Opinion for International Application PCT/US2014/064693, Completed Mar. 7, 2015, Mailed Apr. 2, 2015, 15 pgs.
International Search Report and Written Opinion for International Application PCT/US2014/066229, Completed Mar. 6, 2015, Mailed Mar. 19, 2015, 9 Pgs.
International Search Report and Written Opinion for International Application PCT/US2014/067740, Completed Jan. 29, 2015, Mailed Mar. 3, 2015, 10 pgs.
Office Action for U.S. Appl. No. 12/952,106, dated Aug. 16, 2012, 12 pgs.
"File Formats Version 6", Alias Systems, 2004, 40 pgs.
Baker et al., "Limits on Super-Resolution and How to Break Them", IEEE Transactions on Pattern Analysis and Machine Intelligence, Sep. 2002, vol. 24, No. 9, pp. 1167-1183.
Bennett et al., "Multispectral Bilateral Video Fusion", 2007 IEEE Transactions on Image Processing, vol. 16, No. 5, May 2007, pp. 1185-1194.
Bertero et al., "Super-resolution in computational imaging", Micron, 2003, vol. 34, Issues 6-7, 17 pgs.
Bishop et al., "Full-Resolution Depth Map Estimation from an Aliased Plenoptic Light Field", ACCV 2010, Part II, LNCS 6493, 2011, pp. 186-200.
Bishop et al., "Light Field Superresolution", Computational Photography (ICCP), 2009 IEEE International Conference, 2009, 9 pgs.
Bishop et al., "The Light Field Camera: Extended Depth of Field, Aliasing, and Superresolution", IEEE Transactions on Pattern Analysis and Machine Intelligence, May 2012, vol. 34, No. 5, pp. 972-986.
Borman, "Topics in Multiframe Superresolution Restoration", Thesis of Sean Borman, Apr. 2004, 282 pgs.
Borman et al, "Image Sequence Processing", Dekker Encyclopedia of Optical Engineering, Oct. 14, 2002, 81 pgs.
Borman et al., "Block-Matching Sub-Pixel Motion Estimation from Noisy, Under-Sampled Frames—An Empirical Performance Evaluation", Proc SPIE, Dec. 1998, vol. 3653, 10 pgs.
Borman et al., "Image Resampling and Constraint Formulation for Multi-Frame Super-Resolution Restoration", Proc. SPIE, Jun. 2003, vol. 5016, 12 pgs.
Borman et al., "Linear models for multi-frame super-resolution restoration under non-affine registration and spatially varying PSF", Proc. SPIE, May 2004, vol. 5299, 12 pgs.
Borman et al., "Nonlinear Prediction Methods for Estimation of Clique Weighting Parameters in NonGaussian Image Models", Proc. SPIE, 1998, vol. 3459, 9 pgs.
Borman et al., "Simultaneous Multi-Frame MAP Super-Resolution Video Enhancement Using Spatio-Temporal Priors", Image Processing, ICIP '99 Proceedings, vol. 3, 1999, pp. 469-473.
Borman et al., "Super-Resolution from Image Sequences—A Review", Circuits & Systems, 1998, pp. 374-378.
Bose et al., "Superresolution and Noise Filtering Using Moving Least Squares", IEEE Transactions on Image Processing, Aug. 2006, vol. 15, Issue 8, pp. 2239-2248.
Boys et al., "Comparison of Subpixel Image Registration Algorithms", Proc. of SPIE—IS&T Electronic Imaging, Feb. 2009, vol. 7246, pp. 72460X-1-72460X-9; doi: 10.1117/12.810369.
Bruckner et al., "Artificial compound eye applying hyperacuity", Optics Express, Dec. 11, 2006, vol. 14, No. 25, pp. 12076-12084.
Bruckner et al., "Driving microoptical imaging systems towards miniature camera applications", Proc. SPIE, Micro-Optics, 2010, 11 pgs.
Bruckner et al., "Thin wafer-level camera lenses inspired by insect compound eyes", Optics Express, Nov. 22, 2010, vol. 18, No. 24, pp. 24379-24394.
Capel, "Image Mosaicing and Super-resolution", Retrieved on Nov. 10, 2012, Retrieved from the Internet at URL:<http://citeseerx.ist.psu.edu/viewdoc/download?doi=10.1.1.226.2643&rep=rep1&type=pdf>, 2001, 269 pgs.
Chan et al., "Extending the Depth of Field in a Compound-Eye Imaging System with Super-Resolution Reconstruction", Proceedings—International Conference on Pattern Recognition, 2006, vol. 3, pp. 623-626.
Chan et al., "Investigation of Computational Compound-Eye Imaging System with Super-Resolution Reconstruction", IEEE, ICASSP 2006, 2006, pp. 1177-1180.
Chan et al., "Super-resolution reconstruction in a computational compound-eye imaging system", Multidim Syst Sign Process, 2007, vol. 18, pp. 83-101.
Chen et al., "Interactive deformation of light fields", In Proceedings of SIGGRAPH I3D 2005, 2005, pp. 139-146.
Chen et al., "KNN Matting", IEEE Transactions on Pattern Analysis and Machine Intelligence, Sep. 2013, vol. 35, No. 9, pp. 2175-2188.
Crabb et al., "Real-time foreground segmentation via range and color imaging", Computer Vision and Pattern Recognition Workshops, CVPRW'08, IEEE Computer Society Conference on IEEE, 2008, 5 pgs.
Drouin et al., "Fast Multiple-Baseline Stereo with Occlusion", Proceedings of the Fifth International Conference on 3-D Digital Imaging and Modeling, 2005, 8 pgs.
Drouin et al., "Geo-Consistency for Wide Multi-Camera Stereo", Proceedings of the 2005 IEEE Computer Society Conference on Computer Vision and Pattern Recognition, 2005, 8 pgs.

(56) References Cited

OTHER PUBLICATIONS

Drouin et al., "Improving Border Localization of Multi-Baseline Stereo Using Border-Cut", International Journal of Computer Vision, Jul. 2009, vol. 83, Issue 3, 8 pgs.
Duparre et al., "Artificial apposition compound eye fabricated by micro-optics technology", Applied Optics, Aug. 1, 2004, vol. 43, No. 22, pp. 4303-4310.
Duparre et al., "Artificial compound eye zoom camera", Bioinspiration & Biomimetics, 2008, vol. 3, pp. 1-6.
Duparre et al., "Artificial compound eyes—different concepts and their application to ultra flat image acquisition sensors", MOEMS and Miniaturized Systems IV, Proc. SPIE 5346, Jan. 2004, pp. 89-100.
Duparre et al., "Chirped arrays of refractive ellipsoidal microlenses for aberration correction under oblique incidence", Optics Express, Dec. 26, 2005, vol. 13, No. 26, pp. 10539-10551.
Duparre et al., "Micro-optical artificial compound eyes", Bioinspiration & Biomimetics, 2006, vol. 1, pp. R1-R16.
Duparre et al., "Microoptical artificial compound eyes—from design to experimental verification of two different concepts", Proc. of SPIE, Optical Design and Engineering II, vol. 5962, 2005, pp. 59622A-1-59622A-12.
Duparre et al., "Microoptical Artificial Compound Eyes—Two Different Concepts for Compact Imaging Systems", 11th Microoptics Conference, Oct. 30-Nov. 2, 2005, 2 pgs.
Duparre et al., "Microoptical telescope compound eye", Optics Express, Feb. 7, 2005, vol. 13, No. 3, pp. 889-903.
Extended European Search Report for EP Application No. 13810429.4, Completed Jan. 7, 2016, Mailed Jan. 15, 2016, 6 Pgs.
Extended European Search Report for European Application EP12782935.6, completed Aug. 28, 2014, mailed Sep. 4, 2014, 7 Pgs.
Extended European Search Report for European Application EP12804266.0, Report Completed Jan. 27, 2015, Mailed Feb. 3, 2015, 6 Pgs.
Extended European Search Report for European Application EP12835041.0, Report Completed Jan. 28, 2015, Mailed Feb. 4, 2015, 7 Pgs.
Extended European Search Report for European Application EP13810229.8, Report Completed Apr. 14, 2016, Mailed Apr. 21, 2016, 7 pgs.
Extended European Search Report for European Application No. 13830945.5, Search completed Jun. 28, 2016, Mailed Jul. 7, 2016, 14 Pgs.
Extended European Search Report for European Application No. 13841613.6, Search completed Jul. 18, 2016, Mailed Jul. 26, 2016, 8 Pgs.
Supplementary European Search Report for EP Application No. 13831768.0, Search completed May 18, 2016, Mailed May 30, 2016, 13 Pgs.
International Preliminary Report on Patentability for International Application No. PCT/US2012/059813, Search Completed Apr. 15, 2014, 7 pgs.
International Preliminary Report on Patentability for International Application No. PCT/US2013/059991, Issued Mar. 17, 2015, Mailed Mar. 26, 2015, 8 pgs.
International Preliminary Report on Patentability for International Application PCT/US13/56065, Issued Feb. 24, 2015, Mailed Mar. 5, 2015, 4 Pgs.
International Preliminary Report on Patentability for International Application PCT/US2013/024987, Mailed Aug. 12, 2014, 13 pgs.
International Preliminary Report on Patentability for International Application PCT/US2013/027146, completed Aug. 26, 2014, Mailed Sep. 4, 2014, 10 Pgs.
International Preliminary Report on Patentability for International Application PCT/US2013/039155, completed Nov. 4, 2014, Mailed Nov. 13, 2014, 10 Pgs.
International Preliminary Report on Patentability for International Application PCT/US2013/046002, issued Dec. 31, 2014, Mailed Jan. 8, 2015, 6 Pgs.
International Preliminary Report on Patentability for International Application PCT/US2013/048772, issued Dec. 31, 2014, Mailed Jan. 8, 2015, 8 Pgs.
International Preliminary Report on Patentability for International Application PCT/US2013/056502, Issued Feb. 24, 2015, Mailed Mar. 5, 2015, 7 Pgs.
International Preliminary Report on Patentability for International Application PCT/US2013/069932, issued May 19, 2015, Mailed May 28, 2015, 12 Pgs.
International Preliminary Report on Patentability for International Application PCT/US2014/017766, issued Aug. 25, 2015, Mailed Sep. 3, 2015, 8 Pgs.
International Preliminary Report on Patentability for International Application PCT/US2014/018084, issued Aug. 25, 2015, Mailed Sep. 3, 2015, 11 Pgs.
International Preliminary Report on Patentability for International Application PCT/US2014/018116, issued Sep. 15, 2015, Mailed Sep. 24, 2015, 12 Pgs.
International Preliminary Report on Patentability for International Application PCT/US2014/021439, issued Sep. 15, 2015, Mailed Sep. 24, 2015, 9 Pgs.
International Preliminary Report on Patentability for International Application PCT/US2014/022118, issued Sep. 8, 2015, Mailed Sep. 17, 2015, 4 pgs.
International Preliminary Report on Patentability for International Application PCT/US2014/022123, issued Sep. 8, 2015, Mailed Sep. 17, 2015, 4 Pgs.
International Preliminary Report on Patentability for International Application PCT/US2014/022774, issued Sep. 22, 2015, Mailed Oct. 1, 2015, 5 Pgs.
International Preliminary Report on Patentability for International Application PCT/US2014/023762, issued Mar. 2, 2015, Mailed Mar. 9, 2015, 10 Pgs.
International Preliminary Report on Patentability for International Application PCT/US2014/024407, issued Sep. 15, 2015, Mailed Sep. 24, 2015, 8 Pgs.
International Preliminary Report on Patentability for International Application PCT/US2014/024903, issued Sep. 15, 2015, Mailed Sep. 24, 2015, 12 Pgs.
International Preliminary Report on Patentability for International Application PCT/US2014/024947, issued Sep. 15, 2015, Mailed Sep. 24, 2015, 7 Pgs.
International Preliminary Report on Patentability for International Application PCT/US2014/025100, issued Sep. 15, 2015, Mailed Sep. 24, 2015, 4 Pgs.
International Preliminary Report on Patentability for International Application PCT/US2014/025904, issued Sep. 15, 2015, Mailed Sep. 24, 2015, 5 Pgs.
International Preliminary Report on Patentability for International Application PCT/US2014/028447, issued Sep. 15, 2015, Mailed Sep. 24, 2015, 7 Pgs.
International Preliminary Report on Patentability for International Application PCT/US2014/030692, issued Sep. 15, 2015, Mailed Sep. 24, 2015, 6 Pgs.
International Preliminary Report on Patentability for International Application PCT/US2014/064693, issued May 10, 2016, Mailed May 19, 2016, 14 Pgs.
International Preliminary Report on Patentability for International Application PCT/US2014/066229, issued May 24, 2016, Mailed Jun. 6, 2016, 9 Pgs.
International Preliminary Report on Patentability for International Application PCT/US2014/067740, issued May 31, 2016, Mailed Jun. 9, 2016, 9 Pgs.
International Preliminary Report on Patentability for International Application PCT/US2015/019529, issued Sep. 13, 2016, Mailed Sep. 22, 2016, 9 Pgs.
International Preliminary Report on Patentability for International Application PCT/US13/62720, Issued Mar. 31, 2015, Mailed Apr. 9, 2015, 8 Pgs.
International Search Report and Written Opinion for International Application No. PCT/US13/46002, completed Nov. 13, 2013, Mailed Nov. 29, 2013, 7 pgs.

(56) References Cited

OTHER PUBLICATIONS

International Search Report and Written Opinion for International Application No. PCT/US13/56065, Completed Nov. 25, 2013, Mailed Nov. 26, 2013, 8 pgs.
International Search Report and Written Opinion for International Application No. PCT/US13/59991, Completed Feb. 6, 2014, Mailed Feb. 26, 2014, 8 pgs.
International Search Report and Written Opinion for International Application No. PCT/US2009/044687, completed Jan. 5, 2010, mailed Jan. 13, 2010, 9 pgs.
International Search Report and Written Opinion for International Application No. PCT/US2011/064921, Completed Feb. 25, 2011, mailed Mar. 6, 2012, 17 pgs.
International Search Report and Written Opinion for International Application No. PCT/US2013/024987, Completed Mar. 27, 2013, Mailed Apr. 15, 2013, 14 pgs.
International Search Report and Written Opinion for International Application No. PCT/US2013/027146, completed Apr. 2, 2013, mailed Apr. 19, 2013, 11 pgs.
International Search Report and Written Opinion for International Application No. PCT/US2013/039155, completed Jul. 1, 2013, Mailed Jul. 11, 2013, 11 Pgs.
International Search Report and Written Opinion for International Application No. PCT/US2013/048772, Completed Oct. 21, 2013, Mailed Nov. 8, 2013, 6 pgs.
International Search Report and Written Opinion for International Application No. PCT/US2013/056502, Completed Feb. 18, 2014, Mailed Mar. 19, 2014, 7 pgs.
International Search Report and Written Opinion for International Application No. PCT/US2013/069932, Completed Mar. 14, 2014, Mailed Apr. 14, 2014, 12 pgs.
International Search Report and Written Opinion for International Application No. PCT/US2015/019529, completed May 5, 2015, Mailed Jun. 8, 2015, 11 Pgs.
International Search Report and Written Opinion for International Application PCT/US11/36349, completed Aug. 11, 2011, mailed Aug. 22, 2011, 11 pgs.
International Search Report and Written Opinion for International Application PCT/US13/62720, completed Mar. 25, 2014, Mailed Apr. 21, 2014, 9 Pgs.
International Search Report and Written Opinion for International Application PCT/US14/17766, completed May 28, 2014, Mailed Jun. 18, 2014, 9 Pgs.
International Search Report and Written Opinion for International Application PCT/US14/18084, completed May 23, 2014, Mailed Jun. 10, 2014, 10 pgs.
International Search Report and Written Opinion for International Application PCT/US14/18116, completed May 13, 2014, Mailed Jun. 2, 2014, 12 Pgs.
International Search Report and Written Opinion for International Application PCT/US14/21439, completed Jun. 5, 2014, Mailed Jun. 20, 2014, 10 Pgs.
International Search Report and Written Opinion for International Application PCT/US14/22118, completed Jun. 9, 2014, Mailed Jun. 25, 2014, 5 pgs.
International Search Report and Written Opinion for International Application PCT/US14/22774 report completed Jun. 9, 2014, Mailed Jul. 14, 2014, 6 Pgs.
International Search Report and Written Opinion for International Application PCT/US14/24407, report completed Jun. 11, 2014, Mailed Jul. 8, 2014, 9 Pgs.
International Search Report and Written Opinion for International Application PCT/US14/25100, report completed Jul. 7, 2014, Mailed Aug. 7, 2014, 5 Pgs.
International Search Report and Written Opinion for International Application PCT/US14/25904 report completed Jun. 10, 2014, Mailed Jul. 10, 2014, 6 Pgs.
International Search Report and Written Opinion for International Application PCT/US2010/057661, completed Mar. 9, 2011, mailed Mar. 17, 2011, 14 pgs.
International Search Report and Written Opinion for International Application PCT/US2012/037670, Completed Jul. 5, 2012, Mailed Jul. 18, 2012, 9 pgs.
International Search Report and Written Opinion for International Application PCT/US2012/044014, completed Oct. 12, 2012, mailed Oct. 26, 2012, 15 pgs.
International Search Report and Written Opinion for International Application PCT/US2012/056151, completed Nov. 14, 2012, mailed Nov. 30, 2012 10 pgs.
International Search Report and Written Opinion for International Application PCT/US2012/058093, completed Nov. 15, 2012, mailed Nov. 29, 2012, 12 pgs.
International Search Report and Written Opinion for International Application PCT/US2012/059813, completed Dec. 17, 2012, mailed Jan. 7, 2013, 8 pgs.
US 9,338,332, Jun. 2016, Venkataraman et al. (withdrawn).
Ng, "Digital Light Field Photography", Thesis, Jul. 2006, 203 pgs.
Ng et al., "Super-Resolution Image Restoration from Blurred Low-Resolution Images", Journal of Mathematical Imaging and Vision, 2005, vol. 23, pp. 367-378.
Nitta et al., "Image reconstruction for thin observation module by bound optics by using the iterative backprojection method", Applied Optics, May 1, 2006, vol. 45, No. 13, pp. 2893-2900.
Nomura et al., "Scene Collages and Flexible Camera Arrays", Proceedings of Eurographics Symposium on Rendering, 2007, 12 pgs.
Park et al., "Super-Resolution Image Reconstruction", IEEE Signal Processing Magazine, May 2003, pp. 21-36.
Perwass et al., "Single Lens 3D-Camera with Extended Depth-of-Field", printed from www.raytrix.de, Jan. 2012, 15 pgs.
Pham et al., "Robust Super-Resolution without Regularization", Journal of Physics: Conference Series , vol. 124, 2008, pp. 1-19.
Philips 3D Solutions, "3D Interface Specifications, White Paper", Feb. 15, 2008, 2005-2008 Philips Electronics Nederland B.V., Philips 3D Solutions retrieved from www.philips.com/3dsolutions, 29 pgs.
Polight, "Designing Imaging Products Using Reflowable Autofocus Lenses", printed Nov. 2, 2012 from http://www.polight.no/tunable-polymer-autofocus-lens-html--11.html, 1 pg.
Pouydebasque et al., "Varifocal liquid lenses with integrated actuator, high focusing power and low operating voltage fabricated on 200 mm wafers", Sensors and Actuators A: Physical, vol. 172, Issue 1, Dec. 2011, pp. 280-286.
Protter et al., "Generalizing the Nonlocal-Means to Super-Resolution Reconstruction", IEEE Transactions on Image Processing, Jan. 2009, vol. 18, No. 1, pp. 36-51.
Radtke et al., "Laser lithographic fabrication and characterization of a spherical artificial compound eye", Optics Express, Mar. 19, 2007, vol. 15, No. 6, pp. 3067-3077.
Rajan et al., "Simultaneous Estimation of Super Resolved Scene and Depth Map from Low Resolution Defocused Observations", IEEE Transactions on Pattern Analysis and Machine Intelligence, vol. 25, No. 9, Sep. 2003, pp. 1-16.
Rander et al., "Virtualized Reality: Constructing Time-Varying Virtual Worlds From Real World Events", Proc. of IEEE Visualization '97, Phoenix, Arizona, Oct. 19-24, 1997, pp. 277-283, 552.
Rhemann et al, "Fast Cost-Volume Filtering for Visual Correspondence and Beyond", IEEE Trans. Pattern Anal. Mach. Intell, 2013, vol. 35, No. 2, pp. 504-511.
Robertson et al., "Dynamic Range Improvement Through Multiple Exposures", In Proc. of the Int. Conf. on Image Processing, 1999, 5 pgs.
Robertson et al., "Estimation-theoretic approach to dynamic range enhancement using multiple exposures", Journal of Electronic Imaging, Apr. 2003, vol. 12, No. 2, pp. 219-228.
Roy et al., "Non-Uniform Hierarchical Pyramid Stereo for Large Images", Computer and Robot Vision, 2002, pp. 208-215.
Sauer et al., "Parallel Computation of Sequential Pixel Updates in Statistical Tomographic Reconstruction", ICIP 1995 Proceedings of the 1995 International Conference on Image Processing, Oct. 23-26, 1995, pp. 93-96.

(56) References Cited

OTHER PUBLICATIONS

Seitz et al., "Plenoptic Image Editing", International Journal of Computer Vision 48, Jan. 1998, pp. 29 pgs., DOI: 10.1109/ICCV.1998.710696 • Source: DBLP Conference: Computer Vision, Sixth International Conference.
Shum et al., "Pop-Up Light Field: An Interactive Image-Based Modeling and Rendering System", ACM Transactions on Graphics, vol. 23, No. 2, Apr. 2004, pp. 143-162. Retrieved from http://131.107.65.14/en-us/um/people/jiansun/papers/PopupLightField_TOG.pdf on Feb. 5, 2014.
Stollberg et al., "The Gabor superlens as an alternative wafer-level camera approach inspired by superposition compound eyes of nocturnal insects", Optics Express, Aug. 31, 2009, vol. 17, No. 18, pp. 15747-15759.
Sun et al., "Image Super-Resolution Using Gradient Profile Prior", 2008 IEEE Conference on Computer Vision and Pattern Recognition, Jun. 23-28, 2008, 8 pgs.; DOI: 10.1109/CVPR.2008.4587659.
Takeda et al., "Super-resolution Without Explicit Subpixel Motion Estimation", IEEE Transaction on Image Processing, Sep. 2009, vol. 18, No. 9, pp. 1958-1975.
Tallon et al., "Upsampling and Denoising of Depth Maps Via Joint-Segmentation", 20th European Signal Processing Conference, Aug. 27-31, 2012, 5 pgs.
Tanida et al., "Color imaging with an integrated compound imaging system", Optics Express, Sep. 8, 2003, vol. 11, No. 18, pp. 2109-2117.
Tanida et al., "Thin observation module by bound optics (TOMBO): concept and experimental verification", Applied Optics, Apr. 10, 2001, vol. 40, No. 11, pp. 1806-1813.
Taylor, "Virtual camera movement: The way of the future?", American Cinematographer, vol. 77, No. 9, Sep. 1996, 93-100.
Vaish et al., "Reconstructing Occluded Surfaces Using Synthetic Apertures: Stereo, Focus and Robust Measures", CVPR '06 Proceedings of the 2006 IEEE Computer Society Conference on Computer Vision and Pattern Recognition, vol. 2, 2006, pp. 2331-2338.
Vaish et al., "Synthetic Aperture Focusing Using a Shear-Warp Factorization of the Viewing Transform", IEEE Workshop on A3DISS, CVPR, 2005, 8 pgs.
Vaish et al., "Using Plane + Parallax for Calibrating Dense Camera Arrays", IEEE Conference on Computer Vision and Pattern Recognition (CVPR), 2004, 8 pgs.
Veilleux, "CCD Gain Lab: The Theory", University of Maryland, College Park-Observational Astronomy (ASTR 310), Oct. 19, 2006, pp. 1-5 (online), [retrieved on May 13, 2014]. Retrieved from the Internet <URL: http://www.astro.umd.edu/~veilleux/ASTR310/fal106/ccd_theory.pdf, 5 pgs.
Venkataraman et al., "PiCam: An Ultra-Thin High Performance Monolithic Camera Array", ACM Transactions on Graphics (TOG), ACM, US, vol. 32, No. 6, Article 166, Nov. 1, 2013 (Nov. 1, 2013), pp. 1-13.
Vuong et al., "A New Auto Exposure and Auto White-Balance Algorithm to Detect High Dynamic Range Conditions Using CMOS Technology", Proceedings of the World Congress on Engineering and Computer Science 2008, WCECS 2008, Oct. 22-24, 2008, 5 pages.
Wang, "Calculation Image Position, Size and Orientation Using First Order Properties", OPTI521 Tutorial, Dec. 29, 2010, 10 pgs.
Wetzstein et al., "Computational Plenoptic Imaging", Computer Graphics Forum, 2011, vol. 30, No. 8, pp. 2397-2426.
Wheeler et al., "Super-Resolution Image Synthesis Using Projections Onto Convex Sets in the Frequency Domain", Proc. SPIE, 2005, 5674, 12 pgs.
Wikipedia, "Polarizing Filter (Photography)", retrieved from http://en.wikipedia.org/wiki/Polarizing_filter_(photography) on Dec. 12, 2012, last modified on Sep. 26, 2012, 5 pgs.
Wilburn, "High Performance Imaging Using Arrays of Inexpensive Cameras", Thesis of Bennett Wilburn, Dec. 2004, 128 pgs.
Wilburn et al., "High Performance Imaging Using Large Camera Arrays", ACM Transactions on Graphics, Jul. 2005, vol. 24, No. 3, pp. 1-12.
Wilburn et al., "High-Speed Videography Using a Dense Camera Array", CVPR'04 Proceedings of the 2004 IEEE Computer Society Conference on Computer Vision and Pattern Recognition, 2004, pp. 294-301.
Wilburn et al., "The Light Field Video Camera", Proceedings of Media Processors 2002, SPIE Electronic Imaging, 2002, 8 pgs.
Wippermann et al., "Design and fabrication of a chirped array of refractive ellipsoidal micro-lenses for an apposition eye camera objective", Proceedings of SPIE, Optical Design and Engineering II, Oct. 15, 2005, 59622C-1-59622C11.
Wu et al., "A virtual view synthesis algorithm based on image inpainting", 2012 Third International Conference on Networking and Distributed Computing, IEEE, 2012, 4 pages.
Yang et al., "A Real-Time Distributed Light Field Camera", Eurographics Workshop on Rendering, 2002, pp. 1-10.
Yang et al., "Superresolution Using Preconditioned Conjugate Gradient Method", Proceedings of SPIE—The International Society for Optical Engineering, Jul. 2002, 8 pgs.
Zhang et al., "A Self-Reconfigurable Camera Array", Eurographics Symposium on Rendering, 2004, 12 pgs.
Zhang et al., "Depth estimation, spatially variant image registration, and super-resolution using a multi-lenslet camera", Proceedings of SPIE, vol. 7705, Apr. 23, 2010, pp. 770505-770505-8, XP055113797 ISSN: 0277-786X, DOI: 10.1117/12.852171.
Zheng et al., "Balloon Motion Estimation Using Two Frames", Proceedings of the Asilomar Conference on Signals, Systems and Computers, IEEE, Comp. Soc. Press, US, vol. 2 of 02, Nov. 4, 1991, pp. 1057-1061.
Zomet et al., "Robust Super-Resolution", IEEE, 2001, pp. 1-6.
Duparre et al., "Micro-optically fabricated artificial apposition compound eye", Electronic Imaging—Science and Technology, Prod. SPIE 5301, Jan. 2004, pp. 25-33.
Duparre et al., "Novel Optics/Micro-Optics for Miniature Imaging Systems", Proc. of SPIE, 2006, vol. 6196, pp. 619607-1-619607-15.
Duparre et al., "Theoretical analysis of an artificial superposition compound eye for application in ultra flat digital image acquisition devices", Optical Systems Design, Proc. SPIE 5249, Sep. 2003, pp. 408-418.
Duparre et al., "Thin compound-eye camera", Applied Optics, May 20, 2005, vol. 44, No. 15, pp. 2949-2956.
Duparre et al., "Ultra-Thin Camera Based on Artificial Apposition Compound Eyes", 10th Microoptics Conference, Sep. 1-3, 2004, 2 pgs.
Eng, Wei Yong et al., "Gaze correction for 3D tele-immersive communication system", IVMSP Workshop, 2013 IEEE 11th. IEEE, Jun. 10, 2013, 4 pages.
Fanaswala, "Regularized Super-Resolution of Multi-View Images", Retrieved on Nov. 10, 2012 (Nov. 10, 2012). Retrieved from the Internet at URL<http://www.site.uottawa.ca/-edubois/theses/Fanaswala_thesis.pdf>, 2009, 163 pgs.
Farrell et al., "Resolution and Light Sensitivity Tradeoff with Pixel Size", Proceedings of the SPIE Electronic Imaging 2006 Conference, 2006, vol. 6069, 8 pgs.
Farsiu et al., "Advances and Challenges in Super-Resolution", International Journal of Imaging Systems and Technology, 2004, vol. 14, pp. 47-57.
Farsiu et al., "Fast and Robust Multiframe Super Resolution", IEEE Transactions on Image Processing, Oct. 2004, vol. 13, No. 10, pp. 1327-1344.
Farsiu et al., "Multiframe Demosaicing and Super-Resolution of Color Images", IEEE Transactions on Image Processing, Jan. 2006, vol. 15, No. 1, pp. 141-159.
Feris et al., "Multi-Flash Stereopsis: Depth Edge Preserving Stereo with Small Baseline Illumination", IEEE Trans on PAMI, 2006, 31 pgs.
Fife et al., "A 3D Multi-Aperture Image Sensor Architecture", Custom Integrated Circuits Conference, CICC '06, IEEE, 2006, pp. 281-284.

(56) References Cited

OTHER PUBLICATIONS

Fife et al., "A 3MPixel Multi-Aperture Image Sensor with 0.7µm Pixels in 0.11µm CMOS", ISSCC 2008, Session 2, Image Sensors & Technology, 2008, pp. 48-50.
Fischer et al., "Optical System Design", 2nd Edition, SPIE Press, Feb. 14, 2008, pp. 191-198.
Fischer et al., "Optical System Design", 2nd Edition, SPIE Press, Feb. 14, 2008, pp. 49-58.
Goldman et al., "Video Object Annotation, Navigation, and Composition", In Proceedings of UIST 2008, Oct. 2008, pp. 3-12.
Gortler et al., "The Lumigraph", In Proceedings of SIGGRAPH 1996, 1996, pp. 43-54.
Hacohen et al., "Non-Rigid Dense Correspondence with Applications for Image Enhancement", ACM Transactions on Graphics, vol. 30, Issue 4, 2011, pp. 70:1-70:10.
Hamilton, "JPEG File Interchange Format, Version 1.02", Sep. 1, 1992, 9 pgs.
Hardie, "A Fast Image Super-Algorithm Using an Adaptive Wiener Filter", IEEE Transactions on Image Processing, Dec. 2007, vol. 16, No. 12, pp. 2953-2964.
Hasinoff et al., "Search-and-Replace Editing for Personal Photo Collections", Computational Photography (ICCP) 2010, 2010, pp. 1-8.
Hernandez-Lopez et al., "Detecting objects using color and depth segmentation with Kinect sensor", Procedia Technology, vol. 3, Jan. 1, 2012 (Jan. 1, 2012), pp. 196-204, XP055307680, ISSN: 2212-0173, DOI: 10.1016/j.protcy.2012.03.021.
Horisaki et al., "Irregular Lens Arrangement Design to Improve Imaging Performance of Compound-Eye Imaging Systems", Applied Physics Express, 2010, vol. 3, pp. 022501-1-022501-3.
Horisaki et al., "Superposition Imaging for Three-Dimensionally Space-Invariant Point Spread Functions", Applied Physics Express, 2011, vol. 4, pp. 112501-1-112501-3.
Horn et al., "LightShop: Interactive Light Field Manipulation and Rendering", In Proceedings of I3D 2007, 2007, pp. 121-128.
Isaksen et al., "Dynamically Reparameterized Light Fields", In Proceedings of SIGGRAPH 2000, 2000, pp. 297-306.
Jarabo et al., "Efficient Propagation of Light Field Edits", In Proceedings of SIACG 2011, 2011, pp. 75-80.
Joshi et al., "Synthetic Aperture Tracking: Tracking Through Occlusions", ICCV IEEE 11th International Conference on Computer Vision; Publication [online]. Oct. 2007 [retrieved Jul. 28, 2014]. Retrieved from the Internet: <URL: http:I/ieeexplore.ieee.org/stamp/stamp.jsp?tp=&arnumber=4409032&isnumber=4408819>; pp. 1-8.
Kang et al., "Handling Occlusions inn Dense Multi-View Stereo", Computer Vision and Pattern Recognition, 2001, vol. 1, pp. I-103-I-110.
Kitamura et al., "Reconstruction of a high-resolution image on a compound-eye image-capturing system", Applied Optics, Mar. 10, 2004, vol. 43, No. 8, pp. 1719-1727.
Krishnamurthy et al., "Compression and Transmission of Depth Maps for Image-Based Rendering", Image Processing, 2001, pp. 828-831.
Kutulakos et al., "Occluding Contour Detection Using Affine Invariants and Purposive Viewpoint Control", Proc. CVPR '94, 1994, 8 pgs.
Lai et al., "A Large-Scale Hierarchical Multi-View RGB-D Object Dataset", Proceedings—IEEE International Conference on Robotics and Automation, May 2011, 8 pgs., DOI:10.1109/ICRA. 201135980382.
Lee et al., "Electroactive Polymer Actuator for Lens-Drive Unit in Auto-Focus Compact Camera Module", ETRI Journal, vol. 31, No. 6, Dec. 2009, pp. 695-702.
Lensvector, "How LensVector Autofocus Works", printed Nov. 2, 2012 from http://www.lensvector.com/overview.html, 1 pg.
Levin et al., "A Closed Form Solution to Natural Image Matting", Pattern Analysis and Machine Intelligence, Feb. 2008, vol. 30, 8 pgs.
Levoy, "Light Fields and Computational Imaging", IEEE Computer Society, Aug. 2006, pp. 46-55.
Levoy et al., "Light Field Rendering", Proc. ADM SIGGRAPH '96, Jul. 1996, pp. 1-12.
Li et al., "A Hybrid Camera for Motion Deblurring and Depth Map Super-Resolution", Jun. 23-28, 2008, IEEE Conference on Computer Vision and Pattern Recognition, 8 pgs. Retrieved from www.eecis.udel.edu/~jye/lab_research/08/deblur-feng.pdf on Feb. 5, 2014.
Liu et al., "Virtual View Reconstruction Using Temporal Information", 2012 IEEE International Conference on Multimedia and Expo, 2012, pp. 115-120.
Lo et al., "Stereoscopic 3D Copy & Paste", ACM Transactions on Graphics, vol. 29, No. 6, Article 147, Dec. 2010, pp. 147:1-147:10.
Merkle et al., "Adaptation and optimization of coding algorithms for mobile 3DTV", Mobile3DTV Project No. 216503, Nov. 2008, 55 pgs.
Mitra et al., "Light Field Denoising, Light Field Superresolution and Stereo Camera Based Refocussing using a GMM Light Field Patch Prior", Computer Vision and Pattern Recognition Workshops (CVPRW), 2012 IEEE Computer Society Conference, Jun. 16-21, 2012, pp. 22-28.
Moreno-Noguer et al., "Active Refocusing of Images and Videos", ACM SIGGRAPH, Jul. 2007, vol. 26, No. 3, Article 67, pp. 1-10, retrieved on Jul. 8, 2015 from the Internet <U RL:http://doi.acm.org/1.1145/1276377.1276461 >.
Muehlebach, "Camera Auto Exposure Control for VSLAM Applications", Studies on Mechatronics, Swiss Federal Institute of Technology Zurich, Autumn Term 2010 course, 67 pgs.
Nayar, "Computational Cameras: Redefining the Image", IEEE Computer Society, Aug. 2006, pp. 30-38.
International Preliminary Report on Patentability for International Application PCT/US2015/026545, Report dated Oct. 17, 2017, dated Oct. 26, 2017, 18 Pgs.
International Search Report and Written Opinion for International Application No. PCT/US2015/026545, Search completed Jun. 30, 2015, dated Jul. 20, 2015, 19 Pgs.
Xu, "Real-Time Realistic Rendering and High Dynamic Range Image Display and Compression", Dissertation, School of Computer Science in the College of Engineering and Computer Science at the University of Central Florida, Orlando, Florida, Fall Term 2005, 192 pgs.
"Light fields and computational photography", Stanford Computer Graphics Laboratory, Retrieved from: http://graphics.stanford.edu/projects/lightfield/, Earliest publication online: Feb. 10, 1997, 3 pgs.
Fecker et al., "Depth Map Compression for Unstructured Lumigraph Rendering", Proc. SPIE 6077, Proceedings Visual Communications and Image Processing 2006, Jan. 18, 2006, pp. 60770B-1-60770B-8.
Georgeiv et al., "Light Field Camera Design for Integral View Photography", Adobe Systems Incorporated, Adobe Technical Report, 2003, 13 pgs.
Georgiev et al., "Light-Field Capture by Multiplexing in the Frequency Domain", Adobe Systems Incorporated, Adobe Technical Report, 2003, 13 pgs.
Kubota et al., "Reconstructing Dense Light Field From Array of Multifocus Images for Novel View Synthesis", IEEE Transactions on Image Processing, Vol. 16, No. 1, Jan. 2007, pp. 269-279.
Li et al., "Fusing Images With Different Focuses Using Support Vector Machines", IEEE Transactions on Neural Networks, vol. 15, No. 6, Nov. 8, 2004, pp. 1555-1561.
Stober, "Stanford researchers developing 3-D camera with 12,616 lenses", Stanford Report, Mar. 19, 2008, Retrieved from: http://news.stanford.edu/news/2008/march19/camera-031908.html, 5 pgs.
Taguchi et al., "Rendering-Oriented Decoding for a Distributed Multiview Coding System Using a Coset Code", Hindawi Publishing Corporation, EURASIP Journal on Image and Video Processing, vol. 2009, Article ID 251081, Online: Apr. 22, 2009, 12 pages.
Vetro et al., "Coding Approaches for End-To-End 3D TV Systems", Mitsubishi Electric Research Laboratories, Inc., TR2004-137, Dec. 2004, 6 pgs.

(56) References Cited

OTHER PUBLICATIONS

Wieringa et al., "Remote Non-invasive Stereoscopic Imaging of Blood Vessels: First In-vivo Results of a New Multispectral Contrast Enhancement Technology", Annals of Biomedical Engineering, vol. 34, No. 12, Dec. 2006, pp. 1870-1878, Published online Oct. 12, 2006.

Xu, Ruifeng, "Real-Time Realistic Rendering and High Dynamic Range Image Display and Compression", Dissertation, School of Computer Science in the College of Engineering and Computer Science at the University of Central Florida, Orlando, Florida, Fall Term 2005, 192 pgs.

Van Der Wal et al., "The Acadia Vision Processor", Proceedings Fifth IEEE International Workshop on Computer Architectures for Machine Perception, Sep. 13, 2000, Padova, Italy, pp. 31-40.

\* cited by examiner

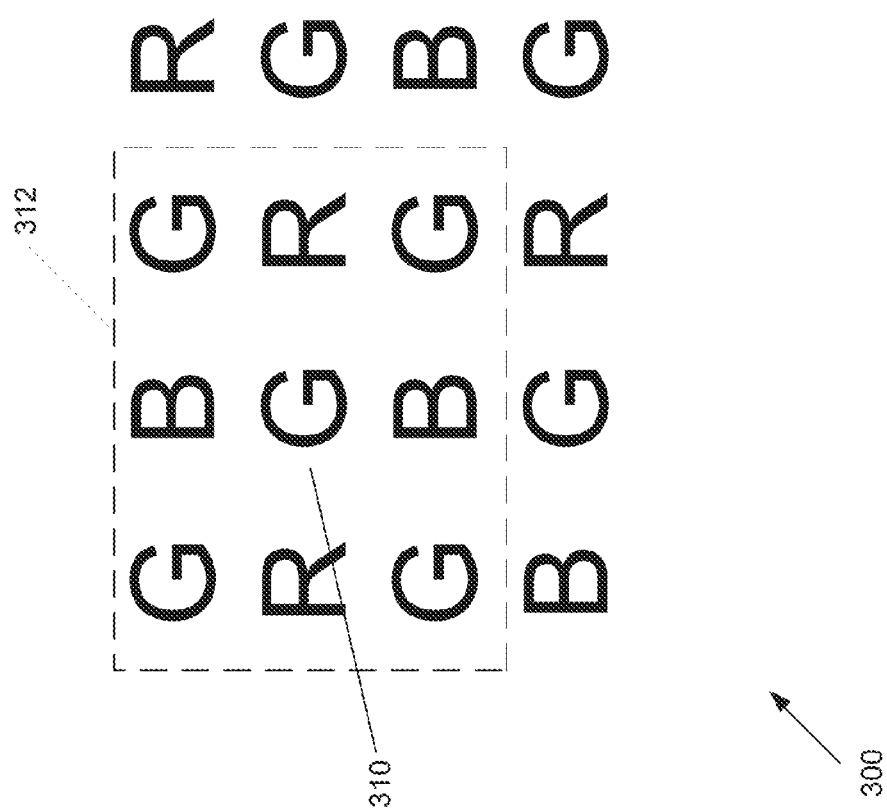

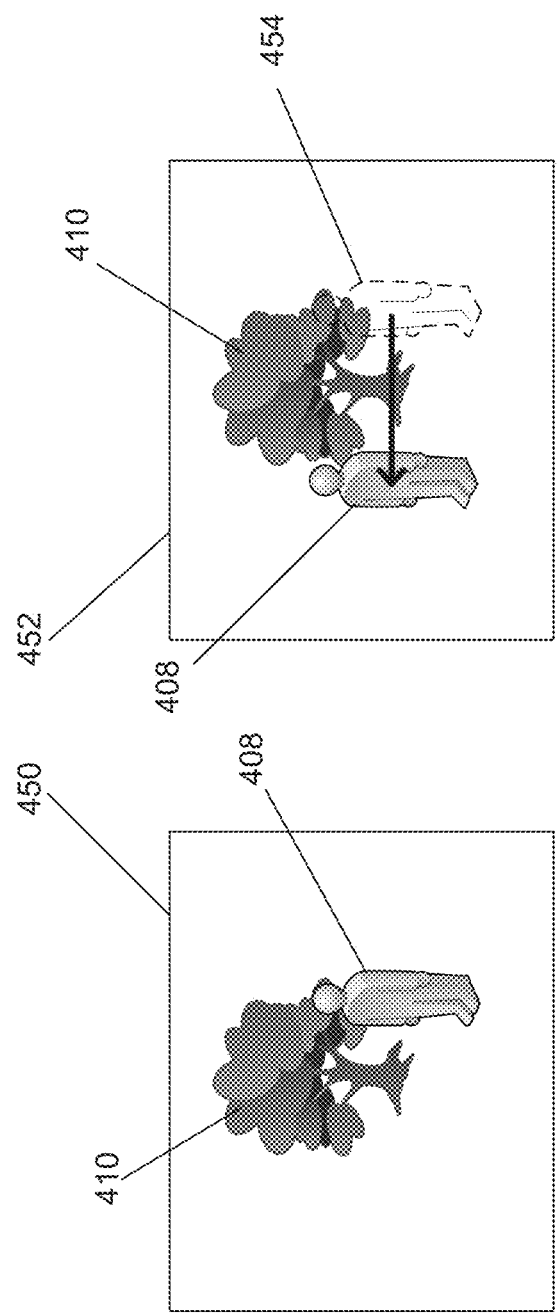

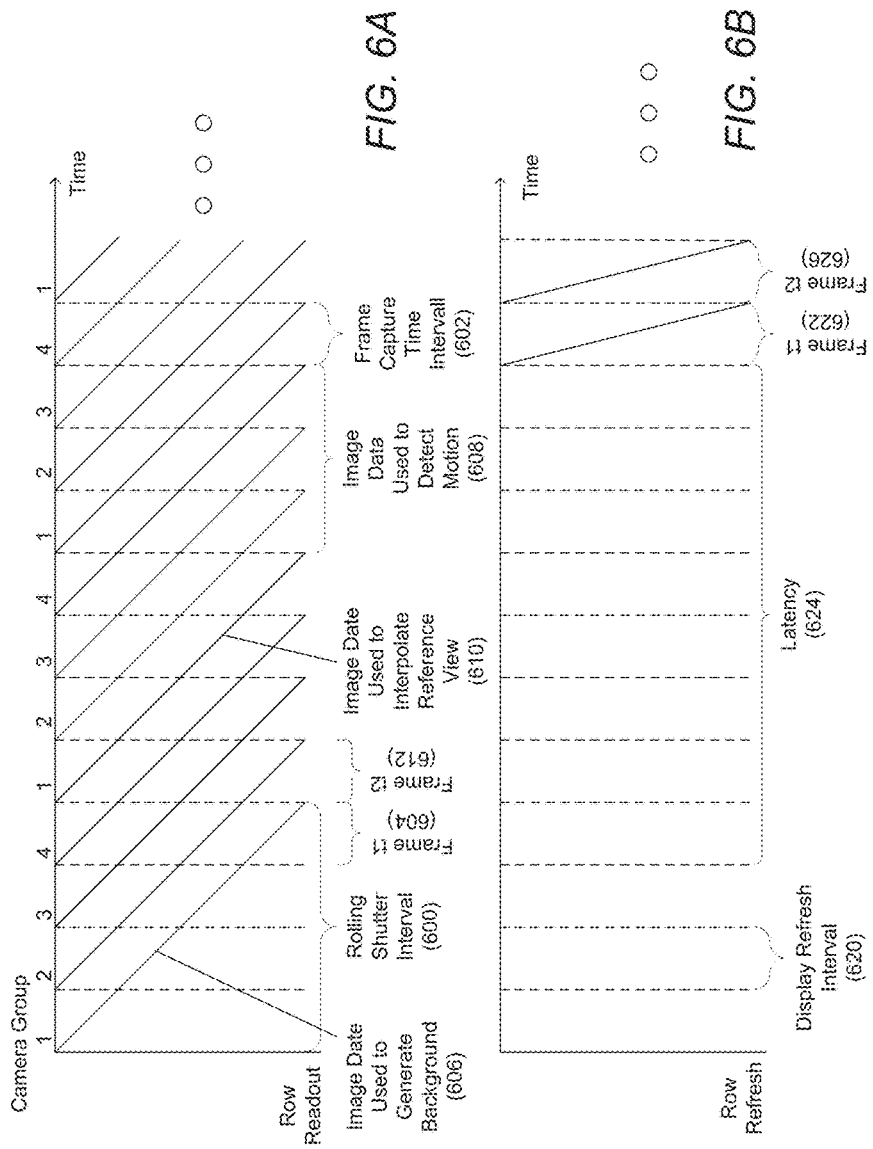

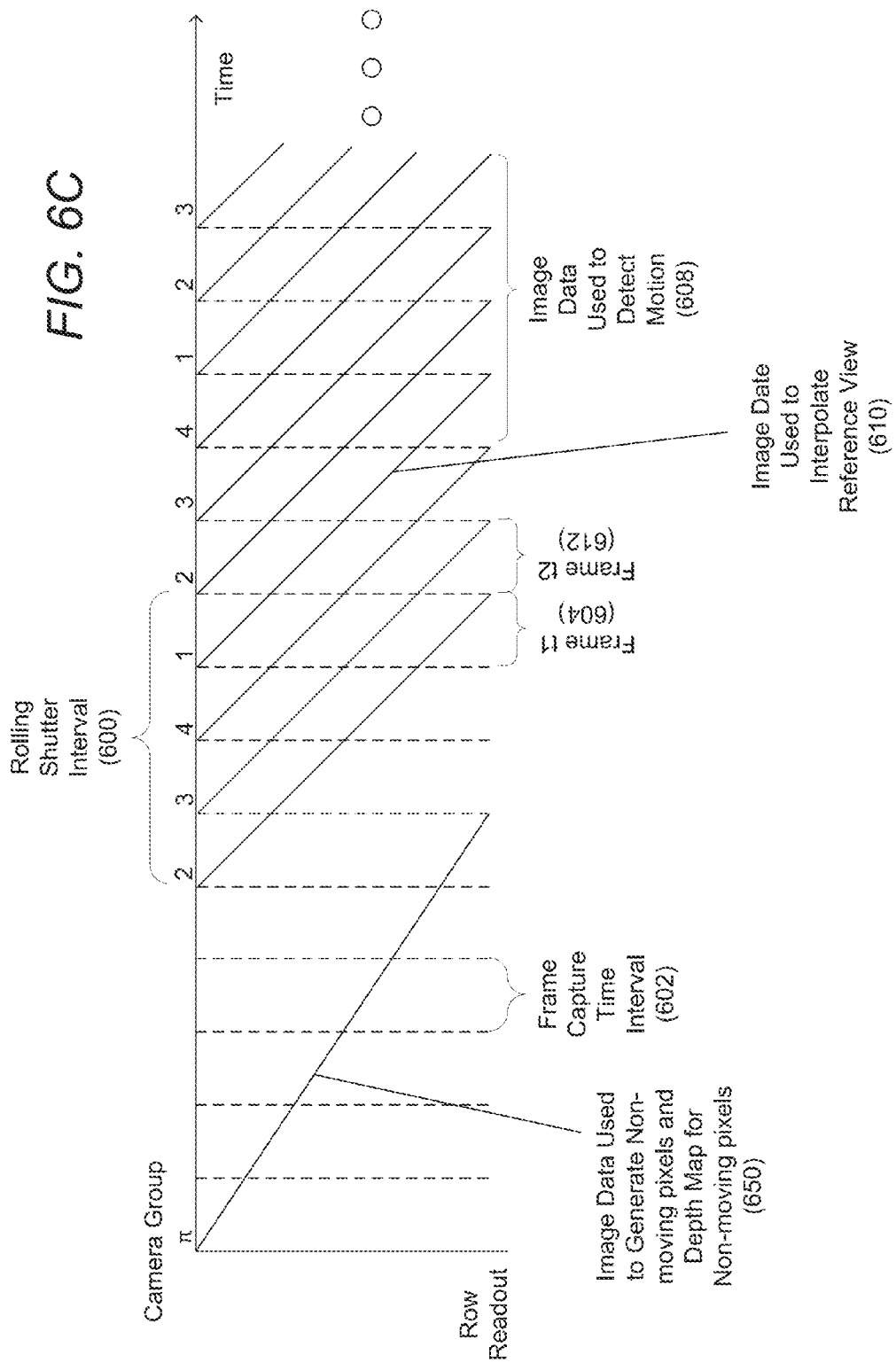

SYSTEMS AND METHODS FOR PERFORMING HIGH SPEED VIDEO CAPTURE AND DEPTH ESTIMATION USING ARRAY CAMERAS

FIELD OF THE INVENTION

The present invention generally relates to digital cameras and more specifically to systems and methods for capturing video and images using array cameras.

BACKGROUND

High speed videography using camera arrays has been proposed by Schechtman et al. "Increasing Space-Time Resolution in Video," *European Conference on Computer Vision (ECCV), May* 2002 and Wilburn et al. "High-Speed Videography using a Dense Camera Array" *IEEE Society Conference on Pattern Recognition,* 2004.

The Wilburn et al. paper disclosed that creating a single high-speed video sequence involves aligning the cameras in the array to a reference viewpoint and notes that this is a difficult task. Accordingly, the Wilburn et al. paper proposes using a simplifying assumption that the imaged scene lies within a shallow depth of a single object plane. The Wilburn et al. paper notes that this assumption only holds for scenes that are either relatively flat or sufficiently far from the array relative to the camera spacing. Where the assumption does not hold true, the Wilburn et al. paper notes that objects off the focal plane remain sharp but appear to move from frame to frame of the aligned images due to the alignment errors.

The alignment errors are a function of the incorrect estimation of depth for objects within the scene that do not lie on the single object plane. Binocular viewing of a scene creates two slightly different images of the scene due to the different fields of view of each eye. These differences are referred to as binocular disparity (or parallax). Shifts due to parallax can be corrected for with knowledge of the depth of the object and the baseline between the cameras that image the scene. When all objects are assumed to be on the same plane, alignment errors result for objects that do not lie on the plane. The Wilburn et al. paper proposes minimizing the alignment errors by capturing image data sequentially using spatially adjacent cameras. In this way, the maximum alignment error is constrained.

The camera array described in the Wilburn et al. paper utilizes inexpensive CMOS sensors that have an electronic rolling shutters. A snap-shot shutter starts and stops light integration for every pixel in a sensor at the same time. Sample and hold circuitry is then utilized to enable sequential readout. An electronic rolling shutter exposes each row just before it is read out, which eliminates the need for sample and hold circuitry. The Wilburn et al. paper identifies that a disadvantage of using sensors with rolling shutters for high speed video capture is that the rolling shutter can distort the shape of fast moving objects. Effectively, pixels near the bottom of a frame start and stop integration of light almost a frame later than pixels from the top of the frame.

SUMMARY OF THE INVENTION

Systems and methods in accordance with embodiments of the invention perform high speed video capture and depth estimation using array cameras. As can readily be appreciated, real world scenes typically include objects located at different distances from a camera. Therefore, estimating depth during video capture by an array of cameras can result in smoother rendering of video from image data captured of real world scenes. Array cameras in accordance with embodiments of the invention can incorporate sensors with snap-shot shutters and/or sensors with rolling shutters. The specific technique for estimating depth and rendering high frame rate video sequences typically depends on the number, type and shutter speed of the cameras in the array. In addition, when an array is formed by the assembly of independent camera modules, the relative rolling shutter between the cameras can be minimized during read-out as compared to an array formed on a single common substrate having a common readout from the independent sub-arrays on the substrate. This type of array construction can further minimize alignment errors.

One embodiment of the invention includes: a plurality of cameras that capture images of a scene from different viewpoints; and memory containing an image processing pipeline application. In addition, the image processing pipeline application directs the processor to: obtain image data from a plurality of groups of cameras from within the plurality of cameras, where each group of cameras starts capturing image data at a staggered start time relative to the other groups of cameras; select a reference viewpoint and determine scene-dependent geometric corrections that shift pixels captured from an alternate viewpoint to the reference viewpoint by performing disparity searches to identify the disparity at which pixels from the different viewpoints are most similar; and render frames of video, where a given frame of video is rendered using pixels comprising pixels from at least one group of cameras captured during a given frame capture time interval and by shifting pixels captured from alternate viewpoints to the reference viewpoint using scene-dependent geometric corrections determined for the pixels captured from the alternate viewpoints.

In a further embodiment, each group of cameras is a single camera selected from the group consisting of: a monochrome camera, a Bayer camera, and an infrared camera.

In another embodiment, each group of cameras includes multiple cameras.

In a still further embodiment, the image processing pipeline application further directs the processor to determine scene-dependent geometric corrections that shift pixels captured from an alternate viewpoint to the reference viewpoint by: selecting at least a portion of a frame captured from a first viewpoint during a specific frame capture time interval; interpolating at least a portion of a frame from a second viewpoint during the specific frame capture time interval based upon image data captured from the second viewpoint at other times, where the second viewpoint differs from the first viewpoint; and identifying the disparity at which pixels from the at least a portion of a frame selected from the first viewpoint and the at least a portion of a frame interpolated from the second viewpoint are most similar.

In still another embodiment, the first viewpoint is the alternate viewpoint and the second viewpoint is the reference viewpoint.

In a yet further embodiment, the groups of cameras each comprise multiple cameras.

In yet another embodiment, the plurality of cameras comprises a camera that captures image data from the reference viewpoint, the first viewpoint is the alternate viewpoint, and the second viewpoint is the reference viewpoint.

In a still further embodiment again, the plurality of cameras includes a camera that captures image data from the reference viewpoint in a first color channel, the alternate viewpoint is the viewpoint of a camera in a specific group of cameras that captures image data in a second color channel, the first viewpoint is the viewpoint of a camera in the specific group of cameras that captures image data in the first color channel, and the second viewpoint is the reference viewpoint. In addition, the image processing pipeline application further directs the processor to determine scene-dependent geometric corrections that shift pixels captured from the alternate viewpoint to the reference viewpoint by: estimating depth of at least one pixel visible in the alternate viewpoint based upon the disparity at which pixels from the at least a portion of a frame selected from the first viewpoint and the at least a portion of a frame interpolated from the second viewpoint are most similar; and determining scene-dependent geometric corrections to apply to shift the at least one pixel captured from the alternate viewpoint to the reference viewpoint based upon the estimated depth of the at least one pixel.

In another embodiment again, the plurality of cameras comprises a reference camera that captures image data from the reference viewpoint in a first color channel, where the reference camera is part of a first group of cameras, the alternate viewpoint is the viewpoint of a camera from the first group of cameras that captures image data in a second color channel, the first viewpoint is the reference viewpoint, and the second viewpoint is the viewpoint of a camera in a second group of cameras that captures image data in the first color channel. In addition, the image processing pipeline application further directs the processor to determine scene-dependent geometric corrections that shift pixels captured from the alternate viewpoint to the reference viewpoint by: estimating depth of at least one pixel visible in the alternate viewpoint based upon the disparity at which pixels from the at least a portion of a frame selected from the first viewpoint and the at least a portion of a frame interpolated from the second viewpoint are most similar; and determining scene-dependent geometric corrections to apply to shift the at least one pixel captured from the alternate viewpoint to the reference viewpoint based upon the estimated depth of the at least one pixel.

In a further embodiment, the image processing pipeline application further directs the processor to render frames of video using: pixels captured by at least one group of cameras during the given frame capture time interval and determined to be moving during the given frame capture time interval; and pixels from a previously rendered frame that are determined to be non-moving during at least the given frame capture time interval.

In another additional embodiment, the image processing pipeline application further directs the processor to determine scene-dependent geometric corrections that shift pixels captured from an alternate viewpoint to the reference viewpoint by: selecting moving pixels from image data captured from a first viewpoint during a specific frame capture time interval, where the moving pixels are pixels determined to be moving during at least the specific frame capture time interval; interpolating moving pixels from a second viewpoint during the specific frame capture time interval based upon image data captured from the second viewpoint at other times, where the second viewpoint differs from the first viewpoint and the moving pixels are pixels determined to be moving during the specific frame capture time interval; and identifying the disparity at which the moving pixels from image data captured from the first viewpoint and the moving pixels interpolated from the second viewpoint are most similar.

In a further additional embodiment, the image processing pipeline application further directs the processor to perform a disparity search to identify the disparity at which the moving pixels from image data captured from the first viewpoint and the moving pixels interpolated from the second viewpoint are most similar by comparing the similarity of individual moving pixels at different disparities.

In still yet another embodiment, the image processing pipeline application further directs the processor to perform a disparity search to identify the disparity at which the moving pixels from image data captured from the first viewpoint and the moving pixels interpolated from the second viewpoint are most similar by comparing the similarity of individual clusters of moving pixels at different disparities.

In still another embodiment again, the image processing pipeline application further directs the processor to perform a disparity search to identify the disparity at which the moving pixels from image data captured from the first viewpoint and the moving pixels interpolated from the second viewpoint are most similar by comparing the similarity of all moving pixels at different disparities.

In a still further embodiment again, the image processing pipeline application further directs the processor to render an initial frame from an image captured using one of the plurality of cameras.

In still another additional embodiment, the image processing pipeline application further directs the processor to render an initial frame by: capturing a set of images using an initial group of cameras; determining depth estimates for pixel locations in an image that is from the reference viewpoint using at least a subset of the set of images, wherein generating a depth estimate for a given pixel location in the image from the reference viewpoint includes: identifying pixels in the at least a subset of the set of images that correspond to the given pixel location in the image from the reference viewpoint based upon expected disparity at a plurality of depths; comparing the similarity of the corresponding pixels identified at each of the plurality of depths; and selecting the depth from the plurality of depths at which the identified corresponding pixels have the highest degree of similarity as a depth estimate for the given pixel location in the image from the reference viewpoint; rendering a frame from the reference viewpoint using the set of images and the depth estimates for pixel locations in a subset of the set of images to shift pixels captured from alternate viewpoints to the reference viewpoint.

In a still further additional embodiment, the initial group of cameras comprises a 3×3 π filter group incorporating Red, Green and Blue cameras.

In yet another embodiment again, the initial groups of cameras comprises all of the cameras in the plurality of groups of cameras.

In a yet further embodiment again, the plurality of cameras have electronic rolling shutters; the set of images are each captured over a rolling shutter time interval; the given frame capture time interval is shorter than a rolling shutter time interval, where the rolling shutter time interval is the time taken to complete read out of image data from a camera in the plurality of cameras; and different portions of the images in the set of images captured by the plurality of groups of cameras that are captured during successive frame capture time intervals are used to render a sequence of frames.

In yet another additional embodiment, the plurality of cameras have electronic rolling shutters; and the given frame capture time interval is shorter than a rolling shutter time interval, where the rolling shutter time interval is the time taken to complete read out of image data from a camera in the plurality of cameras.

In another further embodiment, the staggered start times of the cameras are coordinated so that each of N groups of cameras captures at least a 1/N portion of an image during a given frame capture time interval.

In still another further embodiment, a given frame of video is rendered using pixels comprising pixels from the N groups of cameras captured during the given frame capture time interval.

In yet another further embodiment, the image processing pipeline application further directs the processor to determine scene-dependent geometric corrections that shift pixels captured from an alternate viewpoint to the reference viewpoint by: selecting at least a 1/N portion of an image captured from a first viewpoint during a specific frame capture time interval; interpolating at least a portion of an image from a second viewpoint during the specific frame capture time interval based upon image data captured from the second viewpoint at other times, where the second viewpoint differs from the first viewpoint; and identifying the disparity at which pixels from the selected at least a 1/N portion of an image captured from the first viewpoint and the at least a portion of an image interpolated from the second viewpoint are most similar.

In another further embodiment again, the plurality of cameras have electronic snap-shot shutters.

In another further additional embodiment, the image processing pipeline application further directs the processor to determine scene-dependent geometric corrections that shift pixels captured from an alternate viewpoint to the reference viewpoint by: selecting an image captured from a first viewpoint during a specific frame capture time interval; interpolating at least a portion of an image from a second viewpoint during the specific frame capture time interval based upon image data captured from the second viewpoint at other times, where the second viewpoint differs from the first viewpoint; and identifying the disparity at which pixels from the image captured from the first viewpoint and the at least a portion of an image interpolated from the second viewpoint are most similar.

In still yet another further embodiment, the image processing pipeline application further directs the processor to determine scene-dependent geometric corrections that shift pixels captured from an alternate viewpoint to the reference viewpoint by: capturing a set of images using a group of cameras comprising at least two cameras that capture image data in the same at least one color channel; determining depth estimates for pixel locations in an image from the reference viewpoint using at least a subset of the set of images, wherein generating a depth estimate for a given pixel location in the image from the reference viewpoint includes: identifying pixels in the at least a subset of the set of images that correspond to the given pixel location in the image from the reference viewpoint based upon expected disparity at a plurality of depths; comparing the similarity of the corresponding pixels identified at each of the plurality of depths; and selecting the depth from the plurality of depths at which the identified corresponding pixels have the highest degree of similarity as a depth estimate for the given pixel location in the image from the reference viewpoint.

In still another further embodiment again, the image processing pipeline application further directs the processor to determine scene-dependent geometric corrections that shift pixels captured from an alternate viewpoint to the reference viewpoint by estimating depths for individual pixels determined to be moving during the given frame capture time interval.

In still another further additional embodiment, the image processing pipeline application further directs the processor to determine scene-dependent geometric corrections that shift pixels captured from an alternate viewpoint to the reference viewpoint by estimating depths for clusters of pixels determined to be moving during the given frame capture time interval.

In yet another further embodiment again, the image processing pipeline application further directs the processor to determine scene-dependent geometric corrections that shift pixels captured from an alternate viewpoint to the reference viewpoint by estimating depths for all pixels determined to be moving during the given frame capture time interval.

Another further additional embodiment again of the invention includes: a plurality of cameras that capture images of a scene from different viewpoints, where the plurality of cameras have electronic rolling shutters and capture an image during a rolling shutter time interval; and memory containing an image processing pipeline application. In addition, the image processing pipeline application directs the processor to: select a reference viewpoint; render an initial frame by: capturing a set of images using an initial group of cameras; determining depth estimates for pixel locations in an image from the set of images that is from the reference viewpoint using at least a subset of the set of images. In addition, generating a depth estimate for a given pixel location in the image from the reference viewpoint includes: identifying pixels in the at least a subset of the set of images that correspond to the given pixel location in the image from the reference viewpoint based upon expected disparity at a plurality of depths; comparing the similarity of the corresponding pixels identified at each of the plurality of depths; and selecting the depth from the plurality of depths at which the identified corresponding pixels have the highest degree of similarity as a depth estimate for the given pixel location in the image from the reference viewpoint. Furthermore, the image processing pipeline application directs the processor to: rendering the initial frame from the reference viewpoint using the set of images and the depth estimates for pixel locations in a subset of the set of images to shift pixels captured from alternate viewpoints to the reference viewpoint; render subsequent frames by: obtaining image data from a plurality of groups of cameras from within the plurality of cameras, where each group of cameras starts capturing image data at a staggered start time relative to the other groups of cameras and the staggered start times of the cameras are coordinated so that each of N groups of cameras captures at least a 1/N portion of a frame during a given frame capture time interval that is shorter than the rolling shutter time intervals of each of the plurality of cameras; determining pixels captured by the N groups of cameras during a given frame capture time interval that are moving during the given frame capture time interval; and determining scene-dependent geometric corrections that shift moving pixels captured from an alternate viewpoint to the reference viewpoint by performing disparity searches to identify the disparity at which moving pixels from the different viewpoints are most similar. In addition, the disparity searches include: selecting moving pixels from image data captured from a first viewpoint during the given frame capture time interval; interpolating moving pixels from a second viewpoint during the given frame capture time interval based upon image data captured from the second viewpoint at other times, where the second viewpoint differs from the first viewpoint; and identifying the disparity at which the moving pixels from image data captured from the first viewpoint and the moving pixels interpolated from the second viewpoint are most similar. In addition, the image processing pipeline application directs the processor to: render frames of video, where a given frame of video is rendered using pixels comprising: moving pixels from the N groups of cameras captured during the given frame capture time interval, where moving pixels captured from alternate viewpoints are shifted to reference viewpoint using scene-dependent geometric corrections determined for the pixels captured from the alternate viewpoints; and non-moving pixels from a previously rendered frame from the reference viewpoint.

BRIEF DESCRIPTION OF THE DRAWINGS

FIG. 3B conceptually illustrates a layout of color filters, and a camera group used to estimate depth of non-moving portions of a scene in an array camera module in accordance with an embodiment of the invention.

FIGS. 4A-4C conceptually illustrate the disparity associated with the effects of parallax in two images of a scene captured from a reference viewpoint and an alternate viewpoint.

FIG. 6A illustrates the timing of image data capture by four different groups of cameras within an array camera in accordance with an embodiment of the invention.

FIG. 6B illustrates the timing of display of frames rendered by a processor configured by an image processing pipeline application using image data captured by an array camera in accordance with an embodiment of the invention.

FIG. 6C illustrates the timing of image data capture by an array camera involving capture of image data using a first group of cameras that can be used to estimate depths of non-moving portions of a scene and subsequent image data capture by four different groups of cameras that can be used to estimate depth to moving pixels and render a high frame rate video sequence in accordance with an embodiment of the invention.

DETAILED DESCRIPTION

Figure 1:
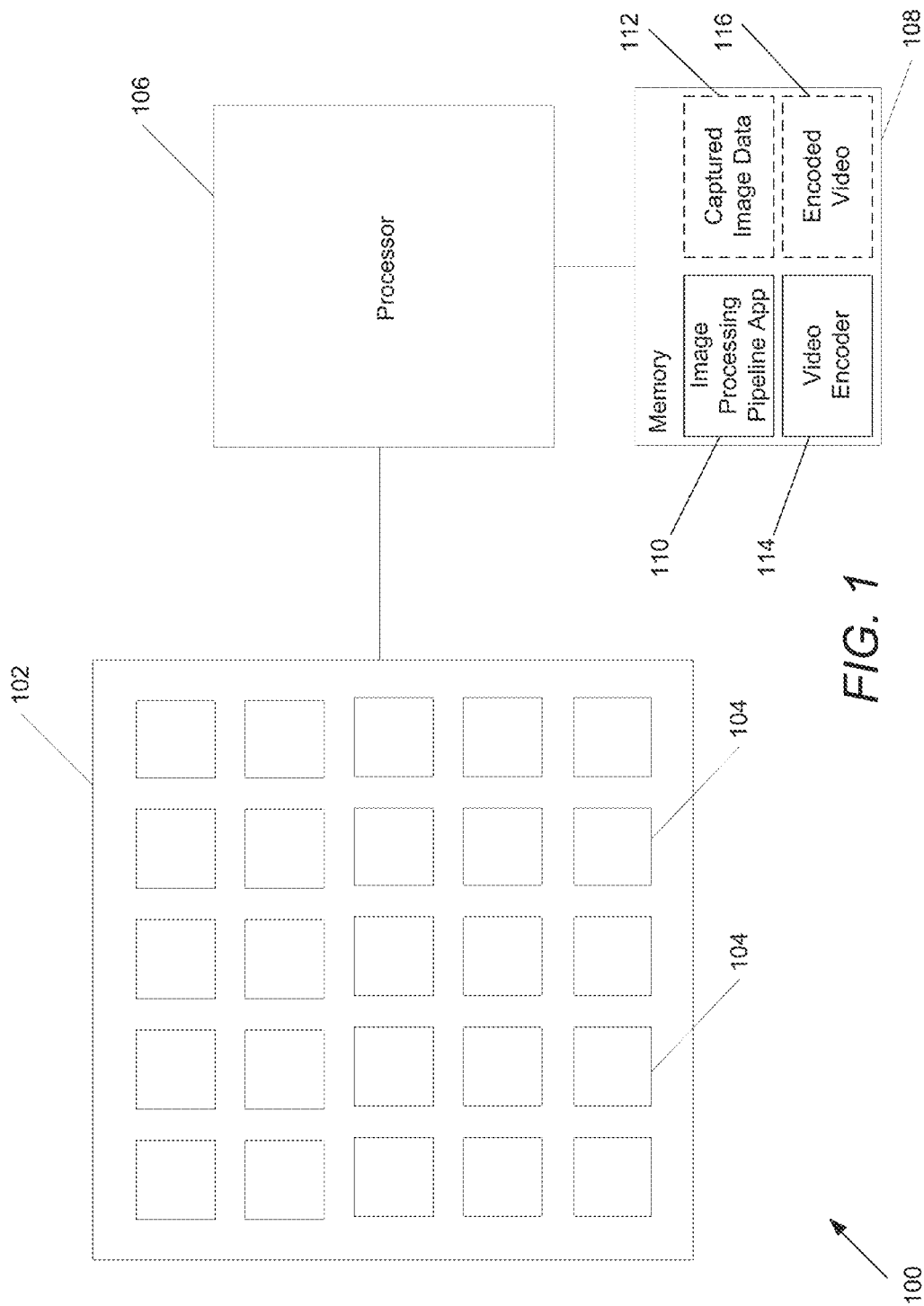
FIG. 1 conceptually illustrates an array camera in accordance with an embodiment of the invention.

Turning now to the drawings, systems and methods for rendering high frame rate video sequences using image data captured by different groups of cameras within an array camera in accordance with an embodiment of the invention are illustrated. Video sequences typically have frame rates in the order of 24 frames per second (fps) or 30 fps. A frame rate in excess of 60 fps can be considered to be so-called "high frame rate" video. In the context of the array cameras discussed herein, high frame rate video is considered to be video in which the rate at which frames are rendered is faster than the rolling shutter speed used by the array camera when reading out data from a single camera or group of cameras within the array. By way of example, an array camera may be able to read out image data from each of four groups of cameras at the rate of 30 fps and render a high speed video sequence from the four sets of image data at 120 fps. By appropriately staggering the start times of image data capture by each of the groups of cameras, the array camera is able to synthesize a high speed video sequence at 120 fps. As can readily be appreciated, any of a variety of rolling shutter speeds and frame rates can be utilized in the synthesis of a high frame rate video sequence as appropriate to the requirements of specific applications in accordance with embodiments of the invention.

Video sequences, where the rolling shutter speed of the cameras in an array camera is less than the frame rate of the video, can be rendered using techniques such as those described in U.S. Pat. No. 8,619,082 entitled "Systems and Methods for Parallax Detection and Correction in Images Captured using Array Cameras that Contain Occlusions using Subsets of Images to Perform Depth Estimation" to Ciurea et al., issued Dec. 31, 2013 and U.S. Patent Publication No. 2014/0267243 entitled "Systems and Methods for Synthesizing Images from Image Data Captured by an Array Camera Using Restricted Depth of Field Depth Maps In which Depth Estimation Precision Varies" to Venkataraman et al., published Sep. 18, 2014. The disclosure within U.S. Pat. No. 8,619,082 and U.S. Patent Publication No. 2014/0267243 related to depth estimation, and the synthesis of images based upon the depth estimates using image data captured by an array camera is hereby incorporated by reference herein in its entirety. Video sequences can be rendered at frame rates that are higher than the rolling shutter speed by using different groups within an array of cameras to capture image data in a staggered manner. The image data from the different groups of cameras can be used to render different portions of a frame during each frame capture time. Each of the groups of cameras, however, views the imaged scene from different perspectives resulting in parallax. In several embodiments of the invention, the process of rendering a high frame rate video sequence involves generating depth estimates for some or all of the objects visible within a scene and using the depth estimates to correct for parallax present in the images captured by each of the cameras within the array. By estimating depth instead of requiring moving objects be located a specified distance from the array of cameras, array cameras in accordance with many embodiments of the invention can image natural scenes including moving objects at arbitrary depths and/or moving objects at multiple different depths within a scene.

In a number of embodiments, a high frame rate video sequence is rendered by capturing an initial frame from a reference viewpoint and detecting pixels in images captured during successive frame capture time intervals that are moving. In several embodiments, detecting moving pixels involves inspecting successive frames captured from a specific viewpoint and detecting pixels with differences in intensity exceeding a threshold. Note that the above process involves detection of movement over the period of a rolling shutter time interval (as opposed to a frame capture interval). Depending upon the requirements of specific applications, a motion detection threshold may be predetermined and/or determined based upon the local characteristics of the image data. Successive frames of video are then rendered by compositing the moving pixels with the initial frame rendered from the reference viewpoint. The compositing process can involve shifting pixels from alternate viewpoints into the reference viewpoint. In order to shift the moving pixels into the reference viewpoint, the depths of the moving pixels can be estimated. In several embodiments, an initial determination is made concerning the pixels that are moving and non-moving pixels are shifted to align with the reference camera to avoid artifacts in the final composited image.

In embodiments where multiple cameras within a group of cameras form a stereo pair or a larger array of cameras from which depth estimates can be made, techniques similar to those described in and incorporated by reference above from U.S. Pat. No. 8,619,082 and U.S. Patent Publication No. 2014/0267243 can be utilized to estimate the depths of moving pixels. In embodiments in which depth estimates cannot be reliably made using image data captured by a single group of cameras, then depth estimation can be performed by observing the disparity between moving pixels in image data captured by different groups of cameras having staggered start capture times. In certain embodiments, all moving pixels are assumed to be at the same depth. In several embodiments, clusters of moving pixels are identified and the pixels within each cluster of moving pixels are assumed to be at the same depth (although the depths of pixels in different clusters may vary).

In many embodiments, the depth of moving pixels visible from a first viewpoint is estimated by interpolating a frame or a portion of a frame from a second viewpoint based upon the frame capture time interval during which the image data from the first viewpoint was captured and using image data captured from the second viewpoint at other times. In this context, the frame capture time interval refers to the time interval during which image data is captured by multiple groups of cameras and used to render a single frame in the high speed video sequence. The locations of the moving pixels visible from the first viewpoint and the estimated locations of moving pixels visible from the second viewpoint at the relevant frame capture time can then be compared to estimate the depth of the moving pixels based upon disparity. The estimated disparity includes a component associated with the depth of the object and a component related to the motion of the object between frame captures. Accordingly, a measure can be utilized that minimizes the perceived shift due to motion and eliminates shift due to parallax. In many embodiments, an image from the second viewpoint is interpolated using image data captured from the second viewpoint at time intervals before and after the relevant frame capture time interval in which the image data from the first viewpoint was captured. When the first viewpoint is an alternate viewpoint to the reference viewpoint from which the initial frame of video is rendered, the reference viewpoint is typically selected as the second viewpoint from which to interpolate a frame. In embodiments in which the groups of cameras include cameras that capture image data in separate color channels, depth estimates for moving pixels captured from the reference viewpoint (e.g. a Green camera with a viewpoint selected as the reference viewpoint) can be useful in fusing moving pixels from other color channels captured by cameras within the group of cameras containing the reference camera. Accordingly, depth estimates can be determined when the first viewpoint is the reference viewpoint by interpolating a frame or portion of a frame of video from a second viewpoint that is an alternate viewpoint to the reference viewpoint. In other embodiments, any of a variety of techniques can be utilized to estimate the depths of moving pixels by performing disparity searches using image data captured by an array camera as appropriate to the requirements of specific applications.

Disparity searches can be performed comparing the similarity of pixels from different viewpoints along one or more epipolar lines. The comparisons are typically performed between a reference viewpoint and an alternate viewpoint however, any set of viewpoints can be utilized when performing disparity searches. In a number of embodiments, disparity searches involve determining the disparity at which the moving pixels from a first viewpoint exhibit the highest correlation with moving pixels from a second viewpoint. In certain embodiments, disparity searches are performed with respect to individual clusters of moving pixels based upon the disparity at which a cluster of moving pixels visible from the first viewpoint exhibits the highest correlation with a cluster of moving pixels visible from the second viewpoint. In a number of embodiments, depth estimates are made for individual moving pixels or smaller blocks of moving pixels using cost metrics such as (but not limited to) sum of absolute differences and/or the cost functions described in U.S. Pat. No. 8,619,082 and U.S. Patent Publication No. 2014/0267243 (incorporated by reference above). In addition, depth estimates can be obtained using pixels that are visible from two or more different viewpoints.

The depths of moving pixels can be utilized to determine scene-dependent geometric corrections to apply to the moving pixels observed from alternate viewpoints to shift the moving pixels to a reference viewpoint. A new frame of video can then be rendered by compositing any moving pixels observed from the reference viewpoint with moving pixels shifted from alternate viewpoints into the reference viewpoint and non-moving pixels from a frame previously rendered from the reference viewpoint.

In a number of embodiments, the groups of cameras include single cameras that capture image data in a single color channel (e.g. a monochrome white camera, or an infrared camera) or in multiple color channels (e.g. a camera utilizing a Bayer color filter). In several embodiments, the groups of cameras include multiple cameras. In certain embodiments that utilize multiple monochrome cameras in different color channels (e.g. a Red camera, a Green camera, and a Blue camera), the rendering of non-moving pixels including intensity components in each of the color channels can also involve estimating depth in order to be able to shift the pixels into the reference viewpoint. Accordingly, array cameras in accordance with many embodiments of the invention also estimate depth for non-moving pixels in the reference frame. In a number of embodiments, the depths of non-moving pixels within a scene can be estimated from image data captured by the different groups of cameras in the array camera over a timer interval that is longer than a single frame capture time interval. Unlike moving pixels, the non-moving pixels can be assumed stationary through the entire time period during which an entire frame of image data is captured by the different cameras in the array of cameras. Therefore, disparity searches can be performed across an entire set of image data captured by the different groups of cameras over one or more rolling shutter intervals using techniques similar to those described in U.S. Pat. No. 8,619,082 and U.S. Patent Publication No. 2014/0267243 (incorporated by reference above). In a number of embodiments that include cameras that capture image data in separate color channels, an initial depth map is estimated by capturing an initial frame or sequence of frames using a sufficiently large number of cameras so that multiple images are captured in each color channel. Ideally, the number of cameras is sufficiently large so that a camera in each color channel is distributed around the reference viewpoint and so that each pixel captured from the reference viewpoint is visible in at least one image captured from an alternate viewpoint in each color channel. Processes similar to those described in U.S. Pat. No. 8,619,082 and U.S. Patent Publication No. 2014/0267243 (incorporated by reference above) can then be utilized to generate an initial depth map with respect to the non-moving pixels. Once the depth map is obtained, depths in the depth map can be assigned to non-moving pixels and the depths in the depth map for moving pixels can be determined using the processes described above and utilized to update the depth map. In several embodiments, the depths from the initial depth map can be used to bound disparity searches with respect to moving pixels.

In certain embodiments, the process of estimating depth also involves generation of a confidence metric that encodes one or more confidence factors. The manner in which an image processing application utilizes depth estimates in the rendering of a video sequence can be dependent upon the confidence of the depth estimate.

Systems and methods for rendering high frame rate video sequences using image data captured by array cameras in accordance with various embodiments of the invention are discussed further below.

Array Cameras

Array cameras in accordance with many embodiments of the invention can include an array camera module including an array of cameras and a processor configured to read out and process image data from the camera module to synthesize images. An array camera in accordance with an embodiment of the invention is illustrated in FIG. 1. The array camera 100 includes an array camera module 102 with an array of individual cameras 104, where an array of individual cameras refers to a plurality of cameras in a particular arrangement, such as (but not limited to) the square arrangement utilized in the illustrated embodiment. In other embodiments, any of a variety of grid or non-grid arrangements of cameras can be utilized. Various array camera configurations including monolithic and monolithic arrays incorporating various different types of cameras are disclosed in U.S. Patent Publication No. 2011/0069189 entitled "Capturing and Processing of Images Using Monolithic Camera Array with Heterogeneous Imagers" to Venkataraman et al., the relevant disclosure with respect to different array camera configurations including (but not limited to) the disclosure with respect to arrays of arrays is hereby incorporated by reference herein in its entirety. The array camera module 102 is connected to the processor 106. The processor is also configured to communicate with one or more different types of memory 108 that can be utilized to store an image processing pipeline application 110, image data 112 captured by the array camera module 102, a video encoder 114 and encoded video 116. The image processing pipeline application 110 is typically non-transitory machine readable instructions utilized to direct the processor to perform processes including (but not limited to) the various processes described below. In several embodiments, the processes include coordinating the staggered capture of image data by groups of cameras within the array camera module 102, the estimation of depth information from the captured image data 112 and the rendering of frames of video using the captured image data. The video encoder 114 is similarly non-transitory machine readable instructions that direct the processor to encode frames of video rendered by the image processing pipeline application for storage as encoded video 116 in the memory 108.

Processors 108 in accordance with many embodiments of the invention can be implemented using a microprocessor, a coprocessor, an application specific integrated circuit and/or an appropriately configured field programmable gate array that is directed using appropriate software to take the image data captured by the cameras within the array camera module 102 and output an encoded high frame rate video sequence. In several embodiments, the video sequence is rendered from a reference viewpoint, typically that of a reference camera 104 within the array camera module 102. In many embodiments, the processor is able to synthesize the video sequence from one or more virtual viewpoints, which do not correspond to the viewpoints of any of the focal planes 104 in the array camera module 102. Unless all of the objects within a captured scene are a significant distance from the array camera, the images of the scene captured within the image data will include disparity due to the different fields of view of the cameras used to capture the images. Processes for detecting and correcting for disparity are discussed further below. Although specific array camera architectures are discussed above with reference to FIG. 1, alternative architectures can also be utilized in accordance with embodiments of the invention.

Array Camera Modules

Array camera modules in accordance with embodiments of the invention can be constructed from an imager array or sensor including an array of focal planes and an optic array including a lens stack for each focal plane in the imager array. Sensors including multiple focal planes and the operation of such sensors are discussed in U.S. Patent Publication No. 2012/0013748 entitled "Architectures for System on Chip Array Cameras", to Pain et al., the relevant disclosure from which is incorporated herein by reference in its entirety. A sensor including a single array of pixels on which images are formed by the optics of each camera can also be utilized to capture image data. In several embodiments, each camera includes a separate sensor. In many embodiments, individual lens barrels are utilized to implement the optics of the camera. Array camera modules incorporating cameras implemented using combinations of separate sensors and optic arrays, separate sensors and separate lens barrels and a single sensor and separate lens barrels in accordance with embodiments of the invention are disclosed in U.S. patent application Ser. No. 14/536,554 entitled "Array Cameras Incorporating Independently Aligned Lens Stacks" to Rodda et al. filed Nov. 7, 2014, the relevant disclosure from which is incorporated by reference herein in its entirety. Light filters can be used within each optical channel formed by the optics of a camera in the array camera module to enable different cameras to capture image data with respect to different portions of the electromagnetic spectrum.

Figure 2:
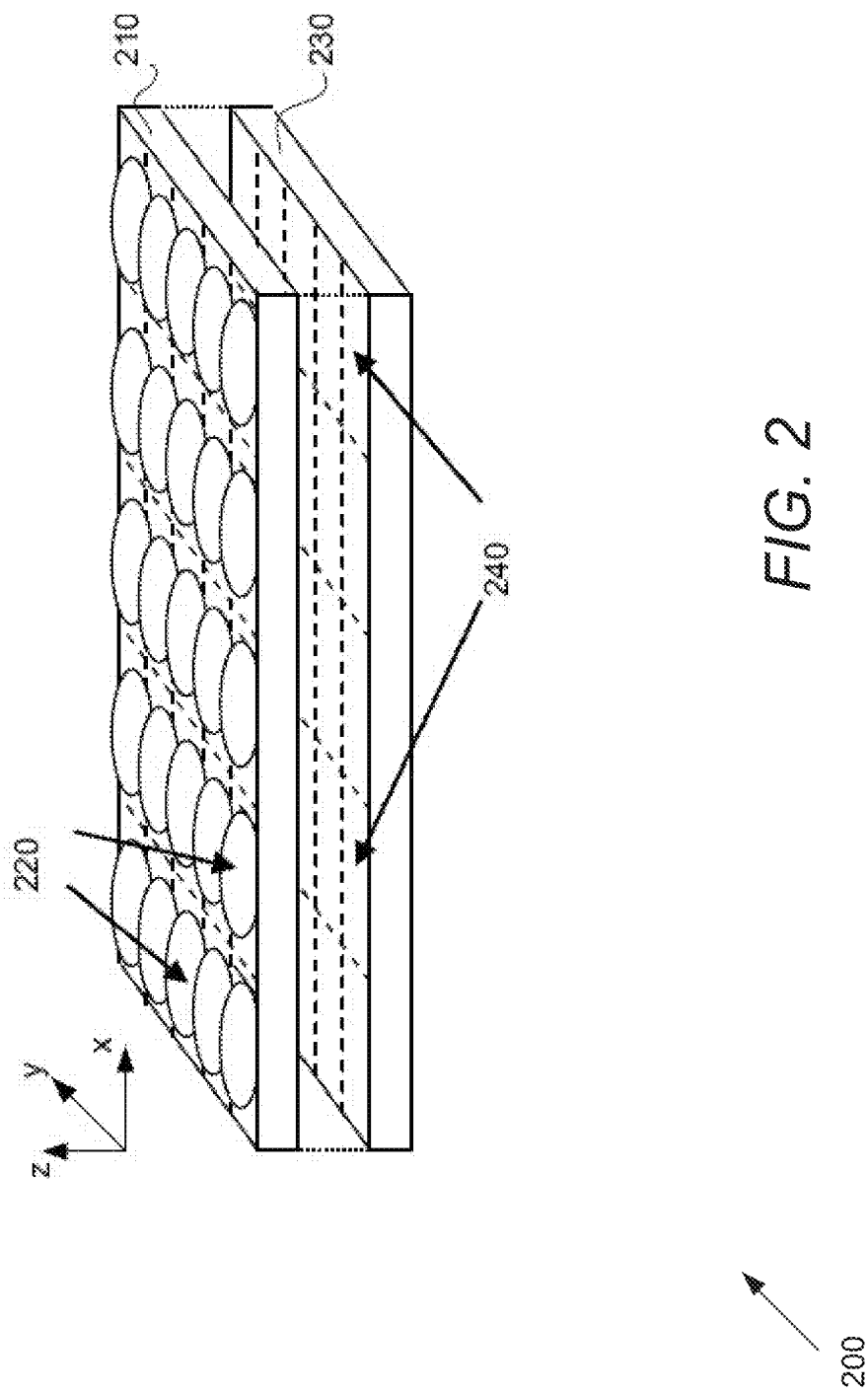
FIG. 2 conceptually illustrates an optic array and an imager array in an array camera module in accordance with an embodiment of the invention.

An array camera module implemented using an optic array including a lens stack for each focal plane on a monolithic imager array in accordance with an embodiment of the invention is illustrated in FIG. 2. The array camera module 200 includes an imager array 230 including an array of focal planes 240 along with a corresponding optic array 210 including an array of lens stacks 220. Within the array of lens stacks, each lens stack 220 creates an optical channel that forms an image of the scene on an array of light sensitive pixels within a corresponding focal plane 240. Each pairing of a lens stack 220 and focal plane 240 forms a single camera 104 within the camera module. Each pixel within a focal plane 240 of a camera 104 generates image data that can be sent from the camera 104 to the processor 108. In many embodiments, the lens stack within each optical channel is configured so that pixels of each focal plane 240 sample the same object space or region within the scene. In several embodiments, the lens stacks are configured so that the pixels that sample the same object space do so with sub-pixel offsets to provide sampling diversity that can be utilized to recover increased resolution through the use of super-resolution processes. In this way, the same array of cameras can offer increased resolution during single frame image capture and support high frame rate video capture.

In the embodiment illustrated in FIG. 2, the focal planes are configured in a 5×5 array. Each focal plane 240 on the sensor is capable of capturing an image of the scene. Typically, each focal plane includes a plurality of rows of pixels that also forms a plurality of columns of pixels, and each focal plane is contained within a region of the imager that does not contain pixels from another focal plane. In many embodiments, image data capture and readout of each focal plane can be independently controlled. In this way, image capture settings including (but not limited to) the exposure times and analog gains of pixels within a focal plane can be determined independently to enable image capture settings to be tailored based upon factors including (but not limited to) a specific color channel and/or a specific portion of the scene dynamic range. The sensor elements utilized in the focal planes can be individual light sensing elements such as, but not limited to, traditional CIS (CMOS Image Sensor) pixels, CCD (charge-coupled device) pixels, high dynamic range sensor elements, multispectral sensor elements and/or any other structure configured to generate an electrical signal indicative of light incident on the structure. In many embodiments, the sensor elements of each focal plane have similar physical properties and receive light via the same optical channel and color filter (where present). In other embodiments, the sensor elements have different characteristics and, in many instances, the characteristics of the sensor elements are related to the color filter applied to each sensor element.

In several embodiments, color filters in individual cameras can be used to pattern the camera module with $\pi$ filter groups as further discussed in U.S. Patent Publication No. 2014/0293760 entitled "Camera Modules Patterned with pi Filter Groups" to Nisenzon et al., the relevant disclosure from which related to various patterns of spectral filters that can be utilized in the implementation of array cameras is hereby incorporated by reference herein in its entirety. These cameras can be used to capture data with respect to different colors, or a specific portion of the spectrum. In contrast to applying color filters to the pixels of the camera, color filters in many embodiments of the invention can be included in the lens stack and/or elsewhere within an optical channel. For example, a Green color camera can include a lens stack with a Green light filter that allows Green light to pass through the optical channel. In many embodiments, the pixels in each focal plane are the same and the light information captured by the pixels is differentiated by the color filters in the corresponding lens stack for each filter plane. Although a specific construction of a camera module with an optic array including color filters in the lens stacks is described above, camera modules including $\pi$ filter groups can be implemented in a variety of ways including (but not limited to) by applying color filters to the pixels of the focal planes of the camera module similar to the manner in which color filters are applied to the pixels of a conventional color camera. In several embodiments, at least one of the cameras in the camera module can include uniform color filters applied to the pixels in its focal plane. In many embodiments, a Bayer filter pattern is applied to the pixels of at least one of the cameras in a camera module. In a number of embodiments, camera modules are constructed in which color filters are utilized in both the lens stacks and on the pixels of the imager array.

Although specific array cameras and imager arrays are discussed above, many different array cameras can be utilized to capture image data and synthesize images using restricted depth of field depth maps as appropriate to the requirements of specific applications in accordance with embodiments of the invention. Imager arrays in accordance with various embodiments of the invention are discussed further below.

Capturing Image Data with Groups of Active Cameras

Cameras in an array camera module in accordance with many embodiments of the invention can be grouped into subsets or groups for capturing image data. The manner in which high speed video sequences are rendered and depth maps are generated depends upon the number and type of cameras in each group. Various techniques for estimating depth and rendering frames of video at high frame rates based upon the number, type and/or layout of the groups of cameras in an array are described further below. In a number of embodiments, the cameras in the array capture image data in a single color channel. In several embodiments, the cameras in an array can incorporate spectral filters patterned to enable one or more of the cameras to capture image data in multiple color channels (e.g. Bayer filter patterns). In a number of embodiments, various cameras in an array have different spectral filters so that the cameras capture image data in a single color channel and the combined image data yields a set of image data captured in multiple color channels.

In embodiments in which individual cameras image in all of the color channels of the array camera, high frame rate video can be rendered using groups of cameras that include one or more cameras. In embodiments in which different cameras capture images in different color channels, the groups of cameras typically include at least one camera from each color channel. In embodiments in which only one camera from a given color channel is included in a group of cameras, then depth estimation can be performed using image data captured by multiple different groups of cameras. Where a group includes multiple cameras from at least one color channel, then depth estimation can be performed using only the image data captured by cameras in the group. Although, for a variety of reasons an array camera may still utilize image data captured by multiple groups of cameras to perform depth estimation.

In many embodiments, groups of cameras that each include a 3×3 π filter group incorporating Red, Green and Blue cameras are used to capture image data from which frames of video can be synthesized at a frame rate that is higher than the rolling shutter speed for the 3×3 π filter group of cameras. Image data captured by multiple different π filter groups of cameras during successive frame capture time intervals can be utilized to render video at a frame rate that is faster than the rolling shutter speed of an individual 3×3 π filter group of cameras. Image data captured by a single 3×3 π filter groups of cameras can be used to estimate depth for pixels imaged by the 3×3 π filter groups of cameras using the techniques described in and incorporated by reference from U.S. Pat. No. 8,619,082 and U.S. Patent Publication No. 2014/0267243. The estimated depths can then be used to shift pixels, such as (but not limited to) moving pixels, into the viewpoint of a reference camera within one of the 3×3 π filter groups of cameras. In other embodiments, any of a variety of groups of cameras can be utilized that enable depth to be estimated from the image data captured by an individual group of cameras during the rendering of high frame rate video sequences.

As can readily be appreciated, utilizing 3×3 π filter groups of cameras to capture image data may necessitate a large array of cameras. By way of example, an array camera using 3×3 π filter groups of cameras that have a rolling shutter enabling readout at 30 fps can require at least a 6×6 array of cameras in order to render video at a rate of 120 fps. A similar frame rate can be achieved in accordance with many embodiments of the invention by utilizing smaller groups of cameras. In several embodiments, each group of cameras includes a single Red, Green, and Blue camera.

Figure 3A:
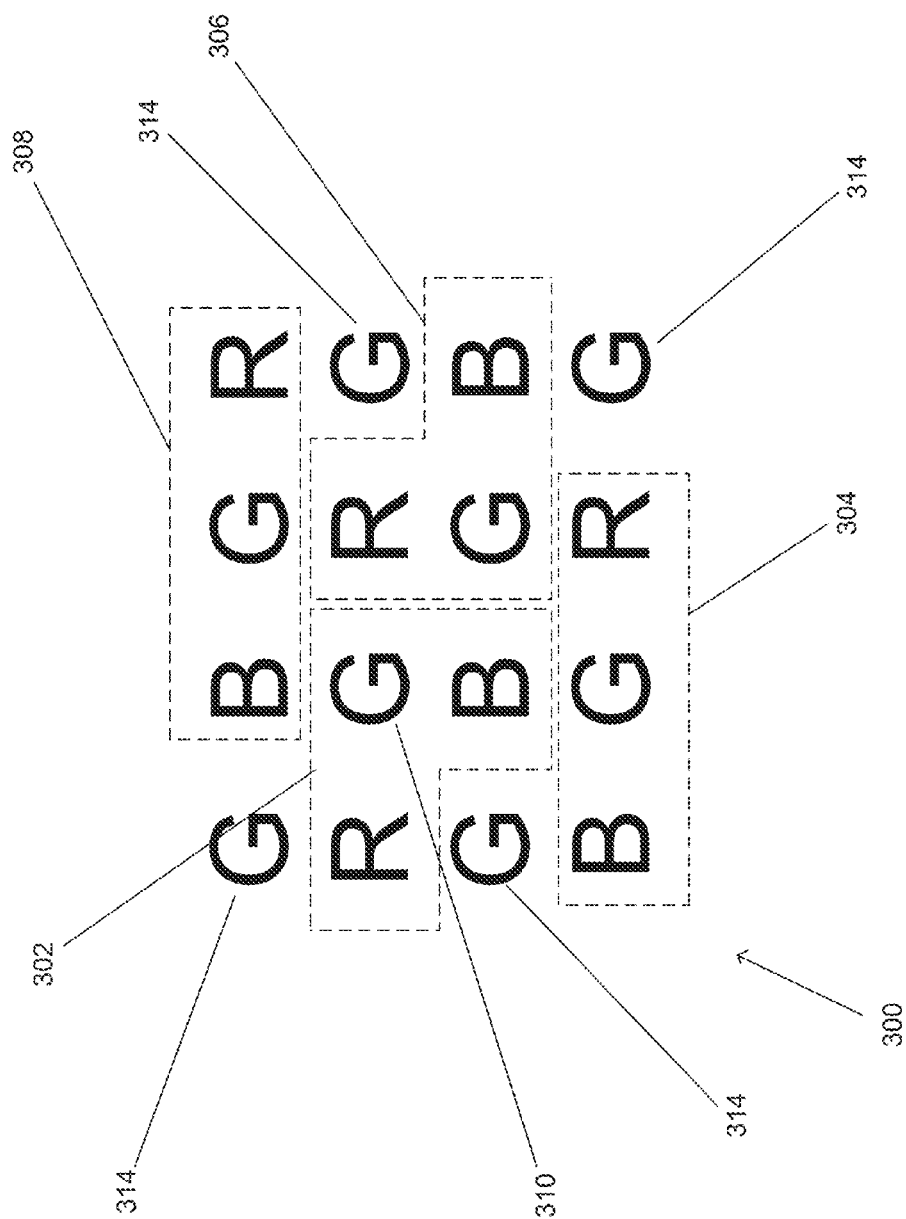
FIG. 3A conceptually illustrates a layout of color filters, camera groups used when performing high speed video capture, and the location of a reference camera in an array camera module in accordance with an embodiment of the invention.

A 4×4 array camera module including four groups of active cameras configured to capture image data used to render a high speed video sequence from the viewpoint of a reference camera in accordance with an embodiment of the invention is illustrated in FIG. 3A. The 4×4 array camera module 300 is used to define four groups of cameras that each includes a single Blue camera, a single Green camera, and a single Red camera. In order to reduce the largest shift between viewpoints of cameras in a given time interval, a first group 302 is read out starting at a first capture time, a second group 304 is read out starting at a staggered second capture time, a third group 306 is read out starting at a further staggered third capture time, and a fourth group 308 is read out starting at a still further staggered fourth capture time. As is discussed further below with reference to FIGS. 6A-6E, the staggering of the start of the capture times of the different groups of cameras and the fact that the frame rate is faster than the rolling shutter of each group of cameras means that each camera captures and reads out image data from at least 1/N of the total number of rows (or columns) of a rendered frame during each frame capture time interval, where N is the number of groups of cameras (i.e. ¼ of the total number of rows in the rendered frame for the illustrated embodiment). The image data captured by the cameras can be photometrically and geometrically normalized to increase the similarity of the imaged data captured by each of the cameras. These (and other) normalization processes can improve the accuracy of depth estimates generated by the array camera. The process of estimating the depth to objects within the scene can involve determining scene geometric corrections that can be applied to shift pixels captured from different viewpoints into a reference viewpoint. Computational complexity can be reduced by only estimating depth for moving pixels, and then using the depth estimates to shift the moving pixels to the reference viewpoint. Alternatively, systems can assume that motion is uniform and determine motion between two viewpoints and utilize the motion vectors for the moving pixels with respect to other viewpoints. Once the moving pixels are shifted into the reference viewpoint, a new frame from the reference viewpoint can be rendered by compositing the moving pixels with non-moving pixels from a frame previously rendered from the reference viewpoint.

In many embodiments, more than 1/N of the total number of rows (or columns) of a rendered frame are read out from each of N groups of cameras during a frame capture time interval to accommodate vertical parallax observable between the viewpoints of the cameras in the different groups of cameras. Conceivably, pixels that are not visible in a first set of rows read out from a first group of cameras may also not be visible in a second sequential group of rows read out from a second group of cameras due to vertical parallax shifting the unobserved pixels into the field of view sampled by the first 1/N of the total number rows (or columns) of the sensors in the second group of cameras. By increasing the number of rows (or columns) read out during a frame capture time interval by an amount corresponding to the likely observed vertical parallax of foreground objects between viewpoints of groups of cameras that sample progressive portions of the scene, then the likelihood of unobserved objects or portions of objects at the boundaries between portions of the scene sampled by different groups of cameras during a display frame interval can be diminished. Readout of approximately $\frac{1}{3}^{rd}$ of the rows of four groups of cameras during every frame capture interval is conceptually illustrated in FIG. 6D. As can readily be appreciated, there is overlap in the sequential groups of rows captured by each of the groups of cameras enabling identification of objects that might otherwise be unobserved due to vertical parallax. Alternatively, searches can be conducted with respect to image data captured by the camera during the previous or next frame capture time interval. The searching of additional rows captured by a specific camera group during a previous frame capture interval (630) to the frame capture interval of a rendered frame (632) and/or a subsequent frame capture time interval (634) is conceptually illustrated in FIG. 6E. Objects that might otherwise be unobserved due to vertical parallax can be rendered by searching for the objects in additional rows captured by a camera group during different frame capture intervals. Viewed another way, the frame capture time intervals could be considered to overlap in the sense that certain rows (or columns) of image data captured by a camera could be used in the rendering of two successive frames in the high speed video sequence in order to accommodate vertical parallax at the boundaries between the portions of a rendered frame captured by different groups of cameras in a manner that is conceptually similar to the readout of more than 1/N of the total number of rows (or columns) of the rendered frame.

As noted above, depth estimation can be simplified by including multiple cameras within a color channel in each group of cameras. Accordingly, the groups of cameras illustrated in FIG. 3A can be increased in size to accommodate a second Green camera 314 to provide additional image data in the Green color channel for use in depth estimation. Typically, pairs of Green cameras with large baselines are combined within a subgroup to increase observed disparity between the images captured by the Green cameras. Increasing the number of cameras can increase the rolling shutter time to acquire data from a group of cameras, thereby incorporating a second Green camera in each group of cameras can result in a drop in the display frame rate of the high speed video.

As is discussed further below, depth can be estimated without requiring that a group of cameras incorporate multiple cameras within a color channel. In many embodiments, depth for non-moving pixels can be estimated utilizing image data captured by multiple groups of cameras over one or more rolling shutter intervals. In several embodiments, moving pixels are identified using sequential sets of image data captured by each of the groups of cameras. The moving pixels are then disregarded and the images captured during one or more rolling shutter intervals by the active cameras in the array can be utilized to perform depth estimation with respect to the non-moving pixels. Depth estimation for moving pixels during a given frame capture time interval can be determined by interpolating a frame or a portion of a frame from an alternate viewpoint in at least one color channel (typically a Green color channel) for the relevant frame capture time interval for the purpose of performing parallax detection. In many embodiments, frames or portions of frames are interpolated from alternate viewpoints in each of the Red, Green and Blue color channels and disparity searches are conducted with respect to the image data captured in the Green, Red and Blue color channels. In a number of embodiments, image gradient can be utilized to compare similarity of corresponding images captured in different color channels reducing the need to provide multiple cameras of the same color channel to perform disparity estimation.

As noted above, different processes for estimating depth can be used for moving and non-moving pixels. Due to the static nature of non-moving pixels, depth estimation for non-moving pixels can be performed using image data captured over periods of time longer than the frame capture time interval. Furthermore, the frequency with which depth estimates need to be made with respect to non-moving pixels is sufficiently low that different groupings of cameras can be used to capture image data for estimating the depth of non-moving pixels. In several embodiments, an initial group of cameras including multiple cameras in at least one of the color channels is used to generate an initial depth map and then smaller groups of cameras are used to acquire image data for rendering high frame rate video sequences. As discussed above, the initial depth map can be used to seed depths for non-moving pixels and seed and/or constrain subsequent depth searches for moving pixels. In a number of embodiments, computation can be reduced by assuming that depth, once determined, remains constant over a short time interval corresponding to a number of successive frames. A 4×4 array camera module including a 3×3 π filter group of cameras configured to capture image data from which an initial depth map can be estimated in accordance with an embodiment of the invention is illustrated in FIG. 3B. The 4×4 array camera module 300 includes an initial group 312 of 3×3 active cameras patterned using a π filter group and utilized to capture image data that can be utilized to synthesize color images and/or video sequences. In the illustrated embodiment, a π filter group includes a Green camera at each corner, a Green reference camera in the center 310, Blue cameras above and below the reference camera, and Red cameras to the left and right sides of the reference camera. In several embodiments, the locations of the Red and Blue cameras within the π filter group are swapped and/or an alternative collection of cameras can be utilized to capture image data to synthesize images. In several embodiments, a camera that captures white light, a camera that captures infrared light or a Bayer camera can be utilized at the center of the 3×3 π filter group of cameras. In various embodiments, a second subset 306 of active cameras includes a row of Blue, Green, and Red cameras placed below the π filter group and a column of Blue, Green, and Red cameras placed to the right side of the π filter group with a Green camera connecting the row and the column. In various embodiments, the second subset of active cameras is configured to capture image data for measuring scene information as is described in U.S. Patent Application Ser. No. 61/775,395 entitled "Systems and Methods for Measuring Scene Information While Capturing Images Using Array Cameras" filed Mar. 8, 2013, the disclosure of which is hereby incorporated by reference in its entirety.

Although specific groups of cameras utilized to capture image data are described above with reference to FIGS. 4A and 4B, the specific groups of cameras utilized can depend upon the type and number of cameras present in an array camera, the rolling shutter speed of image data readout by the array camera, the desired frame rate and the requirements of a specific application. Processes for rendering high speed video sequences using image data captured using groups of cameras within an array camera in accordance with embodiments of the invention are discussed further below. Before discussing these processes, however, a brief review of the scene dependent geometric shifts or parallax observed in image data captured by cameras from different viewpoints is provided below. As can readily be appreciated by the discussion above, accurate estimation of the scene dependent geometric shifts that are present in the image data captured by different groups of cameras from different viewpoints can be an important factor in the rendering of smooth high speed video.

Determining Parallax/Disparity

Figure 4A:
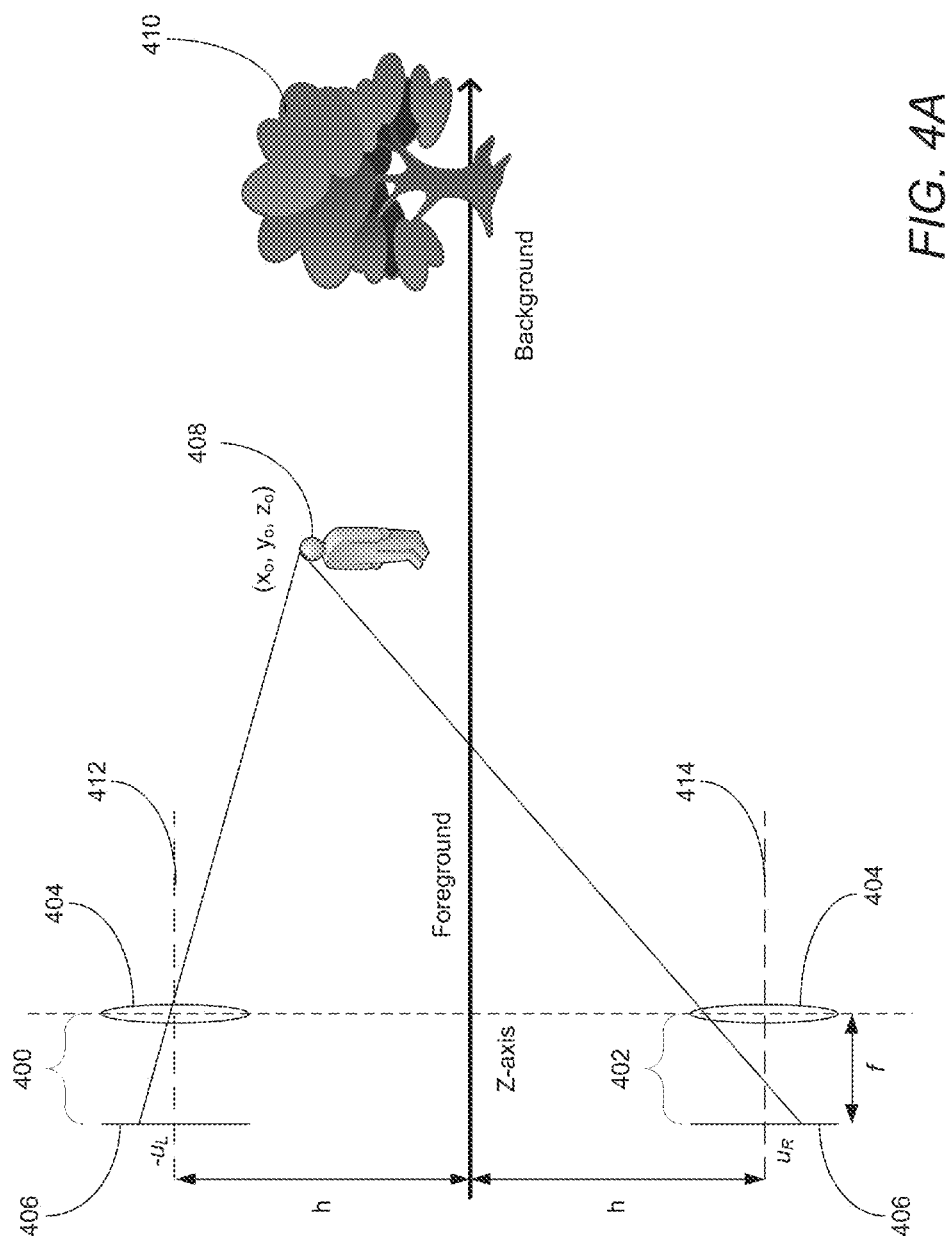

In a number of embodiments, individual cameras in an array used to capture image data have similar fields of view, fixed apertures, and focal lengths. Parallax in a two camera system is illustrated in FIG. 4A. The two cameras 400, 402, include a lens stack 404 and a focal plane 406. Each camera has a back focal length f, and the two cameras are separated by the baseline distance of 2h. The field of view of both cameras encompasses a scene including a foreground object 408 and a background object 410. The scene from the viewpoint of the first camera 400 is illustrated in FIG. 4B. In the image 450 captured by the first camera, the foreground object 408 appears located slightly to the right of the background object 410. The scene from the viewpoint of the second camera 402 is illustrated in FIG. 4C. In the image 452 captured by the second camera, the foreground object 408 appears shifted to the left hand side of the background object 410. The disparity introduced by the different fields of view of the two cameras 400, 402, is equal to the difference in location of the foreground object 408 between its location in the image captured by the first camera (indicated in the image captured by the second camera by ghost lines 454) and its location in the image captured by the second camera. As is discussed further below, the distance from the two cameras to the foreground object can be obtained by determining the disparity of the foreground object in the two captured images.

Referring again to FIG. 4A, the point $(x_0, y_0, z_0)$ on the foreground object will appear on the focal plane of each camera at an offset from the camera's optical axis. The offset of the point on the focal plane of the first camera 400 relative to its optical axis 412 is shown as $-u_L$. The offset of the point on the focal plane of the second camera 402 relative to its optical axis 414 is shown as $u_R$. Using similar triangles, the offset between the images captured by the two cameras can be observed as follows:

$$\frac{h - x_o}{z_o} = \frac{-u_L}{f}$$

$$\frac{h + x_o}{z_o} = \frac{u_R}{f}$$

$$\frac{h - x_o}{z_o} = \frac{-u_L}{f}$$

$$\frac{h + x_o}{z_o} = \frac{u_R}{f}$$

Combining the two equations yields the disparity (or parallax) between the two cameras as:

$$\Delta_{parallax} = u_R - u_L = \frac{2hf}{z_o}$$

From the above equation, it can be seen that disparity between images captured by the cameras is along a vector in the direction of the baseline of the two cameras, which can be referred to as the epipolar line between the two cameras. Furthermore, the magnitude of the disparity is directly proportional to the baseline separation of the two cameras and the back focal length of the cameras and is inversely proportional to the distance from the camera to an object appearing in the scene.

Occlusions in Array Cameras

When multiple images of a scene are captured from different perspectives and the scene includes foreground objects, the disparity in the location of the foreground object in each of the images results in portions of the scene behind the foreground object being visible in some but not all of the images. A pixel that captures image data concerning a portion of a scene, which is not visible in images captured of the scene from other viewpoints, can be referred to as an occluded pixel. Referring again to FIGS. 4B and 4C, when the viewpoint of the second camera is selected as a reference viewpoint the pixels contained within the ghost lines 454 in the image 452 can be considered to be occluded pixels (i.e. the pixels capture image data from a portion of the scene that is visible in the image 452 captured by the second camera 402 and is not visible in the image 450 captured by the first camera 400). In the second image, the pixels of the foreground object 408 can be referred to as occluding pixels as they capture portions of the scene that occlude the pixels contained within the ghost lines 454 in the image 452. Due to the occlusion of the pixels contained within the ghost lines 454 in the second image 452, the distance from the camera to portions of the scene visible within the ghost lines 454 cannot be determined from the two images as there are no corresponding pixels in the image 450 shown in FIG. 4B.

As is discussed further below, increasing the number of cameras capturing images of a scene from different viewpoints in complimentary occlusion zones around the reference viewpoint increases the likelihood that every portion of the scene visible from the reference viewpoint is also visible from the viewpoint of at least one of the other cameras. When the array camera uses different cameras to capture different wavelengths of light (e.g. RGB), distributing at least one camera that captures each wavelength of light on either side of the reference viewpoint, and/or in the quadrants surrounding a reference viewpoint can significantly decrease the likelihood that a portion of the scene visible from the reference viewpoint will be occluded in every other image captured within a specific color channel. Accordingly, more reliable depth estimates can be obtained for non-moving pixels by performing parallax detection with respect to non-moving pixels over all image data captured during a single rolling shutter interval by the active cameras in an array camera. In this way, the images captured in each color channel within complementary occlusion zones can be utilized in the estimation of depth for the non-moving pixels. The distribution of color filters in array cameras to reduce the likelihood of occlusions in accordance with embodiments of the invention is discussed further in U.S. Patent Publication No. 2014/0293760, the relevant disclosure of which is incorporated herein by reference in its entirety. Where depth estimates for moving pixels cannot be made using image data captured from within complementary occlusion zones (e.g. when each group only contains a single camera in each color channel), the effects of occlusion can be minimized by filtering depth estimates for moving pixels across rendered frames. In this way, obvious depth discontinuities arising from occlusions can be smoothed and/or ignored to increase the likelihood that depth is estimated correctly.

Using Disparity to Generate Depth Estimates in Array Cameras

Array cameras in accordance with many embodiments of the invention use disparity observed in images captured by the array cameras to estimate depth and/or generate a depth map. A depth map is typically regarded as being a layer of meta-data concerning an image or frame of video that describes the distance from the camera to specific pixels or groups of pixels within the image (depending upon the resolution of the depth map relative to the resolution of the image). Array cameras in accordance with a number of embodiments of the invention use depth maps for a variety of purposes including (but not limited to) generating scene dependent geometric shifts during the synthesis of a high resolution image and/or rendering of high frame rate video sequences.

Based upon the discussion of disparity above, the process of determining the depth of a portion of a scene based upon pixel disparity is theoretically straightforward. When the viewpoint of a specific camera in the array camera is chosen as a reference viewpoint, the distance to a portion of the scene visible from the reference viewpoint can be determined using the disparity between the corresponding pixels in some or all of the images captured by the camera array. In the absence of occlusions, a pixel corresponding to a pixel in the image captured from the reference viewpoint will be located in each image along an epipolar line (i.e. a line parallel to the baseline vector between the two cameras). The distance along the epipolar line of the disparity corresponds to the distance between the camera and the portion of the scene captured by the pixels. Therefore, by comparing the pixels in the captured images that are expected to correspond at a specific depth, a search can be conducted for the depth that yields the pixels having the highest degree of similarity. The depth at which the corresponding pixels in the captured images have the highest degree of similarity can be assumed to be the most likely distance between the camera and the portion of the scene captured by the pixel. Similar processes can be utilized when synthesizing a depth map from a virtual viewpoint.

Many challenges exist, however, in determining an accurate depth estimates using the method outlined above. In several embodiments, the cameras in an array camera are similar but not the same. Therefore, characteristics including (but not limited to) optical characteristics, different sensor characteristics (such as variations in sensor response due to offsets, different transmission or gain responses, non-linear characteristics of pixel response), noise in the captured images, and/or warps or distortions related to manufacturing tolerances related to the assembly process can vary between the images reducing the similarity of corresponding pixels in different images. In addition, super-resolution processes rely on sampling diversity and/or aliasing in the images captured by an imager array in order to synthesize higher resolution images. However, increasing sampling diversity can also involve decreasing similarity between corresponding pixels in the images captured by an array camera. Given that the process for determining depth outlined above relies upon the similarity of pixels, the presence of photometric differences and sampling diversity between the captured images can reduce the accuracy with which a depth map can be determined.

The generation of depth estimates can be further complicated by occlusions. As discussed above, an occlusion occurs when a pixel that is visible from the reference viewpoint is not visible in one or more of the captured images. The effect of an occlusion is that at the correct depth, the pixel location that would otherwise be occupied by a corresponding pixel is occupied by a pixel capturing another portion of the scene (typically an object closer to the camera). The occluding pixel is likely very different to the occluded pixel. Therefore, a comparison of the similarity of the pixels at the correct depth is less likely to result in a significantly higher degree of similarity than at other depths. Effectively, the occluding pixel acts as a strong outlier masking the similarity of those pixels, which correspond. Accordingly, the presence of occlusions can introduce a strong source of error into a depth map and processes for determining depth maps such as those disclosed in U.S. Pat. No. 8,619,082 and U.S. Patent Publication No. 2014/0267243 (incorporated by reference above) involve detecting occlusions and determining depths using non-occluded pixels. Systems and methods for generating depth estimates for the use in rendering high frame rate video sequences in accordance with embodiments of the invention are discussed further below.

Processes for Rendering High Frame Rate Video Sequences

Processes for rendering of high frame rate video sequences in accordance with various embodiments of the invention typically vary based upon the availability of depth information. As discussed above, processes in accordance with many embodiments of the invention involve detecting moving pixels in image data captured from different viewpoints and shifting moving pixels captured from alternate viewpoints to a reference viewpoint. The moving pixels can then be composited with non-moving pixels from a previously rendered frame. In array cameras where depth information can be synthesized using cameras within a group of cameras, the process of shifting moving pixels is relatively straightforward and the processes described in U.S. Pat. No. 8,619,082 and U.S. Patent Publication No. 2014/0267243 (incorporated by reference above) can be utilized to perform parallax detection and to assign confidence metrics to the depth estimates. In other embodiments, image data captured by multiple groups of cameras over different time intervals is utilized to determine scene-dependent geometric corrections to shift image data captured from alternate viewpoints to the reference viewpoint.

Figure 5:
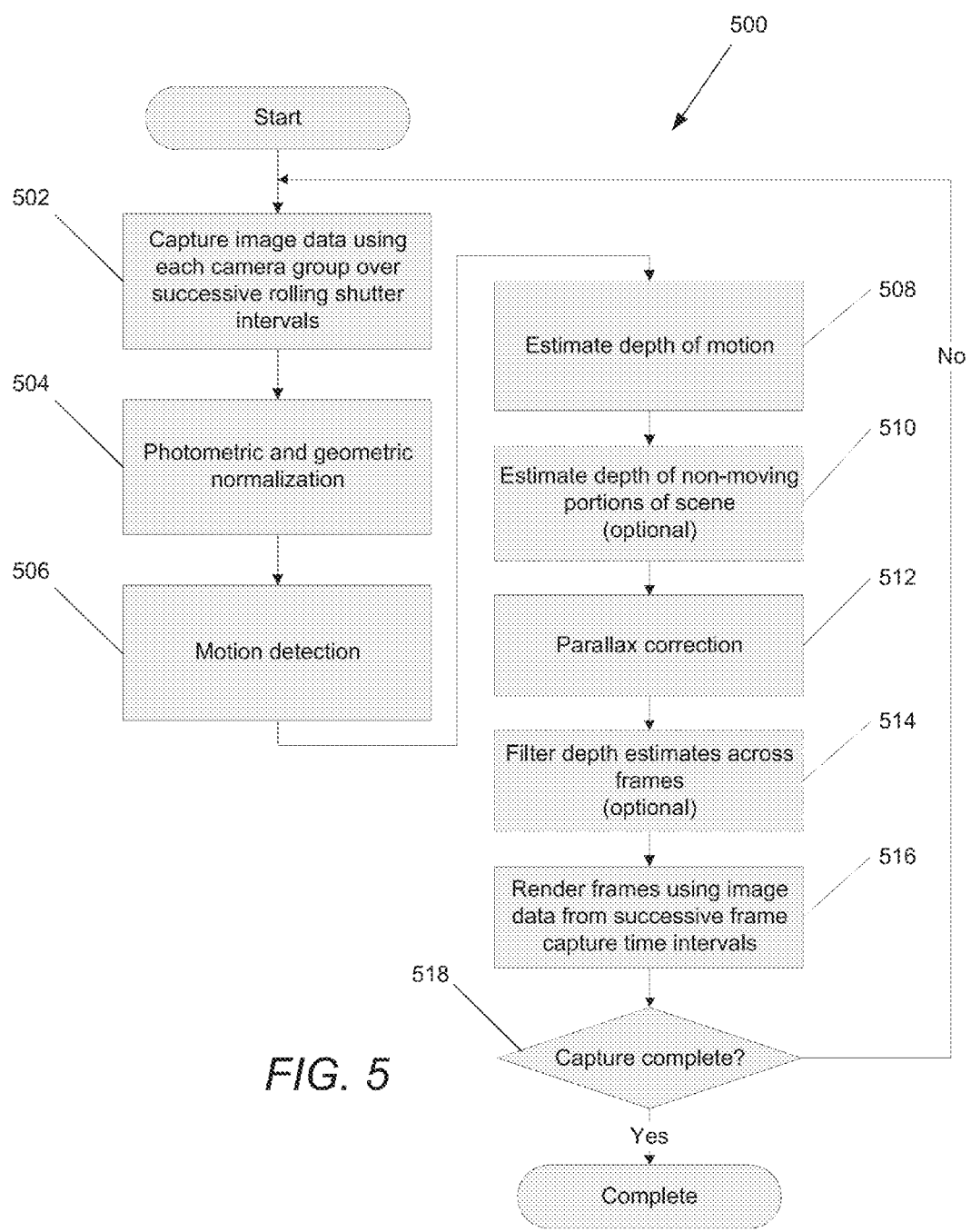
FIG. 5 is a flow chart illustrating a process for rendering a high speed video sequence using image data captured by an array camera in accordance with an embodiment of the invention.

A process for rendering a video sequence using image data captured by groups of cameras in an array in accordance with an embodiment of the invention is illustrated in FIG. 5. The process 500 includes capturing (502) image data using each group of cameras over successive rolling shutter time intervals, where the start time of the capture of image data in each camera group is staggered so that each of the cameras in the N camera groups captures at least 1/N of the total rows (or columns) of a rendered frame are capable of being captured by the camera during a frame capture time interval. As noted above, the rolling shutter time interval is typically significantly longer than the frame capture time interval. Image data is captured over successive rolling shutter intervals to enable the detection of motion using sequential sets of image data captured by each active camera. The staggering of the start times of the capture of image data by the groups of cameras results in the combined image data captured by the groups of cameras during each frame capture time interval being sufficient to render a complete frame of video at the frame rate of the high speed video sequence.

Photometric and geometric normalization is performed (504) using calibration data to increase the similarity of the images captured by different cameras. As noted above, increasing the similarity of the image data can facilitate disparity searches. Photometric and geometric normalization processes similar to those disclosed in U.S. Patent Publication No. 2012/0147205 entitled "Systems and Methods for Synthesizing High Resolution Images Using Super-Resolution Processes" to Lelescu et al. and U.S. Pat. No. 8,619,082. The relevant portions of U.S. Patent Publication No. 2012/0147205 and U.S. Pat. No. 8,619,082 related to performing photometric and geometric normalization of images captured by array cameras is hereby incorporated by reference herein in its entirety.

In many embodiments, motion detection is performed (506). Motion detection within the portion of a frame captured by a given camera during a frame capture time interval is typically performed using image data captured by the same camera during a different frame capture time interval (as opposed to through comparison with image data captured by a different camera). Utilizing the same viewpoint can simplify motion detection. Motion detection can be performed by simply looking for pixels with intensities that differ by a threshold amount. The threshold can be based upon the local signal to noise ratio, localized statistics with respect to the sequence of portions of frames, and/or a predetermined threshold number. As can readily be appreciated, any of a variety of techniques can be utilized to detect motion as appropriate to the requirements of specific applications in accordance with embodiments of the invention.

In several embodiments, depth estimates are generated (508) for the moving pixels. As noted above, depth estimates can be obtained using image data captured by a single group of cameras during a frame capture time interval, where the single group of cameras includes at least two cameras that capture image data in the same color channel. In a number of embodiments, depth estimates with respect to moving pixels captured from a first viewpoint during a given frame capture time interval by interpolating at least a portion of a frame in which the same portion of the scene is visible from a second viewpoint at the frame capture time interval and performing disparity searches with respect to the moving pixels. In several embodiments, disparity searches are performed with respect to individual moving pixels, clusters of moving pixels, and/or all moving pixels. Processes for interpolating frames and conducting disparity searches in accordance with various embodiments of the invention are discussed further below.

In several embodiments, depth is also estimated (510) for non-moving pixels in the scene. Typically, the depth estimates for non-moving pixels are propagated from a previous depth estimate. The fact that the pixels are non-moving means that the depth of the pixel remains unchanged from at least one rolling shutter time interval to the next. An initial depth estimate for non-moving pixels can be determined by capturing an initial set of image data and estimating depth using the techniques disclosed in U.S. Pat. No. 8,619,082 (incorporated by reference above). Confidence metrics can also be assigned to the depth estimates using any of the techniques disclosed in U.S. Pat. No. 8,619,082 (incorporated by reference above). As can readily be appreciated, a larger group of cameras can also be used to capture the initial set of image data over a single rolling shutter time interval, such as (but not limited to) the 3×3 π filter group of cameras shown in FIG. 3B. In other embodiments, any of a variety of groups of cameras can be utilized in the capture of an initial depth map of a scene as appropriate to the requirements of specific applications. In many embodiments, the image data captured by all of the active cameras in all of the groups of cameras over at least one rolling shutter time interval can be utilized to estimate the depth of non-moving pixels. The more viewpoints available during depth estimation, the more robust the depth estimation process can be to occlusions. Where depth is estimated based upon aggregation of image data from multiple groups of cameras, the depth estimates for the non-moving pixels can be made from the same image data used to render multiple frames of high frame rate video (as opposed to capturing image data for an initial frame and then commencing capture of image data for rendering subsequent frames of the high frame rate video sequence).

The depth estimates for the moving and non-moving pixels can be utilized to perform (512) parallax correction. The parallax correction applies scene-dependent geometric corrections to the pixels captured by each of the active cameras from alternate viewpoints to shift the pixels to a reference viewpoint. The specific shift is determined based upon the observed disparity between the alternate viewpoint and the reference viewpoint and the baseline between the alternate viewpoint and the reference viewpoint. In several embodiments, the depth estimates are (optionally) filtered (514) based upon depth estimates for moving pixels in previous and/or successive frames. In this way, the impact of errors resulting from the depth estimation process can be reduced by restricting object depth changes in a way that is consistent with the manner in which objects move in the real world. As can readily be appreciated, the application of filtering to depth estimates is typically dependent upon the requirements of specific applications.

In a number of embodiments, frames of video are rendered (516) using image data captured by the array of cameras during each frame capture time interval. In several embodiments, the rendering process involves rendering an initial frame from a reference viewpoint and then rendering subsequent frames by compositing moving pixels observed by the cameras in the array, shifted to the reference viewpoint where necessary, with the non-moving pixels observed by the cameras in the array camera.

In array cameras where the reference camera is capable of capturing image data in each color channel supported by the array camera, then the process of rendering an initial frame from a reference viewpoint is straightforward. The reference camera simply captures a complete frame of image data. In array cameras in which different cameras capture image data in the different color channels supported by the array camera, then an initial frame can be rendered using image data captured by an initial group of cameras. A reference viewpoint can be selected with respect to the viewpoints of the cameras in the initial group of cameras and then a dense depth map determined with respect to the reference viewpoint using any of the techniques described above including (but not limited to) performing disparity searches using image data captured by the initial group of cameras, and/or performing disparity searches using image data captured by the initial group of cameras and one or more additional groups of cameras. A dense depth map can be utilized to render an initial frame by fusing images captured in different color channels from alternate viewpoints into the reference viewpoint. In several embodiments, the initial fusion accounts for the confidence of the depth estimates and information concerning the visibility from the reference viewpoint of specific pixels visible from an alternate viewpoint. Processes that can be utilized to fuse pixels from different color channels include (but are not limited to) the fusion processes disclosed in U.S. Patent Publication No. 2012/0147205, the relevant disclosure of which is hereby incorporated by reference in its entirety. As can readily be appreciated, any of a variety of processes can be utilized to render an initial frame for a high speed video sequence appropriate to the requirements of specific applications in accordance with embodiments of the invention.

The process described above repeats during each frame capture time interval until a determination (518) is made that the capture of image data and rendering of video frames is complete. Periodically, the process can render a new initial frame to ensure that artifacts such as (but not limited to) artifacts due to depth estimation errors do not propagate throughout the entire video sequence. In several embodiments, the firing pattern of the cameras can be modified as part of the process of rendering a new initial frame. In many embodiments, all cameras can be fired simultaneously to capture a new initial frame and then staggered for rendering of subsequent frames. The manner in which firing patterns are modified during the capture of a high speed video sequence typically depends upon the capabilities of a specific camera array and the requirements of a particular application.

Image Data Capture Sequence

The manner in which different groups of cameras in an array camera can capture image data and the image data utilized to render frames of video can be understood with reference to the timing diagrams illustrated in FIGS. 6A-6C. A timing diagram showing the capture and readout of rows of image data by groups of cameras in an array camera during high speed video capture is illustrated in FIG. 6A. Time is illustrated on the x-axis and row readout is illustrated on the y-axis. In the illustrated example, the cameras in the groups of cameras have rolling shutters and so the readout of rows is represented as a diagonal line. The time taken for a single group of cameras to read out all of the rows of image data is indicated as the rolling shutter interval 600. The vertical dashed lines correspond to the frame capture time interval 602, which is equal to the inverse of the target high-speed frame rate (i.e. the display refresh interval 620 shown in FIG. 6B). In the example illustrated in FIG. 6A, the first group of cameras captures a still frame that is used to render non-moving pixels a high speed video sequence. Each frame of the high speed video sequence is rendered using the non-moving pixels in combination with moving pixels detected within image data captured by the four different groups of cameras during the same frame capture time interval. The image data captured by the four groups of cameras (1, 2, 3, 4) during the frame capture time interval for frame t1 (604) is used to render a first frame of video. As noted above, frame capture time intervals can overlap to accommodate vertical parallax between the groups of cameras (not shown).

In order to detect parallax for image data captured by a group of cameras at the frame capture time interval for frame t1 (604), at least one corresponding portion of a frame can be interpolated from one or more different viewpoints at the frame capture time interval for frame t1 (604). When the group of cameras that captured the image data does not include a camera that captures image data from the reference viewpoint, then a frame is typically interpolated at the frame capture time interval for frame t1 (604) from the reference viewpoint. Portions of frames from the reference viewpoint can be interpolated at the frame capture time interval for frame t1 (604) using the image data (606, 610) captured by at least one camera in the first group of cameras from the reference viewpoint over at least two rolling shutter intervals. An interpolated portion of a frame can be utilized to estimate the depth of moving pixels by comparing disparity searches with respect to the moving pixels between the viewpoint of at least one camera in the group of cameras that captured the image data from the alternate viewpoint during the frame capture time interval for frame t1 (604) and the interpolated frame from the reference viewpoint. Where a group of cameras includes cameras that capture image data in different color channels, depth can be estimated for moving pixels observed from the reference viewpoint and in the same color channel as the reference camera using a similar process involving interpolating a portion of a frame from an alternate viewpoint at the frame capture time interval for frame t1 (604). The depths of the moving pixels in the cameras in groups 1, 2, 3, 4 that are captured from alternate viewpoints are then shifted into the reference viewpoint using the depth estimates and composited with the non-moving pixels from a previously rendered frame. A similar process can be utilized to render a second frame from image data captured by the groups of cameras (1, 2, 3, 4) during the capture time for frame t2 (612) and to render subsequent frames.

The rendering of frames from data captured in accordance with the process illustrated in FIG. 6A is conceptually illustrated in FIG. 6B. Time is illustrated on the x-axis and row refresh is illustrated on the y-axis. In the illustrated example, the rows of pixels are progressively refreshed. Therefore, the progressive refreshing of a display during each display refresh interval (620) is conceptually illustrated as a diagonal line. As can readily be appreciated, similar processes could be utilized to render and display interlaced frames of video. Due to the need to detect motion and interpolate frames to estimate depth, there is latency (624) between capturing image data during the capture time of frame t1 (604) and the display time of frame t1. At frame rates such as (but not limited to) 120 fps, however, latency in the order of eleven display refresh intervals from the time at which image data capture commences is imperceptible during video capture (e.g. display of a preview video sequence while capturing video). Once the first frame is rendered, the second frame t2 (626) and subsequent frames can be rendered for display at the high speed video frame rate.

In several embodiments, the complete sets of image data captured by each of the camera groups (1, 2, 3, 4) can be utilized to perform depth estimation with respect to non-moving pixels. In a number of embodiments, an initial group of cameras is utilized to capture a first frame of image data and generate a depth map, and/or confidence for the rendered frame. Smaller groups of cameras can then capture image data used to render moving pixels in subsequent frames. A process of capturing image data using an initial group of cameras corresponding to the 3×3 π filter group of cameras shown in FIG. 3B and then by the four groups of cameras shown in FIG. 3A in accordance with an embodiment of the invention is illustrated in FIG. 6C. In the illustrated embodiment, image data (650) is captured by the initial 3×3 π filter group of cameras. The rolling shutter period of the initial 3×3 π filter group of cameras is shown as longer than that for the smaller groups of cameras (1, 2, 3, 4) used to subsequently capture image data. As noted above, the image data (650) captured by the initial 3×3 π filter group of cameras can be utilized to render an initial frame and to generate an initial depth map. Moving pixels captured in subsequent frame capture intervals can then be composited with the initial frame of video to render a high frame rate video sequence using techniques similar to those described above. In the illustrated example, the cameras in group 2 (i.e. 304 in FIG. 3A) are not part of the initial 3×3 π filter group (i.e. 312 in FIG. 3B). Accordingly, image data can be read out from the cameras in group 2 prior to the completion of image data capture by the initial 3×3 π filter group. In other embodiments, the sequencing of image data capture can be coordinated as appropriate to the requirements of specific applications.

Figure 6D:
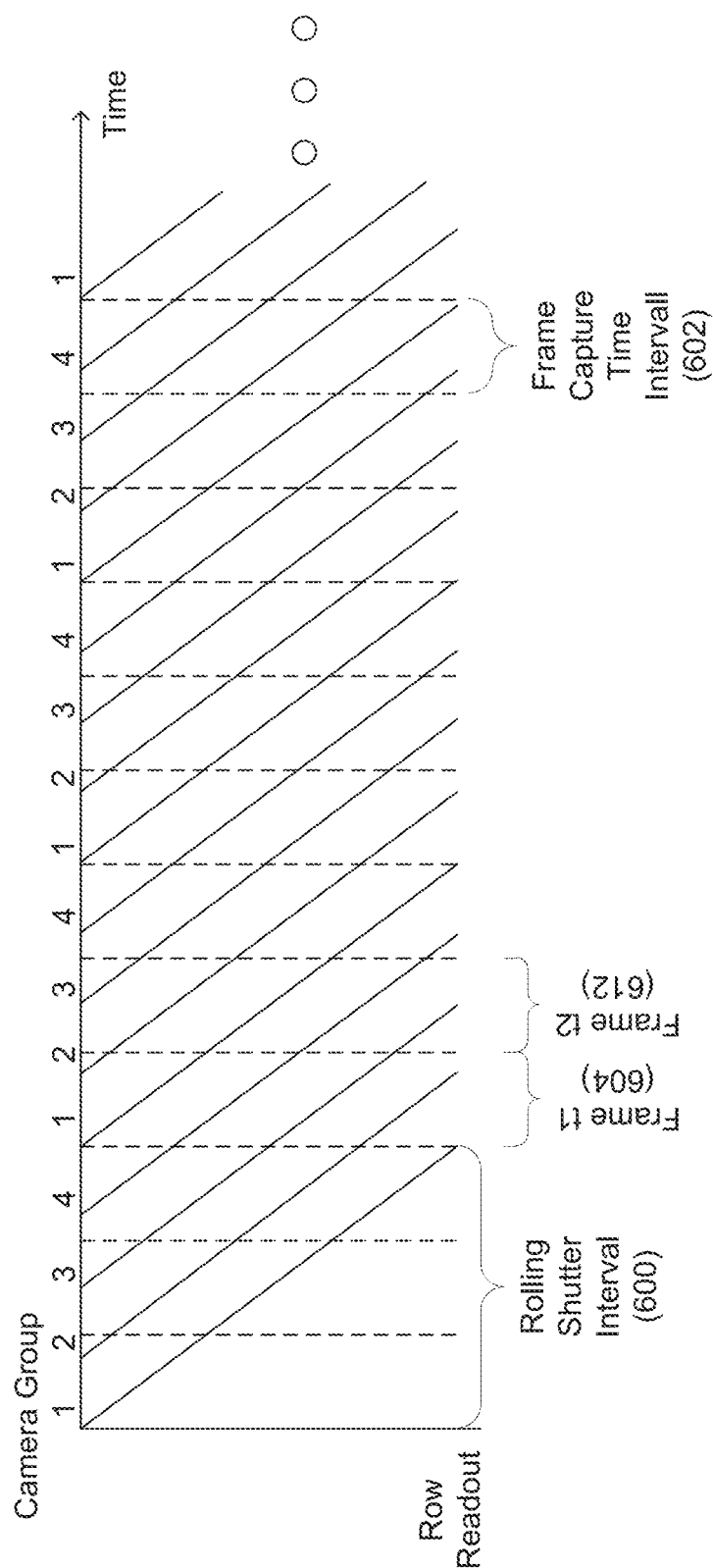
FIG. 6D illustrates the timing of image data capture by an array camera involving capture in which more than 1/N of the total number of rows (or columns) of a rendered frame are read out from each of N groups of cameras during a frame capture time interval to accommodate vertical parallax observable between the viewpoints of the cameras in the different groups of cameras in accordance with an embodiment of the invention.
Figure 6E:
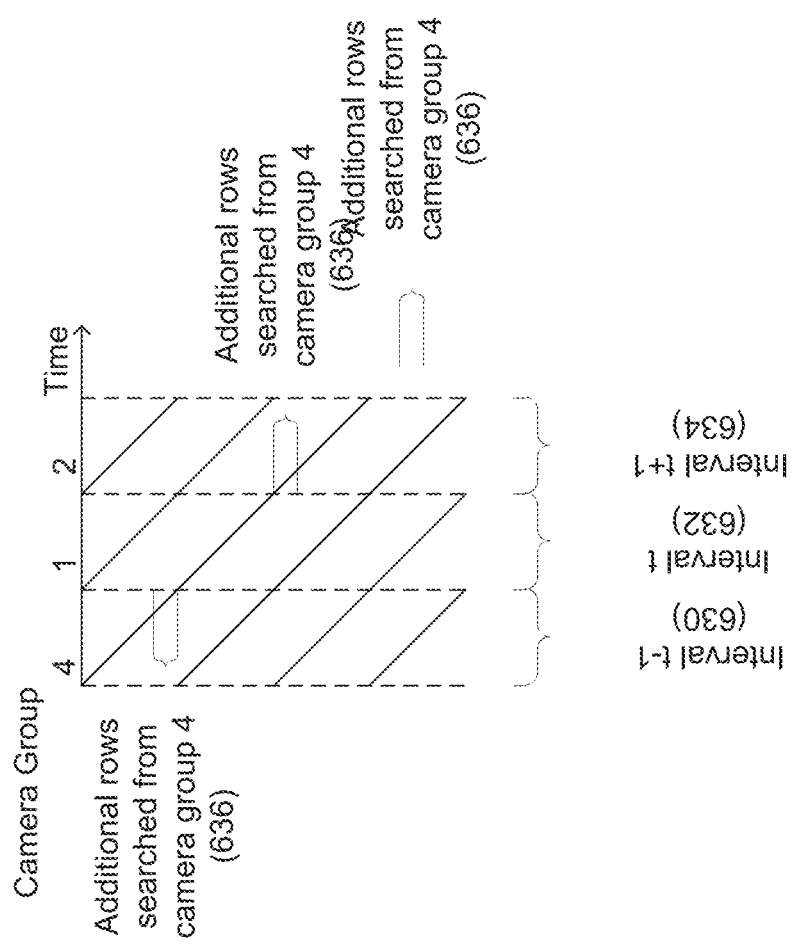
FIG. 6E illustrates the use of image data captured during adjacent frame capture time intervals to render a frame of video from image data captured by each of N groups of cameras in a camera array to accommodate vertical parallax observable between the viewpoints of the cameras in the different groups of cameras in accordance with an embodiment of the invention.

As noted above, the different viewpoints of the camera groups can result in vertical parallax effectively shifting objects at boundaries between the rows of image data captured by different camera groups out of the rendered image. Effectively, objects that are not visible in a first set of rows read out from a first group of cameras may also not be visible in a second sequential group of rows read out from a second group of cameras due to vertical parallax shifting the unobserved pixels into the field of view sampled by the rows (or columns) of the sensors in the second group of cameras during the frame capture time interval. By increasing the number of rows (or columns) read out during a frame capture time interval by an amount corresponding to the likely observed vertical parallax of foreground objects between viewpoints of groups of cameras that sample progressive portions of the scene, then the likelihood of unobserved objects or portions of objects at the boundaries between portions of the scene sampled by different groups of cameras during a display frame interval can be diminished. In many embodiments, more than 1/N of the total number of rows (or columns) of a rendered frame can be read out from each of N groups of cameras during a frame capture time interval to accommodate vertical parallax observable between the viewpoints of the cameras in the different groups of cameras. Readout of approximately $\frac{1}{3}^{rd}$ of the rows of four groups of cameras during every frame capture interval in accordance with an embodiment of the invention is conceptually illustrated in FIG. 6D. As can readily be appreciated, there is overlap in the sequential groups of rows captured by each of the groups of cameras enabling identification of objects that might otherwise be unobserved due to vertical parallax. Although a specific number of overlapping rows between different groups of cameras is shown in FIG. 6D, the specific amount of overlap is largely dependent upon the requirements of a particular application.

As noted above, vertical parallax can also be accommodated by utilizing additional rows of data captured by a group of cameras during a previous and/or subsequent frame capture time interval. The searching of additional rows (636) captured by a camera group during a previous frame capture interval (630) to the frame capture interval of a rendered frame (632) and/or a subsequent frame capture time interval (634) is conceptually illustrated in FIG. 6E. Objects that might otherwise be unobserved due to vertical parallax can be rendered by searching for the objects in rows captured by the camera group during different frame capture intervals. Viewed another way, the frame capture time intervals could be considered to overlap in the sense that certain rows (or columns) of image data captured by a camera could be used in the rendering of two successive frames in the high speed video sequence in order to accommodate vertical parallax at the boundaries between the portions of a rendered frame captured by different groups of cameras in a manner that is conceptually similar to the readout of more than 1/N of the total number of rows (or columns) of the rendered frame.

Although specific processes for rendering high frame rate video sequences using image data captured by groups of cameras in an array camera are described above with reference to FIG. 5-6E, any of a variety of processes can be utilized to concurrently capture and read out image data from multiple different groups of cameras and to combine the image data into frames of video at a rate faster than the rate at which individual cameras in the array camera can capture frames of video appropriate to the requirements of specific applications can be utilized in accordance with embodiments of the invention. For examples, array cameras in accordance with many embodiments utilize cameras having an electronic snap-shot shutter. When cameras in an array have an electronic snap-shot shutter, similar techniques to those described above can be used to interpolate images from different viewpoints for the purpose of performing depth estimation. The depth estimates can then be used to shift pixels captured from alternate viewpoint into the reference viewpoint. In several embodiments, entire frames can be interpolated. In other embodiments, moving pixels can be interpolated and non-moving pixels can be rendered from a previously rendered frame. Accordingly, the specific processes utilized to estimate depth during the capture of high frame rate video sequences using an array camera should be understood to be largely dependent upon the number and type of cameras in the array.

Processes for Estimating Depth Using Interpolated Frames

Array cameras in accordance with many embodiments of the invention utilize image data captured by multiple groups of cameras to estimate depth during high frame rate video capture. As noted above, temporal interpolation of frames of video can be extremely useful in depth estimation. In many embodiments, image data from two or more successive frames can be utilized to perform temporal interpolation of the locations of moving pixels at a given frame capture time interval. The interpolated frames act as synthetic alternate views to image data captured during a given frame capture time interval. While errors in accurately estimating the location of moving pixels in an interpolated frame can result in errors in depth estimation, estimation errors are typically small due to the high frame rate of the video. Furthermore, filtering depth estimates at high frame rates can correct for errors. The filtering is also assisted by the fact that different epipolar lines are searched with respect to the cameras in the different groups of cameras over successive frame capture time intervals. Therefore, interpolation errors are unlikely to result in the same depth estimation error with respect to each pair of viewpoints utilized to perform a disparity search for a portion of a rendered frame in each successive time interval. These differences can be utilized during filtering to refine the depth estimate. As noted above, the depth estimates can involve the generation of confidence metrics and the strength of the depth filtering applied can be adapted based upon the confidence of a given depth estimate.

Figure 7:
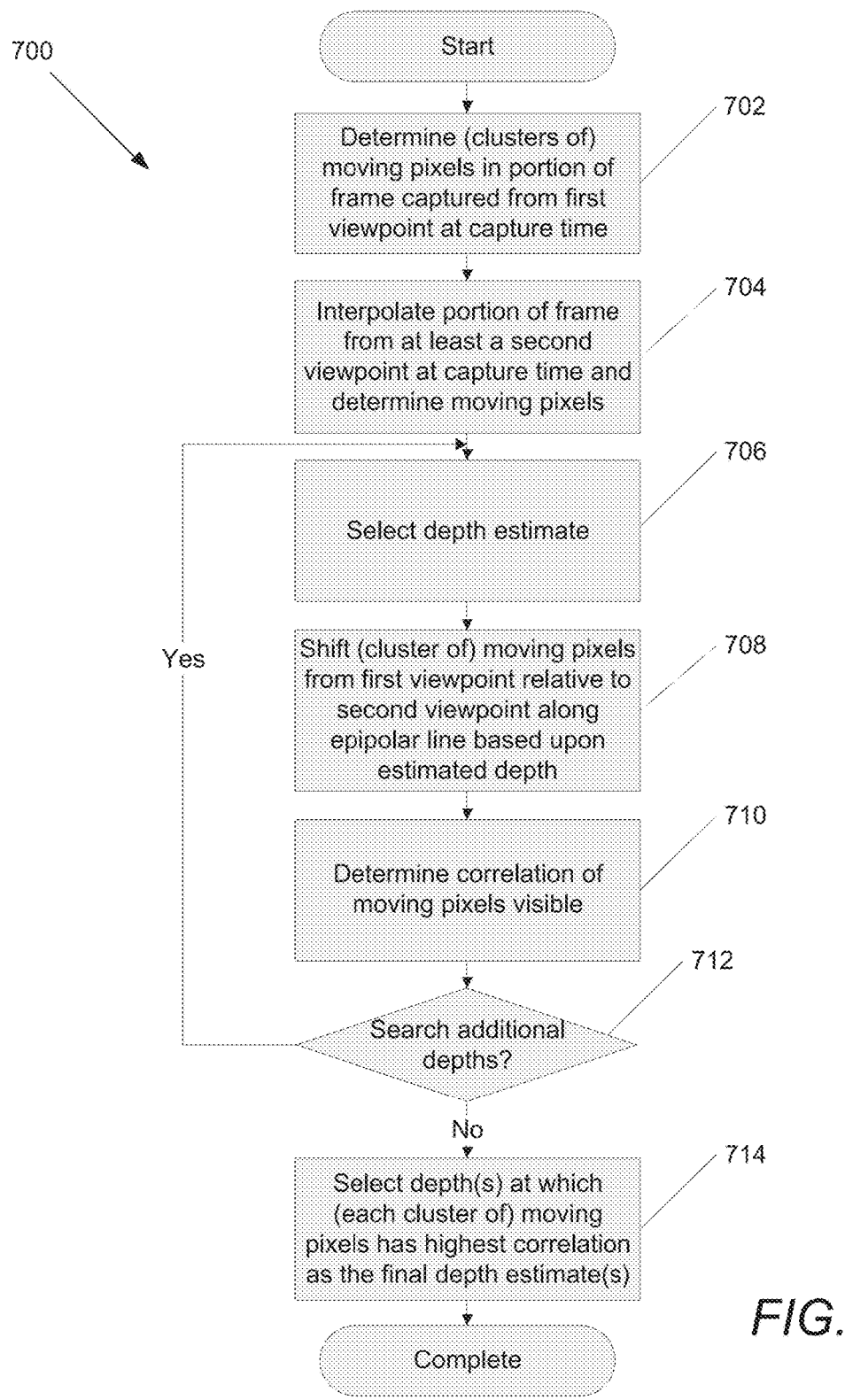
FIG. 7 is a flow chart illustrating a process for estimating depth of moving pixels within image data captured by an array camera in accordance with an embodiment of the invention.

A process for estimating depth using interpolated portions of frames in accordance with an embodiment of the invention is illustrated in FIG. 7. The process 700 includes detecting (702) moving pixels in a portion of a frame from image data captured from a first viewpoint during a given frame capture time interval. The depths of the identified moving pixels can be determined by interpolating (704) a corresponding portion of a frame from at least a second (different) viewpoint at the given frame capture time interval. In many embodiments, the interpolation is only performed with respect to pixels that are identified as moving within image data captured from a second viewpoint. In other embodiments, portions of frames can be interpolated from more viewpoints and/or in multiple color channels to provide a depth estimation that is robust to occlusions.

Disparity searches are typically performed with respect to image data captured from the viewpoints of cameras that capture image data within the same color channel(s). Although, disparity searches can be performed in multiple color channels by comparing the similarity of pixels in each of the color channels. In embodiments where image data from a single group of cameras is utilized to render the non-moving pixels from the reference viewpoint, cameras in other groups of cameras typically utilize portions of frames interpolated from at least the reference viewpoint to perform depth estimates. In circumstances where none of the cameras in a given color channel capture image data from the reference viewpoint, then at least one portion of a frame can be interpolated from the viewpoint of a camera that captures image data in the relevant color channel from the group of cameras used to render the non-moving pixels from the reference viewpoint. Where a camera in the group of cameras used to render the non-moving pixels from the reference viewpoint captures image data from the reference viewpoint, the depth of moving pixels observed by the camera from the reference viewpoint can be determined by interpolating a corresponding portion of a frame at the given frame capture time interval using image data captured from within the same color channel(s) by a camera with an alternate viewpoint. In many embodiments, the interpolation process is a bimodal interpolation process. In other embodiments, the interpolation process can be any of a variety of interpolation processes appropriate to the requirements of specific applications including (but not limited to) trimodal interpolation processes.

Where motion is assumed unconstrained, depth estimates can be obtained by performing disparity searches with respect to individual moving pixels. Where moving pixels are assumed to be part of objects, disparity searches can be performed with respect to clusters of moving pixels. Where all motion is assumed to occur on the same plane, disparity searches can be performed with respect to the entire set of moving pixels. The process of performing a disparity search with respect to pixels in a first viewpoint can involve selecting (706) an initial depth estimate and shifting the searched pixels from at least a second viewpoint into the first viewpoint. Comparisons can also be performed between portions of images captured from different viewpoints in other color channels. From there, a comparison can be performed using any of a variety of metrics including (but not limited to) those described in U.S. Pat. No. 8,619,082. Where disparity searches are performed with respect to a set or cluster of pixels, then correlation can be used to determine (710) the similarity of two clusters of pixels. The process is repeated at a variety of depth samples until a determination (712) is made that a sufficient number of depth samples have been searched. At which point, the depth at which the chosen metric indicates the highest degree of similarity can be selected (714) as the depth estimate for the pixel, cluster of pixels and/or set of pixels. A confidence metric can be assigned to each depth estimate. The specific confidence metric utilized can depend upon the similarity measure utilized to perform the disparity search and the requirements of specific applications. In many embodiments, confidence metrics including (but not limited to) the confidence metrics described in U.S. Pat. No. 8,619,082 (incorporated by reference above) and in Xiaoyan Hu, P. Mordohai, "A Quantitative Evaluation of Confidence Measures for Stereo Vision", IEEE Transactions on Pattern Analysis & Machine Intelligence, vol. 34, no. 11, pp. 2121-2133, November 2012, doi:10.1109/TPAMI.2012.46 can be utilized to encode confidence metrics for depth estimates generated utilized by processes similar to those described above.

Although specific processes are described above with respect to FIG. 7, any of a variety of processes for performing disparity searches using interpolated frames of image data in accordance with embodiments of the invention. Furthermore, as noted above, interpolation is not necessary in order to be able to estimate depth during the rendering of high frame rate video sequences in accordance with embodiments of the invention when groups of cameras include multiple cameras in the same color channel. Accordingly, a variety of process for performing disparity searches with respect to moving pixels within a frame capture time interval and with respect to non-moving pixels over a time interval that is longer than a frame capture time interval can be utilized as appropriate to a particular array camera and the requirements of specific applications in accordance with embodiments of the invention.

While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed:

1. An array camera, comprising:
a plurality of cameras that capture images of a scene from different viewpoints;
memory containing an image processing pipeline application;
wherein the image processing pipeline application directs the processor to:
obtain image data from a plurality of groups of cameras from within the plurality of cameras, where each group of cameras starts capturing image data at a staggered start time relative to the other groups of cameras;
select a reference viewpoint and determine scene-dependent geometric corrections that shift pixels captured from an alternate viewpoint to the reference viewpoint by performing disparity searches to identify the disparity at which pixels from the different viewpoints are most similar; and
render frames of video, where a given frame of video is rendered using pixels comprising pixels from at least one group of cameras captured during a given frame capture time interval and by shifting pixels captured from alternate viewpoints to the reference viewpoint using scene-dependent geometric corrections determined for the pixels captured from the alternate viewpoints,
wherein the image processing pipeline application further directs the processor to render frames of video using:
pixels captured by at least one group of cameras during the given frame capture time interval and determined to be moving during the given frame capture time interval; and
pixels from a previously rendered frame that are determined to be non-moving during at least the given frame capture time interval.

2. The array camera of claim 1, wherein each group of cameras is a single camera selected from the group consisting of: a monochrome camera, a Bayer camera, and an infrared camera.

3. The array camera of claim 1, wherein each group of cameras includes multiple cameras.

4. The array camera of claim 1, wherein the image processing pipeline application further directs the processor to determine scene-dependent geometric corrections that shift pixels captured from an alternate viewpoint to the reference viewpoint by:
selecting at least a portion of a frame captured from a first viewpoint during a specific frame capture time interval;
interpolating at least a portion of a frame from a second viewpoint during the specific frame capture time interval based upon image data captured from the second viewpoint at other times, where the second viewpoint differs from the first viewpoint; and
identifying the disparity at which pixels from the at least a portion of a frame selected from the first viewpoint and the at least a portion of a frame interpolated from the second viewpoint are most similar.

5. The array camera of claim 4, wherein the first viewpoint is the alternate viewpoint and the second viewpoint is the reference viewpoint.

6. The array camera of claim 4, wherein the groups of cameras each comprise multiple cameras.

7. The array camera of claim 6, wherein:
the plurality of cameras comprises a camera that captures image data from the reference viewpoint;
the first viewpoint is the alternate viewpoint; and
the second viewpoint is the reference viewpoint.

8. The array camera of claim 6, wherein:
the plurality of cameras comprises a camera that captures image data from the reference viewpoint in a first color channel;
the alternate viewpoint is the viewpoint of a camera in a specific group of cameras that captures image data in a second color channel;
the first viewpoint is the viewpoint of a camera in the specific group of cameras that captures image data in the first color channel;
the second viewpoint is the reference viewpoint; and
wherein the image processing pipeline application further directs the processor to determine scene-dependent geometric corrections that shift pixels captured from the alternate viewpoint to the reference viewpoint by:

estimating depth of at least one pixel visible in the alternate viewpoint based upon the disparity at which pixels from the at least a portion of a frame selected from the first viewpoint and the at least a portion of a frame interpolated from the second viewpoint are most similar; and determining scene-dependent geometric corrections to apply to shift the at least one pixel captured from the alternate viewpoint to the reference viewpoint based upon the estimated depth of the at least one pixel.

9. The array camera of claim 6, wherein:

the plurality of cameras comprises a reference camera that captures image data from the reference viewpoint in a first color channel, where the reference camera is part of a first group of cameras;

the alternate viewpoint is the viewpoint of a camera from the first group of cameras that captures image data in a second color channel;

the first viewpoint is the reference viewpoint;

the second viewpoint is the viewpoint of a camera in a second group of cameras that captures image data in the first color channel; and wherein the image processing pipeline application further directs the processor to determine scene-dependent geometric corrections that shift pixels captured from the alternate viewpoint to the reference viewpoint by:

estimating depth of at least one pixel visible in the alternate viewpoint based upon the disparity at which pixels from the at least a portion of a frame selected from the first viewpoint and the at least a portion of a frame interpolated from the second viewpoint are most similar; and determining scene-dependent geometric corrections to apply to shift the at least one pixel captured from the alternate viewpoint to the reference viewpoint based upon the estimated depth of the at least one pixel.

10. The array camera of claim 1, wherein the image processing pipeline application further directs the processor to determine scene-dependent geometric corrections that shift pixels captured from an alternate viewpoint to the reference viewpoint by:

selecting moving pixels from image data captured from a first viewpoint during a specific frame capture time interval, where the moving pixels are pixels determined to be moving during at least the specific frame capture time interval;

interpolating moving pixels from a second viewpoint during the specific frame capture time interval based upon image data captured from the second viewpoint at other times, where the second viewpoint differs from the first viewpoint and the moving pixels are pixels determined to be moving during the specific frame capture time interval; and identifying the disparity at which the moving pixels from image data captured from the first viewpoint and the moving pixels interpolated from the second viewpoint are most similar.

11. The array camera of claim 10, wherein the image processing pipeline application further directs the processor to perform a disparity search to identify the disparity at which the moving pixels from image data captured from the first viewpoint and the moving pixels interpolated from the second viewpoint are most similar by comparing the similarity of individual moving pixels at different disparities.

12. The array camera of claim 10, wherein the image processing pipeline application further directs the processor to perform a disparity search to identify the disparity at which the moving pixels from image data captured from the first viewpoint and the moving pixels interpolated from the second viewpoint are most similar by comparing the similarity of individual clusters of moving pixels at different disparities.

13. The array camera of claim 10, wherein the image processing pipeline application further directs the processor to perform a disparity search to identify the disparity at which the moving pixels from image data captured from the first viewpoint and the moving pixels interpolated from the second viewpoint are most similar by comparing the similarity of all moving pixels at different disparities.

14. The array camera of claim 1, wherein the image processing pipeline application further directs the processor to render an initial frame from an image captured using one of the plurality of cameras.

15. The array camera of claim 1, wherein the image processing pipeline application further directs the processor to render an initial frame by:

capturing a set of images using an initial group of cameras;

determining depth estimates for pixel locations in an image that is from the reference viewpoint using at least a subset of the set of images, wherein generating a depth estimate for a given pixel location in the image from the reference viewpoint comprises:

identifying pixels in the at least a subset of the set of images that correspond to the given pixel location in the image from the reference viewpoint based upon expected disparity at a plurality of depths;

comparing the similarity of the corresponding pixels identified at each of the plurality of depths; and selecting the depth from the plurality of depths at which the identified corresponding pixels have the highest degree of similarity as a depth estimate for the given pixel location in the image from the reference viewpoint; and rendering a frame from the reference viewpoint using the set of images and the depth estimates for pixel locations in a subset of the set of images to shift pixels captured from alternate viewpoints to the reference viewpoint.

16. The array camera of claim 15, wherein the initial group of cameras comprises a 3×3 π filter group incorporating Red, Green and Blue cameras.

17. The array camera of claim 15, wherein the initial groups of cameras comprises all of the cameras in the plurality of groups of cameras.

18. The array camera of claim 17, wherein:

the plurality of cameras have electronic rolling shutters;

the set of images are each captured over a rolling shutter time interval;

the given frame capture time interval is shorter than a rolling shutter time interval, where the rolling shutter time interval is the time taken to complete read out of image data from a camera in the plurality of cameras; and different portions of the images in the set of images captured by the plurality of groups of cameras that are captured during successive frame capture time intervals are used to render a sequence of frames.

19. The array camera of claim 1, wherein:

the plurality of cameras have electronic rolling shutters; and the given frame capture time interval is shorter than a rolling shutter time interval, where the rolling shutter time interval is the time taken to complete read out of image data from a camera in the plurality of cameras.

20. The array camera of claim 19, wherein the staggered start times of the cameras are coordinated so that each of N groups of cameras captures at least a 1/N portion of an image during a given frame capture time interval.

21. The array camera of claim 20, wherein a given frame of video is rendered using pixels comprising pixels from the N groups of cameras captured during the given frame capture time interval.

22. The array camera of claim 21, wherein the image processing pipeline application further directs the processor to determine scene-dependent geometric corrections that shift pixels captured from an alternate viewpoint to the reference viewpoint by:
 selecting at least a 1/N portion of an image captured from a first viewpoint during a specific frame capture time interval;
 interpolating at least a portion of an image from a second viewpoint during the specific frame capture time interval based upon image data captured from the second viewpoint at other times, where the second viewpoint differs from the first viewpoint;
 identifying the disparity at which pixels from the selected at least a 1/N portion of an image captured from the first viewpoint and the at least a portion of an image interpolated from the second viewpoint are most similar.

23. The array camera of claim 1, wherein the plurality of cameras have electronic snap-shot shutters.

24. The array camera of claim 23, wherein the image processing pipeline application further directs the processor to determine scene-dependent geometric corrections that shift pixels captured from an alternate viewpoint to the reference viewpoint by:
 selecting an image captured from a first viewpoint during a specific frame capture time interval;
 interpolating at least a portion of an image from a second viewpoint during the specific frame capture time interval based upon image data captured from the second viewpoint at other times, where the second viewpoint differs from the first viewpoint; and
 identifying the disparity at which pixels from the image captured from the first viewpoint and the at least a portion of an image interpolated from the second viewpoint are most similar.

25. The array camera of claim 1, wherein the image processing pipeline application further directs the processor to determine scene-dependent geometric corrections that shift pixels captured from an alternate viewpoint to the reference viewpoint by:
 capturing a set of images using a group of cameras comprising at least two cameras that capture image data in the same at least one color channel;
 determining depth estimates for pixel locations in an image from the reference viewpoint using at least a subset of the set of images, wherein generating a depth estimate for a given pixel location in the image from the reference viewpoint comprises:
  identifying pixels in the at least a subset of the set of images that correspond to the given pixel location in the image from the reference viewpoint based upon expected disparity at a plurality of depths;
  comparing the similarity of the corresponding pixels identified at each of the plurality of depths; and
  selecting the depth from the plurality of depths at which the identified corresponding pixels have the highest degree of similarity as a depth estimate for the given pixel location in the image from the reference viewpoint.

26. The array camera of claim 1, wherein the image processing pipeline application further directs the processor to determine scene-dependent geometric corrections that shift pixels captured from an alternate viewpoint to the reference viewpoint by estimating depths for individual pixels determined to be moving during the given frame capture time interval.

27. The array camera of claim 1, wherein the image processing pipeline application further directs the processor to determine scene-dependent geometric corrections that shift pixels captured from an alternate viewpoint to the reference viewpoint by estimating depths for clusters of pixels determined to be moving during the given frame capture time interval.

28. The array camera of claim 1, wherein the image processing pipeline application further directs the processor to determine scene-dependent geometric corrections that shift pixels captured from an alternate viewpoint to the reference viewpoint by estimating depths for all pixels determined to be moving during the given frame capture time interval.

29. An array camera, comprising:
 a plurality of cameras that capture images of a scene from different viewpoints, where the plurality of cameras have electronic rolling shutters and capture an image during a rolling shutter time interval;
 memory containing an image processing pipeline application;
 wherein the image processing pipeline application directs the processor to:
  select a reference viewpoint;
  render an initial frame by:
   capturing a set of images using an initial group of cameras;
   determining depth estimates for pixel locations in an image from the set of images that is from the reference viewpoint using at least a subset of the set of images, wherein generating a depth estimate for a given pixel location in the image from the reference viewpoint comprises:
    identifying pixels in the at least a subset of the set of images that correspond to the given pixel location in the image from the reference viewpoint based upon expected disparity at a plurality of depths;
    comparing the similarity of the corresponding pixels identified at each of the plurality of depths; and
    selecting the depth from the plurality of depths at which the identified corresponding pixels have the highest degree of similarity as a depth estimate for the given pixel location in the image from the reference viewpoint;
   rendering the initial frame from the reference viewpoint using the set of images and the depth estimates for pixel locations in a subset of the set of images to shift pixels captured from alternate viewpoints to the reference viewpoint;
  render subsequent frames by:
   obtaining image data from a plurality of groups of cameras from within the plurality of cameras, where each group of cameras starts capturing image data at a staggered start time relative to the other groups of cameras and the staggered start times of the cameras are coordinated so that each of N groups of cameras captures at least a 1/N portion of a frame during a given frame capture time interval that is shorter than the rolling shutter time intervals of each of the plurality of cameras;

determining pixels captured by the N groups of cameras during a given frame capture time interval that are moving during the given frame capture time interval; and determining scene-dependent geometric corrections that shift moving pixels captured from an alternate viewpoint to the reference viewpoint by performing disparity searches to identify the disparity at which moving pixels from the different viewpoints are most similar, where the disparity searches comprise:

selecting moving pixels from image data captured from a first viewpoint during the given frame capture time interval;

interpolating moving pixels from a second viewpoint during the given frame capture time interval based upon image data captured from the second viewpoint at other times, where the second viewpoint differs from the first viewpoint; and identifying the disparity at which the moving pixels from image data captured from the first viewpoint and the moving pixels interpolated from the second viewpoint are most similar;

rendering frames of video, where a given frame of video is rendered using pixels comprising:

moving pixels from the N groups of cameras captured during the given frame capture time interval, where moving pixels captured from alternate viewpoints are shifted to reference viewpoint using scene-dependent geometric corrections determined for the pixels captured from the alternate viewpoints; and non-moving pixels from a previously rendered frame from the reference viewpoint.

30. An array camera, comprising:

a plurality of cameras that capture images of a scene from different viewpoints;

memory containing an image processing pipeline application;

wherein the image processing pipeline application directs the processor to:

obtain image data from a plurality of groups of cameras from within the plurality of cameras, where each group of cameras starts capturing image data at a staggered start time relative to the other groups of cameras;

select a reference viewpoint and determine scene-dependent geometric corrections that shift pixels captured from an alternate viewpoint to the reference viewpoint by performing disparity searches to identify the disparity at which pixels from the different viewpoints are most similar; and render frames of video, where a given frame of video is rendered using pixels comprising pixels from at least one group of cameras captured during a given frame capture time interval and by shifting pixels captured from alternate viewpoints to the reference viewpoint using scene-dependent geometric corrections determined for the pixels captured from the alternate viewpoints;

wherein the image processing pipeline application further directs the processor to render frames of video using:

pixels captured by at least one group of cameras during the given frame capture time interval and determined to be moving during the given frame capture time interval; and pixels from a previously rendered frame that are determined to be non-moving during at least the given frame capture time interval;

wherein:

the plurality of cameras have electronic rolling shutters; and the given frame capture time interval is shorter than a rolling shutter time interval, where the rolling shutter time interval is the time taken to complete read out of image data from a camera in the plurality of cameras.

31. The array camera of claim 30, wherein each group of cameras is a single camera selected from the group consisting of: a monochrome camera, a Bayer camera, and an infrared camera.

32. The array camera of claim 30, wherein each group of cameras includes multiple cameras.

33. The array camera of claim 30, wherein the image processing pipeline application further directs the processor to determine scene-dependent geometric corrections that shift pixels captured from an alternate viewpoint to the reference viewpoint by:

selecting moving pixels from image data captured from a first viewpoint during a specific frame capture time interval, where the moving pixels are pixels determined to be moving during at least the specific frame capture time interval;

interpolating moving pixels from a second viewpoint during the specific frame capture time interval based upon image data captured from the second viewpoint at other times, where the second viewpoint differs from the first viewpoint and the moving pixels are pixels determined to be moving during the specific frame capture time interval; and identifying the disparity at which the moving pixels from image data captured from the first viewpoint and the moving pixels interpolated from the second viewpoint are most similar.

34. The array camera of claim 33, wherein the image processing pipeline application further directs the processor to perform a disparity search to identify the disparity at which the moving pixels from image data captured from the first viewpoint and the moving pixels interpolated from the second viewpoint are most similar by comparing the similarity of individual moving pixels at different disparities.

35. The array camera of claim 33, wherein the image processing pipeline application further directs the processor to perform a disparity search to identify the disparity at which the moving pixels from image data captured from the first viewpoint and the moving pixels interpolated from the second viewpoint are most similar by comparing the similarity of individual clusters of moving pixels at different disparities.

36. The array camera of claim 33, wherein the image processing pipeline application further directs the processor to perform a disparity search to identify the disparity at which the moving pixels from image data captured from the first viewpoint and the moving pixels interpolated from the second viewpoint are most similar by comparing the similarity of all moving pixels at different disparities.

37. The array camera of claim 30, wherein the image processing pipeline application further directs the processor to render an initial frame from an image captured using one of the plurality of cameras.

38. An array camera, comprising:
a plurality of cameras that capture images of a scene from different viewpoints, wherein the plurality of cameras have electronic snap-shot shutters;
memory containing an image processing pipeline application;
wherein the image processing pipeline application directs the processor to:
obtain image data from a plurality of groups of cameras from within the plurality of cameras, where each group of cameras starts capturing image data at a staggered start time relative to the other groups of cameras;
select a reference viewpoint and determine scene-dependent geometric corrections that shift pixels captured from an alternate viewpoint to the reference viewpoint by performing disparity searches to identify the disparity at which pixels from the different viewpoints are most similar; and
render frames of video, where a given frame of video is rendered using pixels comprising pixels from at least one group of cameras captured during a given frame capture time interval and by shifting pixels captured from alternate viewpoints to the reference viewpoint using scene-dependent geometric corrections determined for the pixels captured from the alternate viewpoints;
wherein the image processing pipeline application further directs the processor to determine scene-dependent geometric corrections that shift pixels captured from an alternate viewpoint to the reference viewpoint by:
selecting an image captured from a first viewpoint during a specific frame capture time interval;
interpolating at least a portion of an image from a second viewpoint during the specific frame capture time interval based upon image data captured from the second viewpoint at other times, where the second viewpoint differs from the first viewpoint; and
identifying the disparity at which pixels from the image captured from the first viewpoint and the at least a portion of an image interpolated from the second viewpoint are most similar.

39. The array camera of claim 38, wherein each group of cameras is a single camera selected from the group consisting of: a monochrome camera, a Bayer camera, and an infrared camera.

40. The array camera of claim 38, wherein each group of cameras includes multiple cameras.

41. The array camera of claim 38, wherein the image processing pipeline application further directs the processor to render frames of video using:
pixels captured by at least one group of cameras during the given frame capture time interval and determined to be moving during the given frame capture time interval; and
pixels from a previously rendered frame that are determined to be non-moving during at least the given frame capture time interval.

42. The array camera of claim 41, wherein the image processing pipeline application further directs the processor to determine scene-dependent geometric corrections that shift pixels captured from an alternate viewpoint to the reference viewpoint by:
selecting moving pixels from image data captured from a first viewpoint during a specific frame capture time interval, where the moving pixels are pixels determined to be moving during at least the specific frame capture time interval;
interpolating moving pixels from a second viewpoint during the specific frame capture time interval based upon image data captured from the second viewpoint at other times, where the second viewpoint differs from the first viewpoint and the moving pixels are pixels determined to be moving during the specific frame capture time interval; and
identifying the disparity at which the moving pixels from image data captured from the first viewpoint and the moving pixels interpolated from the second viewpoint are most similar.

43. The array camera of claim 42, wherein the image processing pipeline application further directs the processor to perform a disparity search to identify the disparity at which the moving pixels from image data captured from the first viewpoint and the moving pixels interpolated from the second viewpoint are most similar by comparing the similarity of individual moving pixels at different disparities.

44. The array camera of claim 42, wherein the image processing pipeline application further directs the processor to perform a disparity search to identify the disparity at which the moving pixels from image data captured from the first viewpoint and the moving pixels interpolated from the second viewpoint are most similar by comparing the similarity of individual clusters of moving pixels at different disparities.

45. The array camera of claim 42, wherein the image processing pipeline application further directs the processor to perform a disparity search to identify the disparity at which the moving pixels from image data captured from the first viewpoint and the moving pixels interpolated from the second viewpoint are most similar by comparing the similarity of all moving pixels at different disparities.

46. The array camera of claim 41, wherein the image processing pipeline application further directs the processor to render an initial frame from an image captured using one of the plurality of cameras.

* * * * *